United States Patent
Leonard et al.

(10) Patent No.: US 12,454,689 B2
(45) Date of Patent: Oct. 28, 2025

(54) INTEGRATION OF MESA RECEPTORS AND PROMOTORS TO IMPLEMENT CUSTOMIZED CELLULAR FUNCTION

(71) Applicant: Northwestern University, Evanston, IL (US)

(72) Inventors: Joshua N. Leonard, Wilmette, IL (US); Rachel M. Dudek, Ann Arbor, MI (US); Kelly A. Schwarz, Mooresville, NC (US)

(73) Assignee: Northwestern University, Evanston, IL (US)

( * ) Notice: Subject to any disclaimer, the term of this patent is extended or adjusted under 35 U.S.C. 154(b) by 732 days.

(21) Appl. No.: 16/496,141

(22) PCT Filed: Mar. 23, 2018

(86) PCT No.: PCT/US2018/023973
§ 371 (c)(1),
(2) Date: Sep. 20, 2019

(87) PCT Pub. No.: WO2018/175856
PCT Pub. Date: Sep. 27, 2018

(65) Prior Publication Data
US 2020/0048631 A1 Feb. 13, 2020

Related U.S. Application Data

(60) Provisional application No. 62/475,605, filed on Mar. 23, 2017.

(51) Int. Cl.
| | |
|---|---|
| *C12N 15/63* | (2006.01) |
| *C07K 14/705* | (2006.01) |
| *C12N 15/00* | (2006.01) |
| *C12N 15/10* | (2006.01) |
| *C12N 15/85* | (2006.01) |
| *G01N 33/53* | (2006.01) |
| *A01K 67/00* | (2006.01) |

(52) U.S. Cl.
CPC ........ *C12N 15/1086* (2013.01); *C07K 14/705* (2013.01); *C12N 15/85* (2013.01); *C07K 2319/03* (2013.01); *C07K 2319/50* (2013.01); *C07K 2319/715* (2013.01); *C12N 2015/859* (2013.01); *C12N 2800/107* (2013.01); *C12N 2810/40* (2013.01); *C12N 2830/15* (2013.01); *C12N 2830/30* (2013.01)

(58) Field of Classification Search
CPC ................ C12N 15/1086; C12N 15/85; C12N 2015/859; C12N 2800/107; C12N 2810/40; C12N 2830/15; C12N 2830/30; C07K 14/705; C07K 2319/03; C07K 2319/50; C07K 2319/715
See application file for complete search history.

(56) References Cited

U.S. PATENT DOCUMENTS

| | | |
|---|---|---|
| 9,732,392 B2 * | 8/2017 | Leonard et al. |
| 2005/0084864 A1 | 4/2005 | Rossner et al. |
| 2007/0087346 A1 * | 4/2007 | Ciliberto et al. |

FOREIGN PATENT DOCUMENTS

WO    WO 2013/022739 A1    2/2013

OTHER PUBLICATIONS

Kramer et al. Biologic gates enable logical transcription control in mammalian cells. Biotechnology and Bioengineering 87:478-484, (Year: 2004).*
Ede et al. Quantitative analyses of Core Promoters enable precise engineering of regulated gene expression in mammalian cells. ACS Synth. Biol. 5:395-404; (Year: 2016).*
Mobley et al The Rous Sarcoma Virus Long Terminal Repeat promoter is regulated by TFII-I. Journal of Virology 74:6511-6519; (Year: 2000).*
Dynan et al. Characterization of a Minimal Simian Virus 40 Late Promoter. Journal of Virology 63:1420-1427; (Year: 1989).*
Byrne et al Definition of the simian virus 40 early promoter region and demonstration of a host range bias in the enhancement effect of the simian virus 40 72-base-pair repeat. Proc. Natl. Acad. Sci. USA 80:721-725; (Year: 1983).*
International Search Report and Written Opinion dated Aug. 23, 2018, in PCT/US2018/023973.
Daringer et al., "Modular Extracellular Sensor Architecture for Engineering Mammalian Cell-based Devices," ACS Synthetic Biology, Feb. 25, 2014, 892-902.
Schwarz et al., "Rewiring human cellular input-output using modular extracellular sensors," Nat. Chem. Biol., Feb. 2014, 13(2):202-209, Abstract.

* cited by examiner

*Primary Examiner* — Quang Nguyen
(74) *Attorney, Agent, or Firm* — Foley & Lardner LLP

(57) ABSTRACT

Disclosed are systems and methods for detecting extracellular ligands and/or inducing expression of an exogenous or endogenous gene. The disclosed systems and methods typically include and/or utilize (i) first and second exogenous extracellular sensors, and third and fourth exogenous extracellular sensors; and (ii) an expression vector comprising a target gene operably linked to a hybrid promoter sequence. The hybrid promoter sequence of the expression vector includes a minimal promoter for inducing transcription and the hybrid promoter sequence further includes interspaced transcription regulator binding sites upstream of the minimal promoter that bind two or more transcription regulators of the extracellular sensors that are released from the extracellular sensors when the extracellular sensor bind an extracellular ligand.

20 Claims, 30 Drawing Sheets a

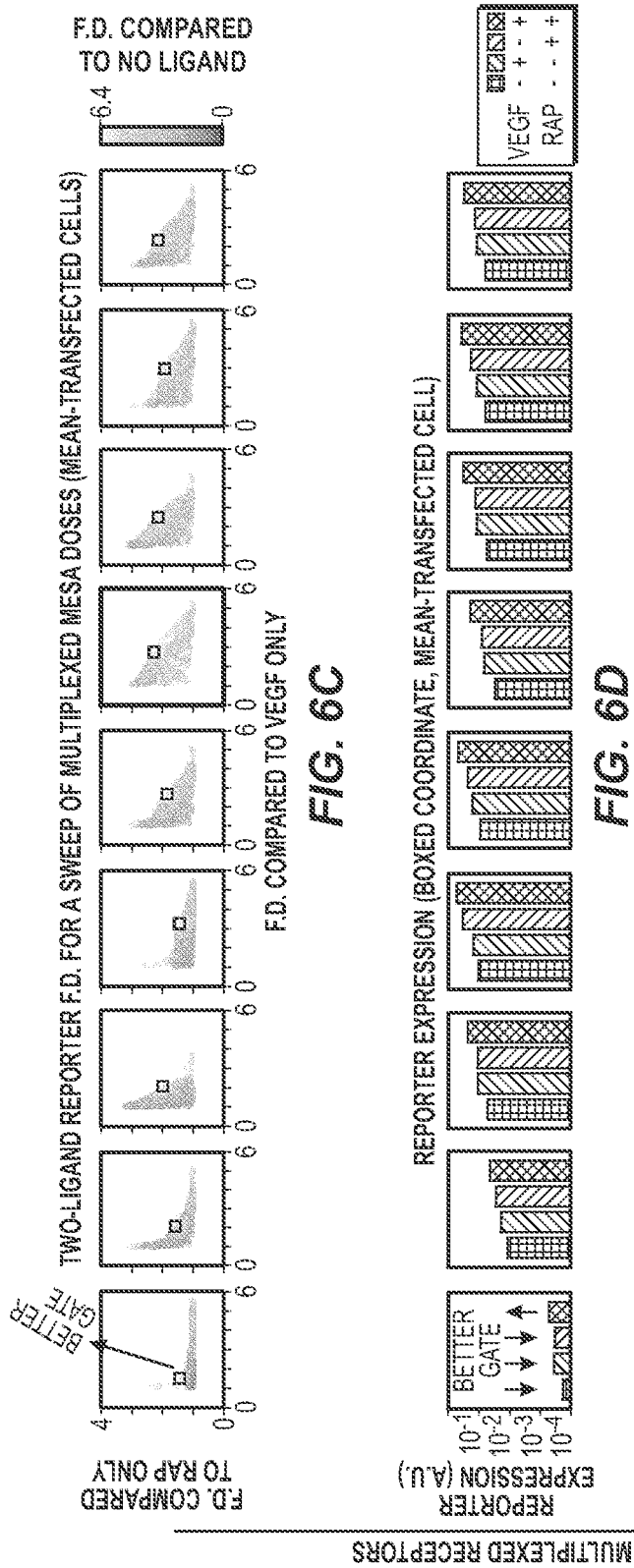
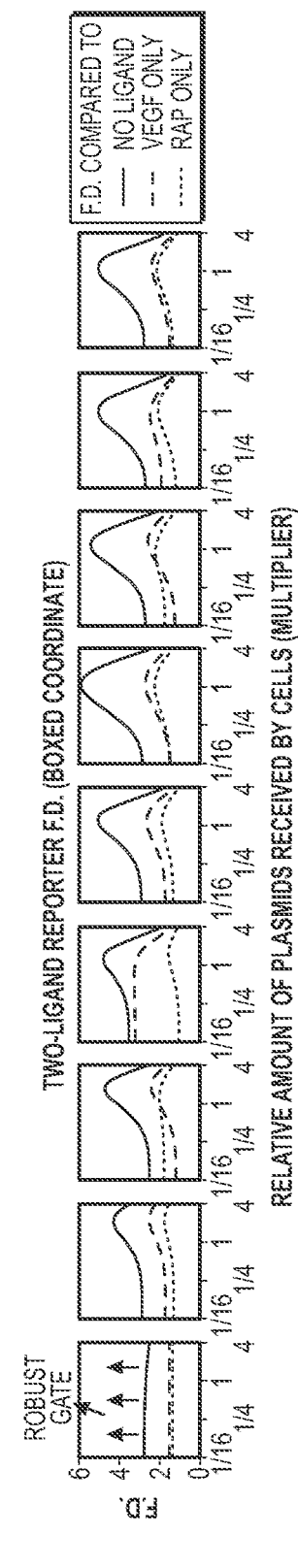
FIG. 6C
FIG. 6D
FIG. 6E

Figure 7

| case | Base case 1 | 2 | 3 | 4 | 5 | 6 | 7 | 8 | 9 |
|---|---|---|---|---|---|---|---|---|---|
| | | Individual design changes | | | | Combined design changes | | | |
| | | Receptor engineering | | | | | | | |
| MESA properties | - | Chain degradation 2x slower | Cleavage sequences orthogonal | Basal cleavage 2x slower | Chain dimerization 2x faster | 3, 4 | 3, 5 | 4, 5 | 3, 4, 5 | ium
INTEGRATION OF MESA RECEPTORS AND PROMOTORS TO IMPLEMENT CUSTOMIZED CELLULAR FUNCTION

CROSS-REFERENCE TO RELATED PATENT APPLICATIONS

This is application claims the benefit of priority under 35 U.S.C. § 119(e) to U.S. Provisional Application No. 62/475,605, filed on Mar. 23, 2017, the content of which is incorporated herein by reference in its entirety.

STATEMENT REGARDING FEDERALLY SPONSORED RESEARCH OR DEVELOPMENT

This invention was made with government support under W911NF-11-2-0066 awarded by the Army Research Office (DARPA). The government has certain rights in the invention.

BACKGROUND

The present invention provides modular extracellular sensors, nucleic acids encoding such sensors, cells expressing such sensors, and methods of employing such sensors and cells for detecting extracellular ligands and/or inducing expression of an exogenous or endogenous gene in a cell. The invention also relates to the use of modular extracellular sensors to induce expression of genes from hybrid promoter sequences comprising multiple transcription regulator binding sites upstream of a minimal promoter.

Engineered cell-based therapies comprise a promising, emerging approach for treating a wide variety of diseases. Broad utilization of this strategy will require new technologies for implementing sophisticated functional programs, such as sensing and responding to the environment in a defined fashion. Towards this goal, the present inventors developed a technology that enables multiplexing of engineered receptors, such as the inventors self-contained receptor and signaling transduction system referred to as "Modular Extracellular Sensor Architecture," to generate higher order logical evaluation. As an initial evaluation of the potential for multiplexing MESA receptors, the inventors developed a novel single-layer transcriptional 'AND' gate promoter architecture, which when coupled to these MESA receptors, conferred the desired logical evaluation of extracellular ligands. This design-driven approach thus demonstrates the potential to incorporate such engineered receptors into customized functional programs for applications in medicine and fundamental research.

SUMMARY

Disclosed are systems and methods for detecting extracellular ligands and/or inducing expression of an exogenous or endogenous gene. The disclosed methods and systems for detecting extracellular ligands and/or inducing expression of an exogenous or endogenous gene typically utilize and/or comprise: i) multiple exogenous extracellular sensors, and/or ii) multiple nucleic acid sequences encoding the multiple exogenous extracellular sensors, wherein the multiple exogenous extracellular sensors comprise: a) a ligand binding domain, b) a transmembrane domain, c) a protease cleavage site, and d) a functional domain comprising a transcription regulator for inducing expression of the exogenous or endogenous gene.

In the disclosed systems and methods, typically the transcription regulators of the multiple exogenous extracellular sensors will induce expression of the exogenous or endogenous gene by binding to transcription regulator binding sites upstream of a promoter for the exogenous or endogenous gene. In some embodiments of the disclosed systems, expression of an exogenous or endogenous gene is effectuated and/or increased when the transcription regulator of one extracellular sensor and the transcription regulator of another extracellular sensor bind to respective transcription regulator binding sites upstream of the promoter for the exogenous or endogenous gene. The promoter of the exogenous and/or endogenous gene may comprise a hybrid promoter sequence which includes a minimal promoter and transcription regulator binding sites upstream of the minimal promoter which are not naturally present upstream of the minimal promoter. An endogenous promoter sequence may be recombinantly modified in order to create a hybrid promoter sequence as contemplated herein.

In some embodiments of the disclosed systems and methods for detecting extracellular ligands and/or inducing expression of an exogenous or endogenous gene, the systems may comprise: i) one or more first and second exogenous extracellular sensors, and ii) one or more one or more third and fourth exogenous extracellular sensors. The first and third exogenous extracellular sensors comprise: a) a ligand binding domain, b) a transmembrane domain, c) a protease cleavage site, and d) a functional domain comprising a transcription regulator, where the transcription regulator of the first exogenous extracellular sensor is different than the transcription regulator of the third exogenous extracellular sensor. The second and fourth exogenous extracellular sensors comprise: e) a ligand binding domain, f) a transmembrane domain, and g) a protease domain. The ligand binding domain of the first exogenous sensor and the ligand binding domain of the second exogenous sensor bind to the same ligand to form a tertiary complex. Similarly, the ligand binding domain of the third exogenous sensor and the ligand binding domain of the fourth exogenous sensor bind to the same ligand to form a tertiary complex. Typically, the ligand binding domains of the first and second exogenous sensors bind to a different ligand than the ligand that is bound by the ligand binding domains of the third and fourth exogenous sensors.

In the disclosed systems and methods, the first exogenous extracellular sensor comprising the protease cleavage site and the second exogenous extracellular sensor comprising the protease may be present on the surface of a cell and the extracellular domains of the first and second exogenous extracellular sensor may bind to a ligand causing the first and second exogenous extracellular sensor to form a heterodimer (i.e., a tertiary complex comprising the first and second exogenous extracellular sensors and the ligand). As such, the extracellular domains of the first and second exogenous extracellular sensor promote formation of a heterodimer comprising the first and second exogenous extracellular sensors when the extracellular domains of the first and second exogenous extracellular sensor bind the ligand. When the extracellular domains promote formation of a heterodimer comprising the first and second exogenous extracellular sensors, the protease of the second exogenous extracellular sensor cleaves the protease cleavage site of the first exogenous extracellular sensor to release the functional domain comprising the transcription regulator of the first exogenous extracellular sensor. The transcription regulator of the function domain of the second exogenous extracellular sensor then may bind to a transcription regulator binding site present on an exogenous or endogenous promoter in the cell which may include a hybrid promoter as contemplated herein.

Similarly in the disclosed systems and methods, the third exogenous extracellular sensor comprising the protease cleavage site and the fourth exogenous extracellular sensor comprising the protease may be present on the surface of a cell and the extracellular domains of the third and fourth exogenous extracellular sensor may bind to a ligand causing the third and fourth exogenous extracellular sensor to form a heterodimer (i.e., a tertiary complex comprising the third and fourth exogenous extracellular sensors and the ligand). As such, the extracellular domains of the third and fourth exogenous extracellular sensor promote formation of a heterodimer comprising the third and fourth exogenous extracellular sensors when the extracellular domains of the third and fourth exogenous extracellular sensor bind the ligand. When the extracellular domains promote formation of a heterodimer comprising the third and fourth exogenous extracellular sensors, the protease of the fourth exogenous extracellular sensor cleaves the protease cleavage site of the third exogenous extracellular sensor to release the functional domain comprising the transcription regulator of the third exogenous extracellular sensor. The transcription regulator of the function domain of the fourth exogenous extracellular sensor then may bind to a transcription regulator binding site present on an exogenous or endogenous promoter in the cell which may include a hybrid promoter as contemplated herein.

The disclosed systems and methods may include and/or employ an expression construct comprising a target gene (e.g., a reporter gene or therapeutic gene) operably linked to a promoter sequence which may be a hybrid promoter sequence, the hybrid promoter sequence comprising a minimal promoter (e.g., a minimal CMV promoter) for inducing transcription and further comprising interspaced transcription regulator binding sites upstream of the minimal promoter that bind two or more different transcription regulators present and released from the extracellular sensors when the extracellular sensor bind a respective ligand. Typically, the transcription regulator binding sites upstream of the minimal promoter of the expression vector comprise binding sites for the transcription regulator of the first extracellular sensor and binding sites for the transcription regulator of the third extracellular sensor. In some embodiments, expression of the target gene is effectuated and/or increased when the transcription regulator of the first extracellular sensor and the transcription regulator of the third extracellular sensor bind, typically simultaneously, to the interspaced transcription regulator binding sites upstream of the minimal promoter.

DETAILED DESCRIPTION

Figure 1:
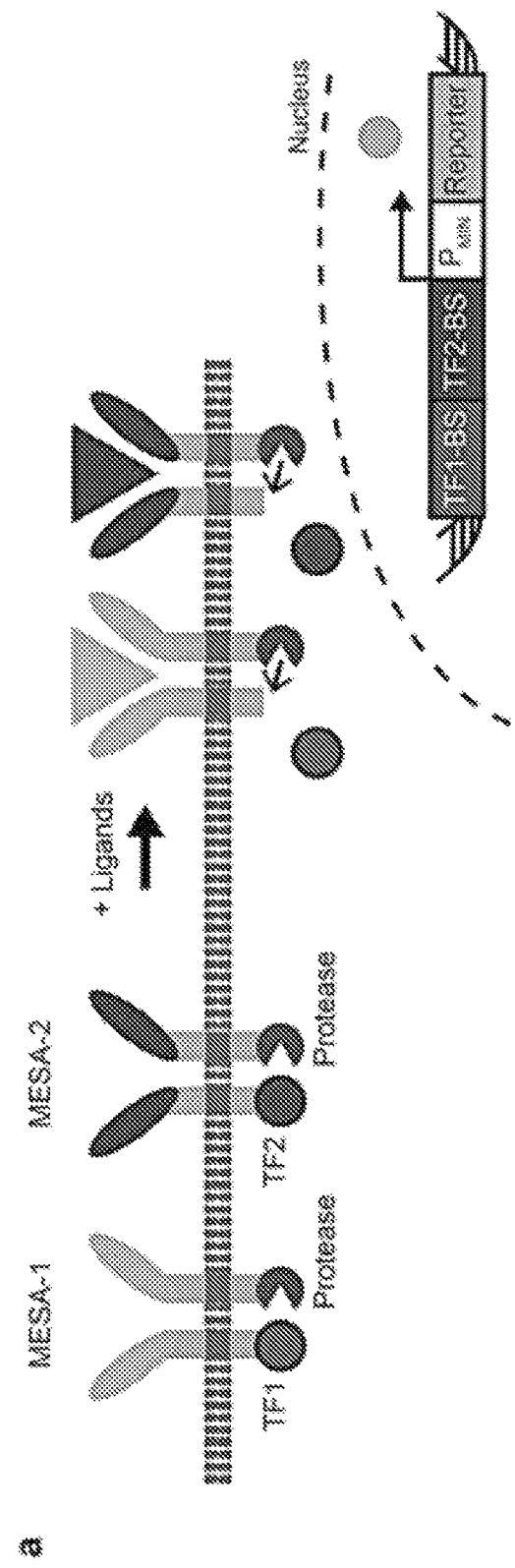
FIG. 1: Design and evaluation of hybrid reporters. (a) In a described strategy for multiplexing MESA, two receptors each sense a distinct ligand, undergo dimerization and enzymatic trans-cleavage, and release a transcription factor (TF1, TF2) that enters the nucleus and induces target gene expression. A hybrid promoter is regulated by both TF1 and TF2 to enable logical evaluation of the ligands. In the proposed single-layer transcriptional AND gate, the reporter is expressed if and only if both ligands (gray and black triangles) are sensed. (b) Hybrid promoters were designed using the modular TetO (red) and UAS (blue) binding domains for tTA and Gal4, respectively. Canonical single-TF promoters are illustrated for comparison. (c) Hybrid constructs were evaluated by cotransfection of plasmids (0.5 µg per plasmid) for constitutively expressed soluble tTA and Gal4 and quantification of reporter expression (fluorescence) by flow cytometry. Relative reporter expression was calculated independently for each promoter by dividing yellow fluorescent protein (YFP) mean fluorescence intensity (MFI) with either or both TFs by the MFI without TF. Experiments were conducted in biological triplicate, and error bars represent one standard deviation. (d) For three reporters from (b) termed H1, H2, and H3 as indicated, promoter activity was characterized across tTA and Gal4 plasmid dose combinations, and data were analyzed as in (c).

The present invention is described herein using several definitions, as set forth below and throughout the application.

Unless otherwise specified or indicated by context, the terms "a", "an", and "the" mean "one or more." For example, "a receptor," "ligand," and "complex" should be interpreted to mean "one or more receptors," "ligands," and "complexes," respectively.

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

As used herein, the terms "protein" or "polypeptide" or "peptide" may be used interchangeable to refer to a polymer of amino acids. Typically, a "polypeptide" or "protein" is defined as a longer polymer of amino acids, of a length typically of greater than 50, 60, 70, 80, 90, or 100 amino acids. A "peptide" is defined as a short polymer of amino acids, of a length typically of 50, 40, 30, 20 or less amino acids.

A "protein" as contemplated herein typically comprises a polymer of naturally or non-naturally occurring amino acids (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine). The proteins contemplated herein may be further modified in vitro or in vivo to include non-amino acid moieties. These modifications may include but are not limited to acylation (e.g., O-acylation (esters), N-acylation (amides), S-acylation (thioesters)), acetylation (e.g., the addition of an acetyl group, either at the N-terminus of the protein or at lysine residues), formylation lipoylation (e.g., attachment of a lipoate, a C8 functional group), myristoylation (e.g., attachment of myristate, a C14 saturated acid), palmitoylation (e.g., attachment of palmitate, a C16 saturated acid), alkylation (e.g., the addition of an alkyl group, such as an methyl at a lysine or arginine residue), isoprenylation or prenylation (e.g., the addition of an isoprenoid group such as farnesol or geranylgeraniol), amidation at C-terminus, glycosylation (e.g., the addition of a glycosyl group to either asparagine, hydroxylysine, serine, or threonine, resulting in a glycoprotein). Distinct from glycation, which is regarded as a non-enzymatic attachment of sugars, polysialylation (e.g., the addition of polysialic acid), glypiation (e.g., glycosylphosphatidylinositol (GPI) anchor formation, hydroxylation, iodination (e.g., of thyroid hormones), and phosphorylation (e.g., the addition of a phosphate group, usually to serine, tyrosine, threonine or histidine).

The term "amino acid residue" also may include amino acid residues contained in the group consisting of homocysteine, 2-Aminoadipic acid, N-Ethylasparagine, 3-Aminoadipic acid, Hydroxylysine, β-alanine, β-Amino-propionic acid, allo-Hydroxylysine acid, 2-Aminobutyric acid, 3-Hydroxyproline, 4-Aminobutyric acid, 4-Hydroxyproline, piperidinic acid, 6-Aminocaproic acid, Isodesmosine, 2-Aminoheptanoic acid, allo-Isoleucine, 2-Aminoisobutyric acid, N-Methylglycine, sarcosine, 3-Aminoisobutyric acid, N-Methylisoleucine, 2-Aminopimelic acid, 6-N-Methyllysine, 2,4-Diaminobutyric acid, N-Methylvaline, Desmosine, Norvaline, 2,2'-Diaminopimelic acid, Norleucine, 2,3-Diaminopropionic acid, Ornithine, and N-Ethylglycine.

The proteins disclosed herein may include "wild type" proteins and variants, mutants, and derivatives thereof. As used herein the term "wild type" is a term of the art understood by skilled persons and means the typical form of an organism, strain, gene or characteristic as it occurs in nature as distinguished from mutant or variant forms. As used herein, a "variant, "mutant," or "derivative" refers to a protein molecule having an amino acid sequence that differs from a reference protein or polypeptide molecule. A variant or mutant may have one or more insertions, deletions, or substitutions of an amino acid residue relative to a reference molecule. A variant or mutant may include a fragment of a reference molecule. For example, a mutant or variant molecule may one or more insertions, deletions, or substitution of at least one amino acid residue relative to a reference polypeptide.

Regarding proteins, a "deletion" refers to a change in the amino acid sequence that results in the absence of one or more amino acid residues. A deletion may remove at least 1, 2, 3, 4, 5, 10, 20, 50, 100, 200, or more amino acids residues. A deletion may include an internal deletion and/or a terminal deletion (e.g., an N-terminal truncation, a C-terminal truncation or both of a reference polypeptide). A "variant," "mutant," or "derivative" of a reference polypeptide sequence may include a deletion relative to the reference polypeptide sequence.

Regarding proteins, "fragment" is a portion of an amino acid sequence which is identical in sequence to but shorter in length than a reference sequence. A fragment may comprise up to the entire length of the reference sequence, minus at least one amino acid residue. For example, a fragment may comprise from 5 to 1000 contiguous amino acid residues of a reference polypeptide, respectively. In some embodiments, a fragment may comprise at least 5, 10, 15, 20, 25, 30, 40, 50, 60, 70, 80, 90, 100, 150, 250, or 500 contiguous amino acid residues of a reference polypeptide. Fragments may be preferentially selected from certain regions of a molecule. The term "at least a fragment" encompasses the full-length polypeptide. A fragment may include an N-terminal truncation, a C-terminal truncation, or both truncations relative to the full-length protein. A "variant," "mutant," or "derivative" of a reference polypeptide sequence may include a fragment of the reference polypeptide sequence.

Regarding proteins, the words "insertion" and "addition" refer to changes in an amino acid sequence resulting in the addition of one or more amino acid residues. An insertion or addition may refer to 1, 2, 3, 4, 5, 10, 20, 30, 40, 50, 60, 70, 80, 90, 100, 150, 200, or more amino acid residues. A "variant," "mutant," or "derivative" of a reference polypeptide sequence may include an insertion or addition relative to the reference polypeptide sequence. A variant of a protein may have N-terminal insertions, C-terminal insertions, internal insertions, or any combination of N-terminal insertions, C-terminal insertions, and internal insertions.

Regarding proteins, the phrases "percent identity" and "% identity," refer to the percentage of residue matches between at least two amino acid sequences aligned using a standardized algorithm. Methods of amino acid sequence alignment are well-known. Some alignment methods take into account conservative amino acid substitutions. Such conservative substitutions, explained in more detail below, generally preserve the charge and hydrophobicity at the site of substitution, thus preserving the structure (and therefore function) of the polypeptide. Percent identity for amino acid sequences may be determined as understood in the art. (See, e.g., U.S. Pat. No. 7,396,664, which is incorporated herein by reference in its entirety). A suite of commonly used and freely available sequence comparison algorithms is provided by the National Center for Biotechnology Information (NCBI) Basic Local Alignment Search Tool (BLAST), which is available from several sources, including the NCBI, Bethesda, Md., at its website. The BLAST software suite includes various sequence analysis programs including "blastp," that is used to align a known amino acid sequence with other amino acids sequences from a variety of databases.

Regarding proteins, percent identity may be measured over the length of an entire defined polypeptide sequence, for example, as defined by a particular SEQ ID number, or may be measured over a shorter length, for example, over the length of a fragment taken from a larger, defined polypeptide sequence, for instance, a fragment of at least 15, at least 20, at least 30, at least 40, at least 50, at least 70 or at least 150 contiguous residues. Such lengths are exemplary only, and it is understood that any fragment length supported by the sequences shown herein, in the tables, figures or Sequence Listing, may be used to describe a length over which percentage identity may be measured.

Regarding proteins, the amino acid sequences of variants, mutants, or derivatives as contemplated herein may include conservative amino acid substitutions relative to a reference amino acid sequence. For example, a variant, mutant, or derivative protein may include conservative amino acid substitutions relative to a reference molecule. "Conservative amino acid substitutions" are those substitutions that are a substitution of an amino acid for a different amino acid where the substitution is predicted to interfere least with the properties of the reference polypeptide. In other words, conservative amino acid substitutions substantially conserve the structure and the function of the reference polypeptide.

The following table provides a list of exemplary conservative amino acid substitutions which are contemplated herein:

| Original Residue | Conservative Susbtitution |
|---|---|
| Ala | Gly, Ser |
| Arg | His, Lys |
| Asn | Asp, Gln, His |
| Asp | Asn, Glu |
| Cys | Ala, Ser |
| Gln | Asn, Glu, His |
| Glu | Asp, Gla, His |
| Gly | Ala |
| His | Asn, Arg, Gln, Glu |
| Ile | Leu, Val |
| Leu | Ile, Val |
| Lys | Arg, Gln, Glu |
| Mei | Leu, Ile |
| Phe | His, Met, Leu, Trp, Tyr |
| Ser | Cys, Thr |
| Thr | Ser, Val |
| Trp | Phe, Tyr |
| Tyr | His, Phe, Trp |
| Val | Ile, Leu, Thr |

Conservative amino acid substitutions generally maintain (a) the structure of the polypeptide backbone in the area of the substitution, for example, as a beta sheet or alpha helical conformation, (b) the charge or hydrophobicity of the molecule at the site of the substitution, and/or (c) the bulk of the side chain. Non-conservative amino acids typically disrupt (a) the structure of the polypeptide backbone in the area of the substitution, for example, as a beta sheet or alpha helical conformation, (b) the charge or hydrophobicity of the molecule at the site of the substitution, and/or (c) the bulk of the side chain.

The disclosed proteins, mutants, variants, or described herein may have one or more functional or biological activities exhibited by a reference polypeptide (e.g., one or more functional or biological activities exhibited by wild-type protein).

The disclosed proteins may be substantially isolated or purified. The term "substantially isolated or purified" refers to proteins that are removed from their natural environment, and are at least 60% free, preferably at least 75% free, and more preferably at least 90% free, even more preferably at least 95% free from other components with which they are naturally associated.

Also disclosed herein are polynucleotides, for example polynucleotide sequences that encode proteins or polypeptides as disclosed herein. The terms "polynucleotide," "polynucleotide sequence," "nucleic acid" and "nucleic acid sequence" refer to a nucleotide, oligonucleotide, polynucleotide (which terms may be used interchangeably), or any fragment thereof. These phrases also refer to DNA or RNA of genomic, natural, or synthetic origin (which may be single-stranded or double-stranded and may represent the sense or the antisense strand).

Regarding polynucleotide sequences, the terms "percent identity" and "% identity" refer to the percentage of residue matches between at least two polynucleotide sequences aligned using a standardized algorithm. Such an algorithm may insert, in a standardized and reproducible way, gaps in the sequences being compared in order to optimize alignment between two sequences, and therefore achieve a more meaningful comparison of the two sequences. Percent identity for a nucleic acid sequence may be determined as understood in the art. (See, e.g., U.S. Pat. No. 7,396,664, which is incorporated herein by reference in its entirety). A suite of commonly used and freely available sequence comparison algorithms is provided by the National Center for Biotechnology Information (NCBI) Basic Local Alignment Search Tool (BLAST), which is available from several sources, including the NCBI, Bethesda, Md., at its website. The BLAST software suite includes various sequence analysis programs including "blastn," that is used to align a known polynucleotide sequence with other polynucleotide sequences from a variety of databases. Also available is a tool called "BLAST 2 Sequences" that is used for direct pairwise comparison of two nucleotide sequences. "BLAST 2 Sequences" can be accessed and used interactively at the NCBI website. The "BLAST 2 Sequences" tool can be used for both blastn and blastp (discussed above).

Regarding polynucleotide sequences, percent identity may be measured over the length of an entire defined polynucleotide sequence, for example, as defined by a particular SEQ ID number, or may be measured over a shorter length, for example, over the length of a fragment taken from a larger, defined sequence, for instance, a fragment of at least 20, at least 30, at least 40, at least 50, at least 70, at least 100, or at least 200 contiguous nucleotides. Such lengths are exemplary only, and it is understood that any fragment length supported by the sequences shown herein, in the tables, figures, or Sequence Listing, may be used to describe a length over which percentage identity may be measured.

Regarding polynucleotide sequences, "variant," "mutant," or "derivative" may be defined as a nucleic acid sequence having at least 50% sequence identity to the particular nucleic acid sequence over a certain length of one of the nucleic acid sequences using blastn with the "BLAST 2 Sequences" tool available at the National Center for Biotechnology Information's website. (See Tatiana A. Tatusova, Thomas L. Madden (1999), "Blast 2 sequences—a new tool for comparing protein and nucleotide sequences", FEMS Microbiol Lett. 174:247-250). Such a pair of nucleic acids may show, for example, at least 60%, at least 70%, at least 80%, at least 85%, at least 90%, at least 91%, at least 92%, at least 93%, at least 94%, at least 95%, at least 96%, at least 97%, at least 98%, or at least 99% or greater sequence identity over a certain defined length.

Nucleic acid sequences that do not show a high degree of identity may nevertheless encode similar amino acid sequences due to the degeneracy of the genetic code where multiple codons may encode for a single amino acid. It is understood that changes in a nucleic acid sequence can be made using this degeneracy to produce multiple nucleic acid sequences that all encode substantially the same protein. For example, polynucleotide sequences as contemplated herein may encode a protein and may be codon-optimized for expression in a particular host. In the art, codon usage frequency tables have been prepared for a number of host organisms including humans, mouse, rat, pig, E. coli, plants, and other host cells.

A "recombinant nucleic acid" is a sequence that is not naturally occurring or has a sequence that is made by an artificial combination of two or more otherwise separated segments of sequence. This artificial combination is often accomplished by chemical synthesis or, more commonly, by the artificial manipulation of isolated segments of nucleic acids, e.g., by genetic engineering techniques known in the art. The term recombinant includes nucleic acids that have been altered solely by addition, substitution, or deletion of a portion of the nucleic acid. Frequently, a recombinant nucleic acid may include a nucleic acid sequence operably linked to a promoter sequence. Such a recombinant nucleic acid may be part of a vector that is used, for example, to transform a cell.

The nucleic acids disclosed herein may be "substantially isolated or purified." The term "substantially isolated or purified" refers to a nucleic acid that is removed from its natural environment, and is at least 60% free, preferably at least 75% free, and more preferably at least 90% free, even more preferably at least 95% free from other components with which it is naturally associated.

"Transformation" or "transfected" describes a process by which exogenous nucleic acid (e.g., DNA or RNA) is introduced into a recipient cell. Transformation or transfection may occur under natural or artificial conditions according to various methods well known in the art, and may rely on any known method for the insertion of foreign nucleic acid sequences into a prokaryotic or eukaryotic host cell. The method for transformation or transfection is selected based on the type of host cell being transformed and may include, but is not limited to, bacteriophage or viral infection or non-viral delivery. Methods of non-viral delivery of nucleic acids include lipofection, nucleofection, microinjection, electroporation, heat shock, particle bombardment, biolistics, virosomes, liposomes, immunoliposomes, polycation or lipid:nucleic acid conjugates, naked DNA, artificial virions, and agent-enhanced uptake of DNA. Lipofection is described in e.g., U.S. Pat. Nos. 5,049,386, 4,946,787; and 4,897,355) and lipofection reagents are sold commercially (e.g., Transfectam™ and Lipofectin™). Cationic and neutral lipids that are suitable for efficient receptor-recognition lipofection of polynucleotides include those of Felgner, WO 91/17424; WO 91/16024. Delivery can be to cells (e.g. in vitro or ex vivo administration) or target tissues (e.g. in vivo administration). The term "transformed cells" or "transfected cells" includes stably transformed or transfected cells in which the inserted DNA is capable of replication either as an autonomously replicating plasmid or as part of the host chromosome, as well as transiently transformed or transfected cells which express the inserted DNA or RNA for limited periods of time.

The polynucleotide sequences contemplated herein may be present in expression vectors. For example, the vectors may comprise: (a) a polynucleotide encoding an ORF of a protein; (b) a polynucleotide that expresses an RNA that directs RNA-mediated binding, nicking, and/or cleaving of a target DNA sequence; and both (a) and (b). The polynucleotide present in the vector may be operably linked to a prokaryotic or eukaryotic promoter. "Operably linked" refers to the situation in which a first nucleic acid sequence is placed in a functional relationship with a second nucleic acid sequence. For instance, a promoter is operably linked to a coding sequence if the promoter affects the transcription or expression of the coding sequence. Operably linked DNA sequences may be in close proximity or contiguous and, where necessary to join two protein coding regions, in the same reading frame. Vectors contemplated herein may comprise a heterologous promoter (e.g., a eukaryotic or prokaryotic promoter) operably linked to a polynucleotide that encodes a protein. A "heterologous promoter" refers to a promoter that is not the native or endogenous promoter for the protein or RNA that is being expressed.

As used herein, "expression" refers to the process by which a polynucleotide is transcribed from a DNA template (such as into and mRNA or other RNA transcript) and/or the process by which a transcribed mRNA is subsequently translated into peptides, polypeptides, or proteins. Transcripts and encoded polypeptides may be collectively referred to as "gene product." If the polynucleotide is derived from genomic DNA, expression may include splicing of the mRNA in a eukaryotic cell.

The term "vector" refers to some means by which nucleic acid (e.g., DNA) can be introduced into a host organism or host tissue. There are various types of vectors including plasmid vector, bacteriophage vectors, cosmid vectors, bacterial vectors, and viral vectors. As used herein, a "vector" may refers to a recombinant nucleic acid that has been engineered to express a heterologous polypeptide (e.g., the fusion proteins disclosed herein). The recombinant nucleic acid typically includes cis-acting elements for expression of the heterologous polypeptide.

Any of the conventional vectors used for expression in eukaryotic cells may be used for directly introducing DNA into a subject. Expression vectors containing regulatory elements from eukaryotic viruses may be used in eukaryotic expression vectors (e.g., vectors containing SV40, CMV, or retroviral promoters or enhancers). Exemplary vectors include those that express proteins under the direction of such promoters as the SV40 early promoter, SV40 later promoter, metallothionein promoter, human cytomegalovirus promoter, murine mammary tumor virus promoter, and Rous sarcoma virus promoter. Expression vectors as contemplated herein may include eukaryotic or prokaryotic control sequences that modulate expression of a heterologous protein (e.g. the fusion protein disclosed herein).

The presently disclosed methods may include delivering one or more polynucleotides, such as or one or more vectors as described herein and/or one or proteins transcribed therefrom, to a host cell. Further contemplated are host cells produced by such methods, and organisms (such as animals, plants, or fungi) comprising or produced from such cells. Conventional viral and non-viral based gene transfer methods can be used to introduce nucleic acids in mammalian cells or target tissues. Non-viral vector delivery systems include DNA plasmids, RNA (e.g. a transcript of a vector described herein), naked nucleic acid, and nucleic acid complexed with a delivery vehicle, such as a liposome. Viral vector delivery systems include DNA and RNA viruses, which have either episomal or integrated genomes after delivery to the cell.

In the methods contemplated herein, a host cell may be transiently or non-transiently transfected (i.e., stably transfected) with one or more vectors described herein. In some embodiments, a cell is transfected as it naturally occurs in a subject (i.e., in situ). In some embodiments, a cell that is transfected is taken from a subject (i.e., explanted). In some embodiments, the cell is derived from cells taken from a subject, such as a cell line. Suitable cells may include stem cells (e.g., embryonic stem cells and pluripotent stem cells). A cell transfected with one or more vectors described herein may be used to establish a new cell line comprising one or more vector-derived sequences. In the methods contemplated herein, a cell may be transiently transfected with the components of a system as described herein (such as by transient transfection of one or more vectors, or transfection with RNA), and modified through the activity of a complex, in order to establish a new cell line comprising cells containing the modification but lacking any other exogenous sequence.

Modular Extracellular Sensor Architecture

The disclosed subject matter relates to integrated "Modular Extracellular Sensor Architecture" (MESA). MESA technology is known in the art. (See e.g., Rachel M. Dudek, Ph.D. Dissertation entitled "Engineering Multiparametric Evaluation of Environmental Cues by Mammalian Cell-based Devices," Northwestern University, August 2015; Daringer et al., "Modular Extracellular Sensor Architecture for Engineering Mammalian Cell-based Devices," Nichole M. Daringer, Rachel M. Dudek, Kelly A. Schwarz, and Josh N. Leonard, ACS Synth. Biol. 2014, 3, 892-902, published Feb. 25, 2014; and international publication WO 2013/022739, published on Feb. 14, 2013; the contents of which are incorporated herein by reference in their entireties).

MESA systems typically include a pair of extracellular receptors where both receptors of the pair contain a ligand binding domain and transmembrane domain, and one receptor contains a protease cleavage site and a functional domain (e.g., transcription regulator such as a transcription regulator that promotes transcription or a transcription regulator that inhibits transcription) and the other receptor contains a protease domain. As used herein, a transcription regulator may include a transcription factor that promotes transcription (e.g., by recruiting additional cellular components for transcription) and/or a transcription inhibitor or transcription repressor).

MESA technology and the presently disclosed advancement may be utilized for building living cell-based biosensors. In certain embodiments, MESA technology and the presently disclosed advancement comprise engineered receptor proteins that can detect extracellular ligands (e.g., such as cytokines or other large macromolecules) and transduce this information across the cell membrane to release an engineered transcription regulator that drives the expression of an engineered gene. This sensing modality is novel in that it does not require the utilization of any native protein-protein interactions for signal transduction (i.e., it can be fully "orthogonal"), and thus it is not susceptible to native regulatory mechanisms.

MESA technology and the presently disclosed advancement have a wide variety of uses including in vitro laboratory assays (e.g., to detect/quantify specific analytes), as powerful new experimental tools for studying in vivo animal models (e.g., wherein engineered cell-based biosensors could be adoptively transferred, generated from transplanted bone marrow, or genetically engineered in a transgenic animal), and as human therapeutics (e.g., for augmenting the functionality of engineered cell-based therapies). MESA technology and the presently disclosed advancement could also be adapted to function in other cell types, such as insect cells or microbes (e.g., yeast) to create cell-based biosensors for a variety of applications.

In certain embodiments of MESA technology and the presently disclosed advancement where two receptors are employed, the general mode of action is that ligand binding induces the aggregation of two or more MESA receptors, bringing an intracellular protease domain (PR) into proximity with a cognate intracellular protease cleavage site (PCS), and upon cleavage of the PCS by PR, a transcription factor (TF) or other functional domain (e.g., a transcription inhibitor) is released from the MESA receptor at the cell membrane to carry out its function (e.g., a TF may localize to the nucleus to induce gene expression). One implementation of this architecture would be a heterodimerization- (or heteromultimerization-) based signaling mechanism. In this system, one engineered receptor chain contains the PR and the other engineered receptor chain contains the PCS-TF domain. Other implementations include, for example, a homodimerization- (or homomultimerization-) based mechanism in which each MESA chain contains both PR and PCS-TF domains, but the receptor is engineered such that cleavage may occur in trans, but not in cis (i.e., one chain may not release its own TF).

A general implementation of one embodiment of MESA technology and the presently disclosed advancement is as follows: receptors are designed, DNA sequences encoding these receptors are generated (by molecular biology and/or DNA synthesis) and inserted into a suitable expression vector (such as a plasmid or a viral gene delivery system), the expression vector is transfected or transduced into a suitable cell line or stock of primary cells (together with a suitable reporter construct, which expresses a reporter gene in response to nuclear-localized TF), ligand is added to the cell culture medium, and induced reporter gene expression is quantified by suitable means.

In certain embodiments, MESA technology and the presently disclosed advancement provide: i) a cell-based biosensor for detecting a natural analyte of interest in vitro; ii) a cell-based biosensor for detecting a natural analyte of interest in vivo; iii) a cell-based biosensor for in vitro detection of a natural analyte for which no natural receptor exists; iv) a cell-based biosensor for in vivo detection of a natural analyte for which no natural receptor exists; v) a cell-based biosensor for in vitro detection of an engineered analyte for which no natural receptor exists.

In some embodiments, MESA technology and the presently disclosed advancement provide: i) an approach where a pair of MESA receptors are engineered with ligand-binding domains that recognize a specific peptide, and then a polypeptide ligand is engineered to include two or more copies of the target peptide; ii) a cell-based biosensor for detecting a specific pattern of multiple analytes of interest (e.g., by coupling MESA receptors to engineered gene circuits to enable signal processing) in vitro; iii) a cell-based biosensor for detecting a specific pattern of multiple analytes of interest (e.g., by coupling MESA receptors to engineered gene circuits to enable signal processing) in vivo; iv) a cell-based biosensor coupled to expression of a gene that enables in vivo imaging (e.g., by MRI) for diagnostic purposes; v) a cell-based biosensor coupled to expression of a therapeutic agent to create targeted cellular therapies, which may be used to treat cancer, autoimmune disease, and other diseases; vi) a multicellular network using synthetic intercellular communication (e.g., engineering some cells to express MESA receptors and others to secrete MESA ligands), with applications including: scientific investigation of biological processes including development, immune function, wound healing, etc., cell & tissue-based products for applications including tissue engineering, regenerative medicine, immune therapy, transplantation medicine, cellular therapies and the like.

In additional embodiments, MESA technology and the presently disclosed advancement provide: i) synthetic multicellular networks for engineering customized multicellular organisms; ii) cell-based biosensor for in vivo detection of an engineered analyte for which no natural receptor exists. One example of this approach would be to pair MESA receptors engineered with ligand-binding domains that recognize a specific peptide, and then engineer a polypeptide ligand that includes two or more copies of the target peptide.

In some embodiments, MESA technology and the presently disclosed advancement provide all-in-one receptors. For example, in such embodiments, the protease, protease target sequence, and released functional domain (e.g., a transcription factor or transcription inhibitor or repressor) are encoded on a single polypeptide chain. For example, such a chain may be engineered such that the protease does not cleave its target in cis, but upon the binding of two or more MESA chains to the target ligand, the protease on one chain cleaves the protease target sequence on another MESA chain (in trans) within the receptor-ligand complex, thus releasing the functional domain.

All MESA receptors can be modified in order to optimize specific receptor properties. Modifications include, for example, the following: i) varying the length of ISP (on either MESA chain) to include, for example, between 0-20, 0-50, or 0-150 (e.g., 0 . . . 5 . . . 50 . . . 100 . . . 130 . . . or 150) non-structured amino-acid residues (e.g., glycines or alternating glycine-serine residues); ii) varying the predicted mechanical properties of ISP (on either MESA chain) by replacing non-structured amino acids with structured subdomains (e.g., an alpha-helical domain); iii) including an ESP domain (either structured or unstructured, of lengths between 0-20 or 0-50 or 0-150 amino acids). Structured domains may include, for example, an immunoglobulin motif, (e.g., for presentation of LB domains that are derived from antibody fragments at a certain distance away from the cell surface); altering the sequence of the PCS to enhance or inhibit the rate of PR-mediated cleavage; or varying the combinations of ER-A and ER-B chains uses to constitute a complete MESA receptor system. The transmembrane domain may be derived from either natural or synthetic sequences in order to modulate the kinetics or geometry with which MESA chains associate in the presence or absence of ligand.

MESA variants may use, for example, ligand-binding domain interactions including: i) using an antibody (or a fragment thereof) to bind to the target ligand; ii) implementation in a homodimeric MESA receptor (both antibody fragments are identical and bind to identical sites on a polyvalent ligand, such as a homodimeric cytokine); iii) implementation in a heterodimeric MESA receptor (e.g., each MESA chain incorporates a distinct antibody fragment, such that a monovalent ligand can still induce MESA receptor dimerization or multimerization); iv) incorporating a modular protein-peptide interaction that is not from a receptor ligand system (e.g., conserved protein motifs such as SH3, PDZ, and GBD domains bind distinct and unique consensus peptide motifs) to create an engineered MESA receptor-ligand system.

In certain embodiments, the released functional domain on a MESA receptor (ER-A) is replaced with another functional domain, such as a catalytic domain (whose activity requires cleavage-mediated release), a separate protease domain (whose activity requires cleavage-mediated release), a DNA-binding domain (e.g., zinc-finger or TAL Effector-based domains) coupled to a functional domain (e.g., an endonuclease, a chromatin modifying enzyme such as the Krueppel-associated box or KRAB protein, or other enzymes or cofactor-recruiting domains). In particular embodiments, modification of the MESA system to detect intracellular analytes, such that intracellular versions of the MESA receptors may be: ER-A could contain LB-ISP-PCS-TF domains and its cognate MESA receptor (ER-B) could contain LB-ISP-PR domains. Ligand-binding by the two chains would again enable protease-mediated cleavage and release of a functional domain (such as transcription factor, TF).

MESA technology and the presently disclosed advancement may be configured for use in multiple cellular contexts for applications in basic science, biotechnology, and medicine (including both diagnostics and therapeutics). MESA biosensors and the disclosed improvements (e.g., implemented in mammalian cells) would have a wide variety of potential uses including in vitro laboratory assays (e.g., to detect/quantify specific analytes), as powerful new experimental tools for studying in vivo animal models (e.g., engineered cell-based biosensors could be adoptively transferred, generated from transplanted bone marrow, or genetically engineered in a transgenic animal to monitor extracellular species in real time in living animals), and potentially as human therapeutics (e.g., for engineering cell-based therapies that probe their environment and deliver a therapeutic payload only at desirable locations). This powerful synthetic biology technology may also be adapted to function in other cell types, such as insect cells or microbes (e.g., yeast) to create cell-based biosensors for applications in biotechnology.

In MESA technology and the presently disclosed advancement each engineered receptor (ER) of a receptor pair is composed of two chains, each of which is a type I transmembrane protein. The alpha chain (ER-A) may be fused at its C-terminus to an engineered transcription factor (TF), bridged by a peptide harboring a TEV protease cleavage site (PCS). The beta chain (ER-B) may be fused at its C-terminus to the TEV protease (PR). Other domains include ligand-binding domains (LB), extracellular spacers (ESP), intracellular spacers (ISP) (e.g., which may be absent or a short length), and transmembrane domains (TM). In such embodiments, the binding of ER-A and ER-B to a ligand may lead to receptor oligomerization and PR-mediated cleavage and release of TF. This strategy is suitable for recognition of any ligand possessing more than one domain that may be recognized by a LB domain, as described in detail below. Modular receptor construction is intrinsic MESA technology and the presently disclosed advancement, since receptor design may, in certain embodiments, require adjustment for each receptor-ligand combination. Domain junctions may be engineered by introducing unique restriction sites to facilitate exchange.

MESA technology and the presently disclosed advancement may rely upon the formation of heteromeric complexes. In alternative embodiments, each chain may include both PR and TF domains separated by a PCS and oriented such that each PR domain cleaves in trans but not in cis (i.e., PR cleaves neighboring receptors upon ligand binding-induced aggregation).

In some embodiments, the presently disclosed systems provide cell-based biosensors that perform multifactorial logical evaluation of extracellular signals using the MESA receptors described herein, which transduce extracellular cues into synthetic pathways. Such pathways may be constructed into genetic circuit architectures that can process information in useful ways. For example, one may engineer cells to perform multifactorial evaluations of extracellular inputs using Boolean logic, which is a strategy that has been implemented to date using intracellular sensors. Successful implementation of this strategy using extracellular inputs is an important step toward building mammalian cell-based sensors that interface with natural systems in vivo. For example, initially, three representative types of circuits may be constructed such as "OR", "NOT IF", and "AND" gate genetic circuits. Transcriptional control may be implemented using systems known in the art and described herein.

In particular, one may investigate the following circuit architectures, each of which would be useful for probing immune function: an OR gate that reports in response to either IL-10 or VEGF (i.e., a general sensor for immunosuppressive signals), a NOT IF gate that reports in response to IL-10 but only when IL-12 is absent (i.e., a sensor for uniformly immunosuppressive signals), and an AND gate that reports only in response to IL-10 and VEGF (i.e., a sensor specific for multimodal immunosuppressive signals). After characterizing the qualitative behavior of these circuits, one may also characterize the quantitative function of these circuits. These investigations may be facilitated by choice of engineered transcription factors, since the efficiency of intracellular signal transduction may be modulated experimentally by adding antibiotic to the culture medium. Plasmid doses may also be varied to modulate the level of engineered receptor expression. Using these tunable parameters, one may determine the sensitivity of these circuits to various input combinations and strengths (concentrations) and characterize the resulting transfer functions (quantitative relationships between inputs and outputs). In some embodiments, logic gates having multiple inputs may be generated where one input is a ligand as described herein, and the other input is a physiological state (e.g., hypoxia) that effects a response. For example, where the input is the physiological state of hypoxia, a hypoxia-responsive protein/promoter may be used to regulate part of the signaling downstream of MESA, such that the output gene is expressed only under conditions of hypoxia AND in the presence of the ligand for the MESA receptor.

One may also evaluate the dynamic responses of these circuits when extracellular inputs are removed from the system (e.g., by replacing the culture medium). To facilitate these analyses, one may use computational mathematical modeling, as has previously been done for other intracellular genetic circuits. An important extension may be developing systems for stably expressing these circuits and characterizing their performance under these expression conditions. One may need to evaluate the influence of expression on circuit performance, stability, and variability. Strategies for coping with these challenges include expressing both receptor chains (ER-A and ER-B) from a single multicistronic vector, which reduces the number of vectors required. Bicistronic expression would suffice for implementing even the relatively more complicated "AND" gate.

In certain embodiments, MESA technology and the presently disclosed advancement described herein are implemented in mammalian cells, and are employed in any suitable use, such as in vitro laboratory assays (e.g., to detect/quantify specific analytes), as powerful experimental tools for studying in vivo animal models (e.g., engineered cell-based biosensors could be adoptively transferred, generated from transplanted bone marrow, or genetically engineered in a transgenic animal to monitor extracellular species in real time in living animals), and as human therapeutics (e.g., for engineering cell-based therapies that probe their environment and delivery a therapeutic payload only at desirable locations). In other embodiments, MESA technology and the presently disclosed advancement are employed with other cell types, such as insect cells or microbes (e.g., yeast) to create cell-based biosensors for applications in biotechnology.

Any type of suitable ligand binding domain (LB) can be employed with the receptors of MESA technology and the presently disclosed advancement. Ligand binding domains can, for example, be derived from either an existing receptor ligand-binding domain or from an engineered ligand binding domain. Existing ligand-binding domains could come, for example, from cytokine receptors, chemokine receptors, innate immune receptors (TLRs, etc.), olfactory receptors, steroid and hormone receptors, growth factor receptors, mutant receptors that occur in cancer, neurotransmitter receptors. Engineered ligand-binding domains can be, for example, single-chain antibodies (see scFv constructs discussion below), engineered fibronectin based binding proteins, and engineered consensus-derived binding proteins (e.g., based upon leucine-rich repeats or ankyrin-rich repeats, such as DARPins).

Any suitable extracellular space (ESP) can be used with the receptors of MESA technology and the presently disclosed advancement. In certain embodiments, the ESP is from 0-30 amino acids long (e.g., 1 . . . 5 . . . 15 . . . 25 . . . or 30), where each amino acid can be, for example, any of the 20 naturally occurring amino acids. In certain embodiments, ESP can be nonstructured or comprised partially or entirely of amino acids predicted to fold into a secondary structure (i.e., an alpha helix) or a tertiary structure. ESP sequences flanking the TM domain may be selected to adjust the stability of the TM in the membrane (i.e., adding a polar or charged residue to ESP next to TM should make it more difficult for that amino acid to be pulled into the membrane).

Any suitable transmembrane domain (TM) can be used with the receptors of MESA technology and the presently disclosed advancement. In certain embodiments, the TM is, for example, a TM domain taken from an existing receptor (e.g., TLR4, CD28, etc.) or engineered using a novel sequence, for example using TM consensus sequence features.

Any suitable intracellular spacer (ISP) can be used with the receptors of MESA technology and the presently disclosed advancement. In particular embodiments, no ISP is present. In certain embodiments, the ISP is, for example, 0-30 amino acids long (e.g., 1, 2, 3, 4, 5, 6, . . . 15 . . . 25 . . . or 30 amino acids) where each amino acid can be, for example, any of the 20 naturally occurring amino acids. ISP can be, for example, nonstructured or comprised partially or entirely of amino acids predicted to fold into a secondary structure (i.e., an alpha helix) or a tertiary structure. ISP sequences flanking the TM domain may be selected to adjust the stability of the TM in the membrane (i.e., adding a polar or charged residue to ESP next to TM should make it more difficult for that amino acid to be pulled into the membrane).

Any suitable protease cleavage sequence may be employed with the receptors of MESA technology and the presently disclosed advancement. In certain embodiments, the PCSs, for example, are varied by mutating the amino acid at the P1' position, for example, to any of the 20 amino acids or by introducing 1 or more mutations into the rest of the PCS, e.g., to modify kinetic parameters governing PCS cleavage.

MESA technology and the presently disclosed advancement are not limited to any particular protease or corresponding protease cleavage site. In some embodiments, the protease and cleavage site are from a virus. For example, in certain embodiments, the protease and protease cleavage site are from a virus selected from: tobacco etch virus (TEV), a chymotrypsin-like serine protease and corresponding cleavage sites, alphavirus proteases and cleavage sites, Hepatitis C virus proteases (e.g., N S3 proteases) and corresponding cleavage sites, chymotrypsin-like cysteine proteases and corresponding cleavage sites, papain-like cysteine proteases and cleavage sites, picornavirus leader proteases and cleavage sites, HIV proteases and cleavage sites, Herpesvirus proteases and cleavage sites, and adenovirus proteases and cleavage sites (see, Tong, Chem. Rev. 2002, 102, 4609-4626, herein incorporated by reference in its entirety). In particular embodiments, the proteases and cleavage sites are bacterial in original, such as, for example, from *Streptomyces griseus* protease A (SGPA), SGPB, and alpha-lytic protease and corresponding cleavage sites. In some embodiments, the proteases and cleavage sites are mammalian. For example, the proteases could be one of the five major classes of proteases known in mammals which include serine proteases, cycteine proteases, metallo proteases, aspartic proteases, and thereonine proteases (see, e.g., Turk et al., The EMBO Journal, 2012, 31, 1630-1643; Lopez-Otin and Overall, 2002, Nat. Rev. Mol. Cell Biol., 2:509-519; Overall and Blobel, 2007, Nat. Rev. Mol. Cell Biol., 8: 245-257; and Lopez-Otin and Bond, 2008, J. Biol. Chem., 283:30422-30437, all of which are herein incorporated in their entireties by references.

In certain embodiments, receptors for MESA technology and the presently disclosed advancement may be designed using engineered ligand binding domains based upon single chain antibody variable fragments (scFv). The loop linking heavy and light chain-derived fragments of an scFv may be designed (both in length and sequence) to favor monomeric scFvs, dimeric scFvs, trimeric scFvs, etc. Loop length may be, for example, 0-30 amino acids long, where each amino acid may be, for example, any of the 20 naturally occurring amino acids. One may select a loop to favor scFvs or to favor homomultimeric scFvs. ScFv may be engineered, for example, from isolated antibody, BCR, or TCR sequences, or they may be isolated from a random library, such as phage-display, bacterial-display, or yeast-display. In other embodiments, receptors for MESA technology and the presently disclosed advancement may be designed using engineered ligand binding domains based upon camelid antibody analog termed a "nanobody."

In certain embodiments, an "all in one receptor" approach is employed in MESA technology and the presently disclosed advancement. For example, a two chain scheme (TC+PC) may be varied such that all components are included on a single chain, and ligand binding-induced homodimerization induces signaling. For example, a receptor may include both ISP1 and ISP2, which could be optimized in length (e.g., 0-30 amino acids) and composition (e.g., any of the 20 naturally occurring amino acids at any position) to optimize receptor performance.

In certain embodiments, directed evolution could be used to optimize performance characteristics of receptors including, for example: low background signaling, enhanced signal-to-noise ratio, enhanced sensitivity for low ligand concentrations, and enhanced dynamic range (differential responsiveness over a wider range of ligand concentrations). Directed evolution could be performed, for example, by a scheme in which (a) a library of genetic variants upon an initial receptor design are created (b) each variant is expressed in a separate cell (c) this pool of cells is exposed to a functional screen to either eliminate cells (and therefore receptor variants) exhibiting undesirable activity or retain cells (and therefore receptor variants) that exhibit some desirable activity. This process could be repeated to enrich for variants with desirable properties. A variation upon this method would be to isolate variants in this fashion after 1 or more rounds of enrichment, introduce additional genetic diversity into this library, and return to the cell-based screening; this could be repeated for multiple rounds until the pool or individual constructs within the pool exhibit properties that meet some threshold for considering it a success. In some embodiments, one could (a) generate a library of DNA sequences encoding MESA variants using error-prone PCR or other molecular biology techniques to incorporate chemically synthesized DNA oligonucleotides including variation at defined positions; variation could be introduced at ISP, PCS, PR, TM, ESP, LB, or combinations of these sites, (b) each variant could be cloned into an expression vector based upon adeno-associated virus (AAV), viral vectors could be packaged by standard techniques, and AAV vectors could be used to transduce cells at a ratio of viruses to cells such that each cell expresses only one variant of the MESA library, and then (c) this pool of cells that expresses the MESA library (one variant per cell) could be used for cell-based assays; for example, cells could be transfected or transduced with a reporter construct that reads out MESA signaling by inducing expression of a fluorescent protein, and then the MESA pool of reporter-bearing cells could be sorted using fluorescence assisted cell sorting (FACS) based upon whether the reporter construct is induced or not when exposed to zero ligand or some finite quantity of ligand.

Integration of Engineered Modular Extracellular Sensor Architecture (MESA) Receptors and Engineered Promoters to Implement Customized Cellular Function The disclosed subject matter relates to systems of extracellular receptors (or sensors) that are configured as Modular Extracellular Sensor Architecture (MESA). Although MESA technology is known in the art, here the inventors have developed a technology that enables multiplexing of engineered MESA receptors to generate higher order logical evaluation. As an initial evaluation of the potential for multiplexing MESA receptors, the inventors developed a novel single-layer transcriptional 'AND' gate promoter architecture, which when coupled to these MESA receptors, conferred the desired logical evaluation of extracellular ligands. This design-driven approach thus demonstrates the potential to incorporate such engineered receptors into customized functional programs for applications in medicine and fundamental research.

The applications of the technology of this example may include but are not limited to: safer and more effective engineered cell-based therapeutics such as cells that sense combinations of molecules in their environment and respond via release of a programmed output (e.g., custom-engineered immune cells that release therapeutic biomolecules only in the vicinity of multiple tumor-associated antigens); and functional integration of engineered receptors with alternative logical evaluation such as cells that can be tuned to match reporter inputs to biosensor outputs (impedance matching) to develop alternative cellular logic.

To the inventors' knowledge, this is the first instance of developing a hybrid promoter which is transcriptionally activated exclusively in the presence of two distinct engineered transcription factors. Logic gates with engineered receptors have been developed previously, but this is the first connecting the detection of multiple, soluble cues, to a user-defined output, and moreover this is the first to do so using a scheme that we describe as a single-layer transcriptional 'AND' gate. Functional integration of engineered receptors with engineer promoters is difficult. The present inventors have developed a general workflow to "impedance match" the output of engineered (MESA) receptors to the inputs of engineered promoters.

The disclosed technology relates to a general platform by which the Modular Extracellular Sensor Architecture (MESA) can be multiplexed for a wide range of applications. MESA is a self-contained, modular signaling platform by which the presence of an extracellular, soluble cue or ligand, induces clustering of MESA chains on the cell surface, trans cleavage, and release of a previously sequestered protein, such as a transcription factor. To evaluate if MESA receptors could be multiplexed, the inventors developed a simple, but non-trivial, 'AND' gate. The inventors designed and evaluated a series of novel hybrid promoter constructs composed of interspaced binding domains for two transcription factors, tTA and a fusion protein comprising Gal4 and VP16 (Gal4-VP16). Several of these promoter constructs exhibited 'AND' logic in the presence of soluble transcription factors, and were carried forward for future evaluation in the presence of MESA. As it is well known in the field of circuit design that all components much be 'impedance matched', such that the output of one component matches the input of downstream components, although no general strategy for doing so across various systems exists; thus, the inventors first developed a strategy to independently tune MESA expression levels to match the required inputs for each hybrid promoter. Finally, utilizing these expression levels, the inventors determined that MESA exhibited the proposed 'AND' logic. By adjusting the MESA tuning strategy in the presence of other outputs of interest, the inventors anticipate that other instances of cellular logic could be developed using a similar strategy.

In developing the disclosed technology, the inventors have developed a series of hybrid promoter constructs capable of being utilized to multiplex MESA receptors. These hybrid promoters are composed of interspaced transcription factor binding sites upstream of a minimal CMV promoter and YFP reporter gene, and to the inventors' knowledge, this is the first time anyone had attempted to build an engineered reporter construct utilizing such a design. The inventors chose to develop these promoters using the well-studied engineered transcription factors tTA and Gal4-VP16), which naturally drive robust gene expression from repeated DNA motifs. The inventors initially screened these hybrid reporters in the presence of tTA and Gal4-VP16), both individually and in combination, and found several exhibiting 'AND' behavior (i.e. highest reporter activation when both tTA and Gal4-VP16) were present).

Next, to evaluate the ability to utilize these constructs to multiplex MESA, the inventors modified the MESA receptors to release two distinct transcription factors (tTA and Gal4-VP16)). In order to appropriately match the amount of engineered transcription factor released from MESA to the required inputs for the hybrid promoter, termed 'impedance matching', the inventors first independently tuned the expression level for each MESA, in the presence of a given hybrid promoter. Using the expression levels that the inventors identified, the inventors investigated whether MESA could be multiplexed such that activation of the hybrid reporter was only observed when both MESA-ligands were present. The inventors found one reporter construct that exhibited 'AND' logic across several MESA doses. This success highlights the ability of the inventors' general approach to multiplex MESA receptors using hybrid reporter constructs.

Many intracellular gene circuits have been developed for mammalian cells; however, to the inventors' knowledge, no one has constructed hybrid promoter construct composed of interspaced transcription factor binding domains nor has anyone attempted to multiplex engineered receptors with such a reporter construct.

This technology fills an unmet need in the field of engineered cell-based therapies as realizing the full potential of these therapies will require the development of technologies to enable more sophisticated cellular functions, such as logical evaluation. For example, one major challenge in the field of cancer immunotherapy is preventing off-target activation of the cell therapy. One mechanism to address this need is to require the presence of two distinct ligands for signaling to occur. Although some technologies do exist to fill this need, this technology unique as the engineer can define both the inputs and the outputs of the cell-based therapy.

Furthermore, this technology compromises a strategy by which engineered receptors can be integrated with intracellular architectures, such as hybrid promoters. Tuning all the components of the system to appropriately match the receptor output with the reporter input to enable signaling is essential and non-trivial. Therefore, the generalizable strategy detailed by this technology can be applied to develop alternative logical evaluation of a variety of engineered receptors.

Illustrative Embodiments

The following embodiments are illustrative and should not be interpreted to limit the scope of the claimed subject matter.

Embodiment 1

A system comprising: (i) first and second exogenous extracellular sensors, and third and fourth exogenous extracellular sensors; and (ii) an expression vector comprising a target gene operably linked to a hybrid promoter sequence comprising a minimal promoter for inducing transcription and the hybrid promoter sequence further comprising interspaced transcription factor binding sites upstream of the minimal promoter that bind two or more transcription factors of the extracellular sensors; the first and third exogenous extracellular sensors comprising: a) a ligand binding domain, b) a transmembrane domain, c) a protease cleavage site, and d) a functional domain comprising a transcription factor, wherein the transcription factor of the first exogenous extracellular sensor is different than the transcription factor of the third exogenous extracellular sensor; the second and fourth exogenous extracellular sensors comprising: e) a ligand binding domain, f) a transmembrane domain, and g) a protease domain; wherein: the ligand binding domain of the first exogenous sensor and the ligand binding domain of the second exogenous sensor bind to the same ligand to form a tertiary complex; the ligand binding domain of the third exogenous sensor and the ligand binding domain of the fourth exogenous sensor bind to the same ligand to form a tertiary complex; the ligand binding domains of the first and second exogenous sensors bind to a different ligand than the ligand that is bound by the ligand binding domains of the third and fourth exogenous sensors; and the transcription factor binding sites upstream of the minimal promoter of the expression vector comprise binding sites (e.g., 1, 2, 3, 4, 5 or more binding sites) for the transcription factor of the first extracellular sensor and binding sites (e.g., 1, 2, 3, 4, 5 or more binding sites) for the transcription factor of the third extracellular sensor (optionally where the target gene is expressed from the hybrid promoter sequence when the first and second exogenous extracellular sensors bind to their respective ligands and release their respective transcription factors).

Embodiment 2

The system of embodiment 1, wherein expression of the target gene of the expression vector is effectuated and/or increased when the transcription factor of the first extracellular sensor and the transcription factor of the third extracellular sensor bind to the interspaced transcription factor binding sites upstream of the minimal promoter of the expression vector.

Embodiment 3

The system of any of the foregoing embodiments, wherein the first and second exogenous extracellular sensors bind to the ligand of the ligand binding domains of the first and second exogenous extracellular sensor to form a heterodimer in which the protease of the second exogenous extracellular sensor cleaves the protease cleavage site of the first exogenous extracellular sensor to release the functional domain comprising the transcription factor of the first exogenous extracellular sensor.

Embodiment 4

The system of any of the foregoing embodiments, wherein the third and fourth exogenous extracellular sensors bind to the ligand of the ligand binding domains of the third and fourth exogenous extracellular sensor to form a heterodimer in which the protease of the fourth exogenous extracellular sensor cleaves the protease cleavage site of the third exogenous extracellular sensor to release the functional domain comprising the transcription factor of the third exogenous extracellular sensor.

Embodiment 5

The system of any of the foregoing embodiments, further comprising a cell, wherein the system is located in the cell.

Embodiment 6

The system of any of the foregoing embodiments, wherein one or more of the exogenous extracellular sensors further comprises an extracellular spacer.

Embodiment 7

The system of any of the foregoing embodiments, wherein one or more of the exogenous extracellular sensors further comprises an intracellular spacer that is one, two, three, four, five, or six amino acids in length.

Embodiment 8

The system of any of the foregoing embodiments, wherein the target gene of the expression construct is a reporter gene or a therapeutic gene.

Embodiment 9

The system of any of the foregoing embodiments, wherein the transmembrane domain of any of the exogenous extracellular sensors is immediately adjacent to said protease cleavage site such that there is no intracellular spacer there between.

Embodiment 10

The system of any of the foregoing embodiments, where the protease domain of any of the exogenous extracellular sensors comprises a protease that is at least partially auto-inhibited.

Embodiment 11

A system comprising: (i) first and second exogenous extracellular sensors, and third and fourth exogenous extracellular sensors; and (ii) a recombinant cell comprising an endogenous target gene operably linked to a recombinant hybrid promoter sequence comprising a minimal promoter for inducing transcription and the hybrid promoter sequence further comprising interspaced transcription factor binding sites upstream of the minimal promoter that bind two or more transcription factors of the extracellular sensors; the first and third exogenous extracellular sensors comprising: a) a ligand binding domain, b) a transmembrane domain, c) a protease cleavage site, and d) a functional domain comprising a transcription factor, wherein the transcription factor of the first exogenous extracellular sensor is different than the transcription factor of the third exogenous extracellular sensor; the second and fourth exogenous extracellular sensors comprising: e) a ligand binding domain, f) a transmembrane domain, and g) a protease domain; wherein: the ligand binding domain of the first exogenous sensor and the ligand binding domain of the second exogenous sensor bind to the same ligand to form a tertiary complex; the ligand binding domain of the third exogenous sensor and the ligand binding domain of the fourth exogenous sensor bind to the same ligand to form a tertiary complex; the ligand binding domains of the first and second exogenous sensors bind to a different ligand than the ligand that is bound by the ligand binding domains of the third and fourth exogenous sensors; and the transcription factor binding sites upstream of the minimal promoter of the expression vector comprise binding sites for the transcription factor of the first extracellular sensor and binding sites for the transcription factor of the third extracellular sensor.

Embodiment 12

The system of embodiment 11, wherein expression of the endogenous target gene of the recombinant cell is effectuated and/or increased when the transcription factor of the first extracellular sensor and the transcription factor of the third extracellular sensor bind to the interspaced transcription factor binding sites upstream of the minimal promoter of the endogenous target gene.

Embodiment 13

The system of embodiment 11 or 12, wherein the first and second exogenous extracellular sensors bind to the ligand of the ligand binding domains of the first and second exogenous extracellular sensor to form a heterodimer in which the protease of the second exogenous extracellular sensor cleaves the protease cleavage site of the first exogenous extracellular sensor to release the functional domain comprising the transcription factor of the first exogenous extracellular sensor.

Embodiment 14

The system of any of embodiments 11-13, wherein the third and fourth exogenous extracellular sensors bind to the ligand of the ligand binding domains of the third and fourth exogenous extracellular sensor to form a heterodimer in which the protease of the fourth exogenous extracellular sensor cleaves the protease cleavage site of the third exogenous extracellular sensor to release the functional domain comprising the transcription factor of the third exogenous extracellular sensor.

Embodiment 15

The system of any of embodiments 11-14, wherein one or more of the exogenous extracellular sensors further comprises an extracellular spacer.

Embodiment 16

The system of any of embodiments 11-15, wherein one or more of the exogenous extracellular sensors further comprises an intracellular spacer that is one, two, three, four, five, or six amino acids in length.

Embodiment 17

The system of any of embodiments 11-16, wherein the transmembrane domain of any of the exogenous extracellular sensors is immediately adjacent to said protease cleavage site such that there is no intracellular spacer there between.

Embodiment 18

The system of any of embodiments 11-17, where the protease domain of any of the exogenous extracellular sensors comprises a protease that is at least partially auto-inhibited.

Examples

The following Examples are illustrative and are not intended to limit the scope of the claimed subject matter. Title—Multiplexed Engineered Receptors for Multiparametric Evaluation of Environmental Ligands Reference is made to the manuscript entitled "Multiplexed Engineered Receptors for Multiparametric Evaluation of Environmental Ligands," Hartfield, R. M., Schwarz, K. A., Muldoon J. J., Bagheri N., and Leonard J. N., ACS Synth Biol. 2017 Nov. 17; 6(11):2042-2055, the content of which is incorporated herein by reference in its entirety.

Abstract

Engineered cell-based therapies comprise a promising, emerging biomedical technology. Broad utilization of this strategy will require new approaches for implementing sophisticated functional programs, such as sensing and responding to the environment in a defined fashion. Towards this goal, we investigated whether our self-contained receptor and signal transduction system called "Modular Extracellular Sensor Architecture" (MESA) could be multiplexed to evaluate extracellular cues, with a focus on elucidating principles governing the integration of such engineered components. We first developed a set of hybrid promoters that exhibited AND gate activation by two transcription factors. We then evaluated these promoters when paired with two MESA receptors and various ligand combinations. Unexpectedly, although the multiplexed system exhibited distinct responses to ligands applied individually and in combination, the same synergy was not observed as when promoters were characterized with soluble transcription factors. Therefore, we developed a mechanistic computational model leveraging these observations, to both improve our understanding of how the receptors and promoters interface and to guide the design and implementation of future systems. Notably, the model explicitly accounts for the impact of intercellular variation on system characterization and performance Model analysis identified key factors that affect the current receptors and promoters, and enabled an in silico exploration of potential modifications that inform the design of improved logic gates and their robustness to intercellular variation. Ultimately, this quantitative design-driven approach may guide the use and multiplexing of synthetic receptors for diverse custom biological functions beyond the case study considered here.

INTRODUCTION

Engineered cell-based therapies have transformative potential for addressing unmet medical needs, such as in cancer immunotherapy[1]. Leveraging this progress to develop therapies for other applications will require new capabilities, including technologies that enable cells to sense defined extracellular cues and respond in a customizable fashion[2]. Such approaches generally require natural or engineered cell surface receptors. Given their potential to be implemented and tuned in a manner that is relatively independent of native cellular signaling and regulation, engineered receptors have proven to be particularly useful for building and refining new cell functions.

Various engineered receptors have been implemented to program cell functions. Many promising cancer immunotherapies use chimeric antigen receptors (CAR), which generally regulate and induce signaling downstream of the native T cell receptor. Within this framework, strategies have been developed for multiplexing receptors to achieve NOT logic as a means to incorporate a safety switch[3], or AND logic[4] to reduce off-target activation. Layered logic cascades involving CARs have also been used to implement AND logic for increased precision of tumor recognition[5]. Other engineered receptors signal via orthogonal pathways; for example, synNotch[6] senses surface-bound extracellular ligands, and the modular extracellular sensor architecture (MESA)[7-8] senses soluble extracellular ligands. In the initial report of synNotch, a multilayer split transcription factor (TF) complementation approach was shown to integrate signaling from two synNotch receptors to control a downstream promoter with AND logic. Other strategies for implementing Boolean logic include multilayer transcriptional cascades[9-12], hybrid promoters with multiple TF binding sites[13-14], post-transcriptional or post-translational regulation[15-17], DNA recombinases[18-20], or distributing tasks among genetically distinct cells that signal to each other[21-22]. Computational approaches have proven important for identifying effective circuit designs, through case-by-case mechanistic studies[23-24] and through tools for automated design using libraries of characterized parts[14, 25-26] Going forward, combining logic with cell surface receptors could enable the design and construction of cell-based biosensors for diverse diagnostic or therapeutic applications,[27] and such innovations may be facilitated by the integration of experimental and computational methods. Towards this goal, the central objective of this study was to elucidate principles that govern the multiplexing of MESA receptors for a wide range of applications.

In this study, we investigate how and whether two MESA receptors, each of which is individually competent to induce signaling, may be multiplexed such that their outputs converge at a single promoter. This represents a complementary question to that which was investigated for multiplexing synNotch using split TFs and multilayer transcriptional control[6]. To this end, we constructed and evaluated a panel of novel promoter constructs, identified several that could synergistically induce transcription with two TF inputs, and used an experimental tuning strategy to align the magnitude of TF outputs from multiplexed MESA signaling with the specific TF input requirements for promoters, a process we call level-matching. Finally, to both improve our understanding of this system and guide the design of new receptor-promoter systems, we developed a mechanistic computational model and utilized the model to identify design strategies that can be leveraged for future applications.

Results and Discussion

Figure 8:
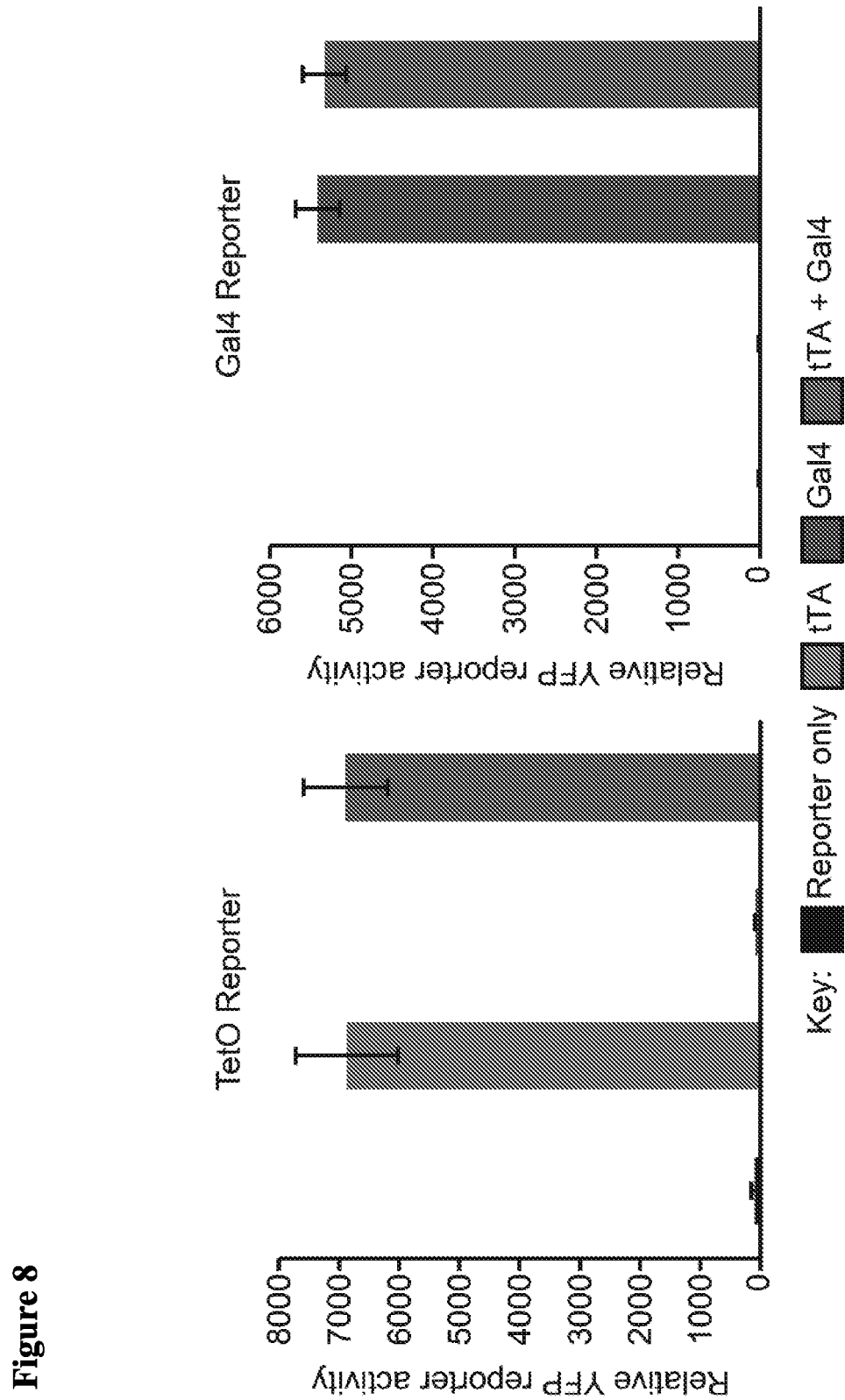
FIG. 8: Evaluation of cross-talk between tTA and Gal4 transcription factors and reporter constructs. Soluble tTA and Gal4 transcription factors were transfected individually and in combination in HEK293FT cells, and after 36 h, the reporter activity for a TetO- or Gal4-based reporter (pT7 or pU5, respectively) was quantified by flow cytometry. Experiments were conducted in biological triplicate, and error bars indicate one standard deviation. Data were analyzed as in FIG. 1.

To develop a strategy for multiplexing MESA receptors, we opted to investigate a single-layer transcriptional gate (FIG. 1a). Although Boolean logic gates are relatively well-studied[13, 28], whether extracellular sensors can be multiplexed effectively in a single-layer transcriptional gate was not known. The MESA receptors are comprised of two separate transmembrane proteins—a target chain (TC) and a protease chain (PC)—each containing an extracellular ligand-biding domain that mediates chain dimerization upon ligand binding, a single-pass transmembrane domain, and an intracellular domain for signaling. On the intracellular face, when the protease on the PC binds to the protease recognition sequence adjacent to the TC's TF, an enzymatic trans-cleavage event releases the TF, leaving an unaltered PC and a cleaved TC. The soluble TF can then enter the nucleus and regulate the expression of a target gene. Since MESA receptors can be designed to release a variety of defined TFs as outputs[7-8], we first sought to develop a promoter that could be activated by specific combinations of two TFs. We chose to use the well-studied TFs tTA[29] and Gal4-VP16 (hereafter referred to as Gal4)[30], which drive transcription from reporter constructs comprising five to seven repeated DNA motifs (termed TetO ($T_7$) and UAS ($U_5$), respectively) upstream of a minimal promoter. Because multiple TF molecules must be recruited to drive transcription in the $T_7$ and $U_5$ systems[29-30], we hypothesized that some hybrid promoters composed of both TetO and UAS sequences might exhibit logic. We anticipated that such hybrid constructs would exhibit AND logic by requiring the recruitment of both tTA and Gal4 to induce gene expression above a threshold (FIG. 8); however, it is also possible that some such constructs might exhibit OR logic.

Development of Hybrid Promoters that Exhibit Synergistic Activation by Two TFs.

Figure 1B:
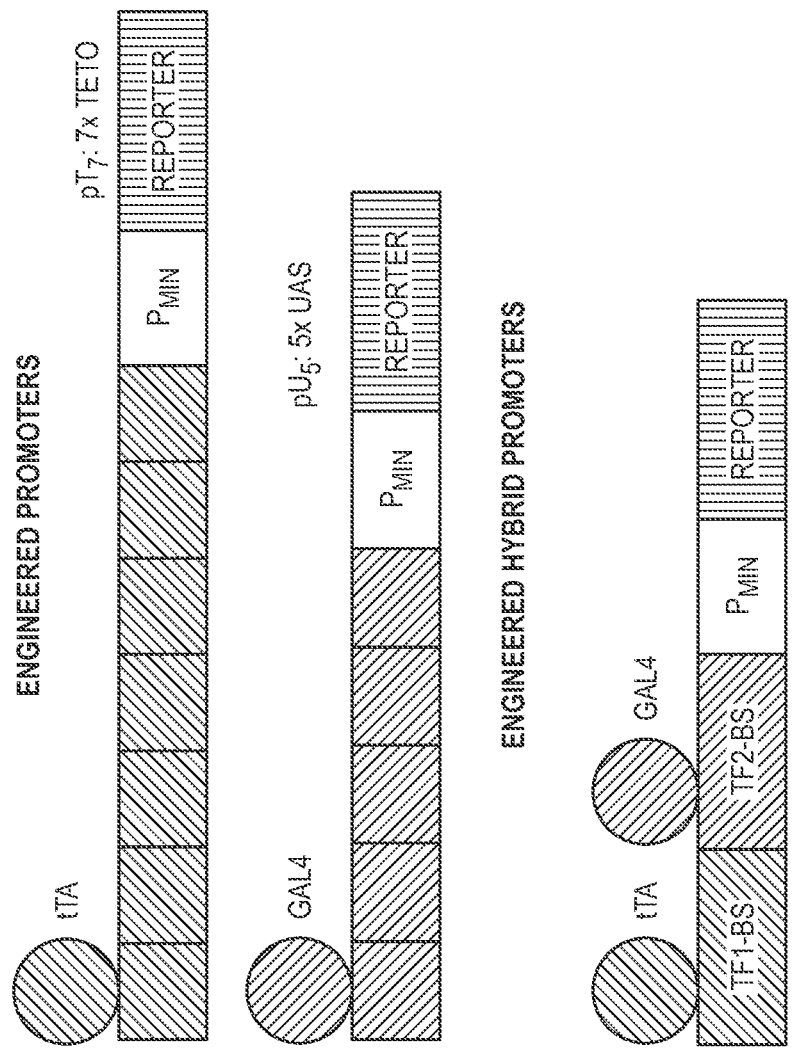
Figure 1C:
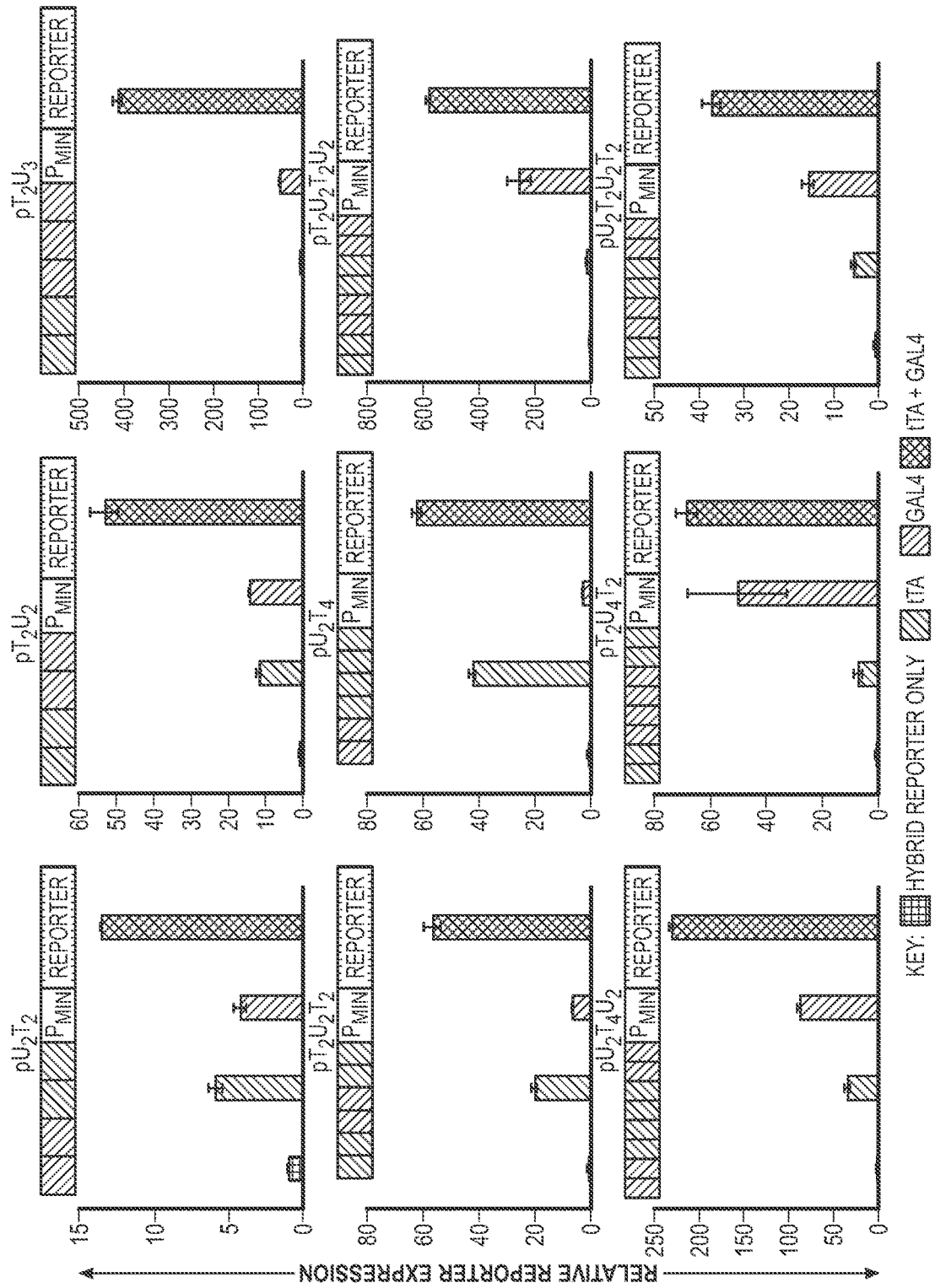

To evaluate this hybrid promoter strategy, we first constructed a panel of promoters with different numbers and sequential arrangements of TetO and UAS motifs upstream of a CMV minimal promoter and a fluorescent reporter gene. We evaluated the performance of these constructs by measuring reporter expression (fluorescence) in response to tTA and Gal4 individually and together (FIG. 1b). As hypothesized, within the limited set of constructs tested, multiple promoters functioned as AND gates. In these cases, the highest reporter expression was observed with both tTA and Gal4, and this was higher than the sum from individual TFs (FIG. 1c). Three promoters ($pT_2U_2T_2U_2$, $pU_2T_4U_2$, $pT_2U_3$) showed AND behavior and high reporter expression, whereas others had undesirable properties such as low expression ($pT_2U_2$, $pU_2T_2$), high single-TF responsiveness ($pT_2U_4T_2$, $pU_2T_4$), or high background in the absence of TFs ($pU_2T_2U_2T_2$). Interestingly, incorporating an additional UAS domain to the proximal end of the relatively unresponsive promoter $pT_2U_2$ to generate $pT_2U_3$ led to much higher AND gate expression without substantially increasing the responsiveness to individual TFs, yet the same result was not observed when two TetO sites were incorporated to generate $pT_2U_2T_2$. We identified three AND gate promoters that displayed relatively high synergy and inducible reporter expression ($pT_2U_2T_2U_2$, $pT_2U_3$, $pU_2T_4U_2$) and carried these forward for further evaluation. For clarity, these hybrid constructs are hereafter denoted as H1, H2, and H3, respectively.

Figure 1D:
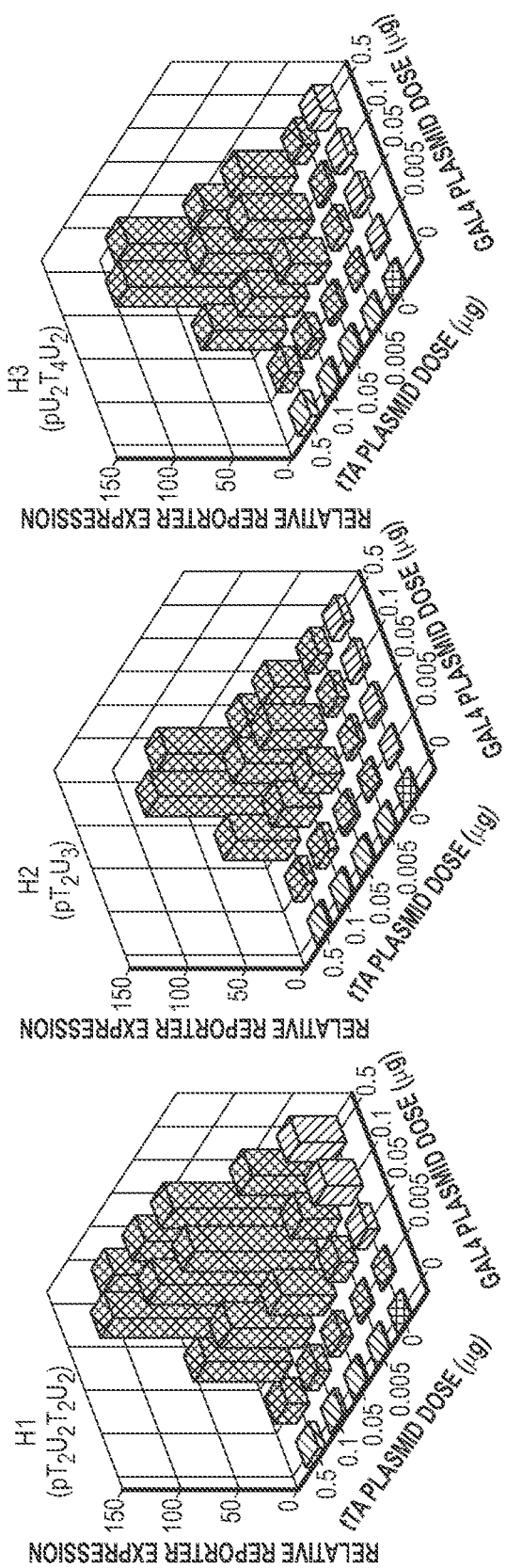
Figure 9:
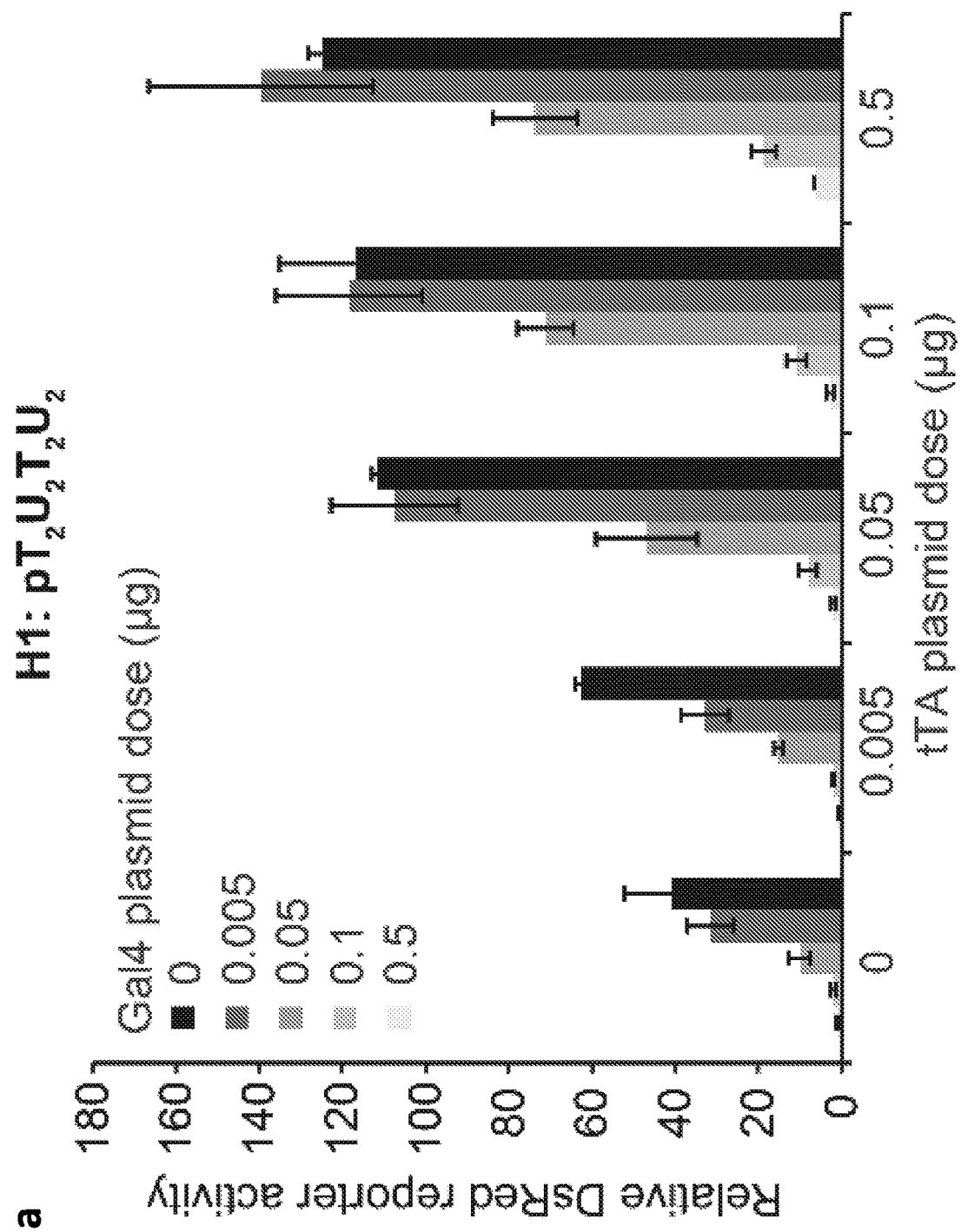
FIG. 9: Evaluation of hybrid reporters with soluble transcription factors. Three reporters were evaluated in combination with a large range of tTA and Gal4 plasmid doses (these assays were conducted in 24 well plates, with 1.5E5 cells/well). DsRed reporter activity was quantified by flow cytometry 36 h post-transfection. Experiments were conducted in biological triplicate, and error bars indicate one standard deviation. (a) H1: $pT_2U_2T_2U_2$; (b) H2: $pT_2U_3$; (c) H3: $pU_2T_4U_2$. Data were analyzed as in FIG. 1.
Figure 9:
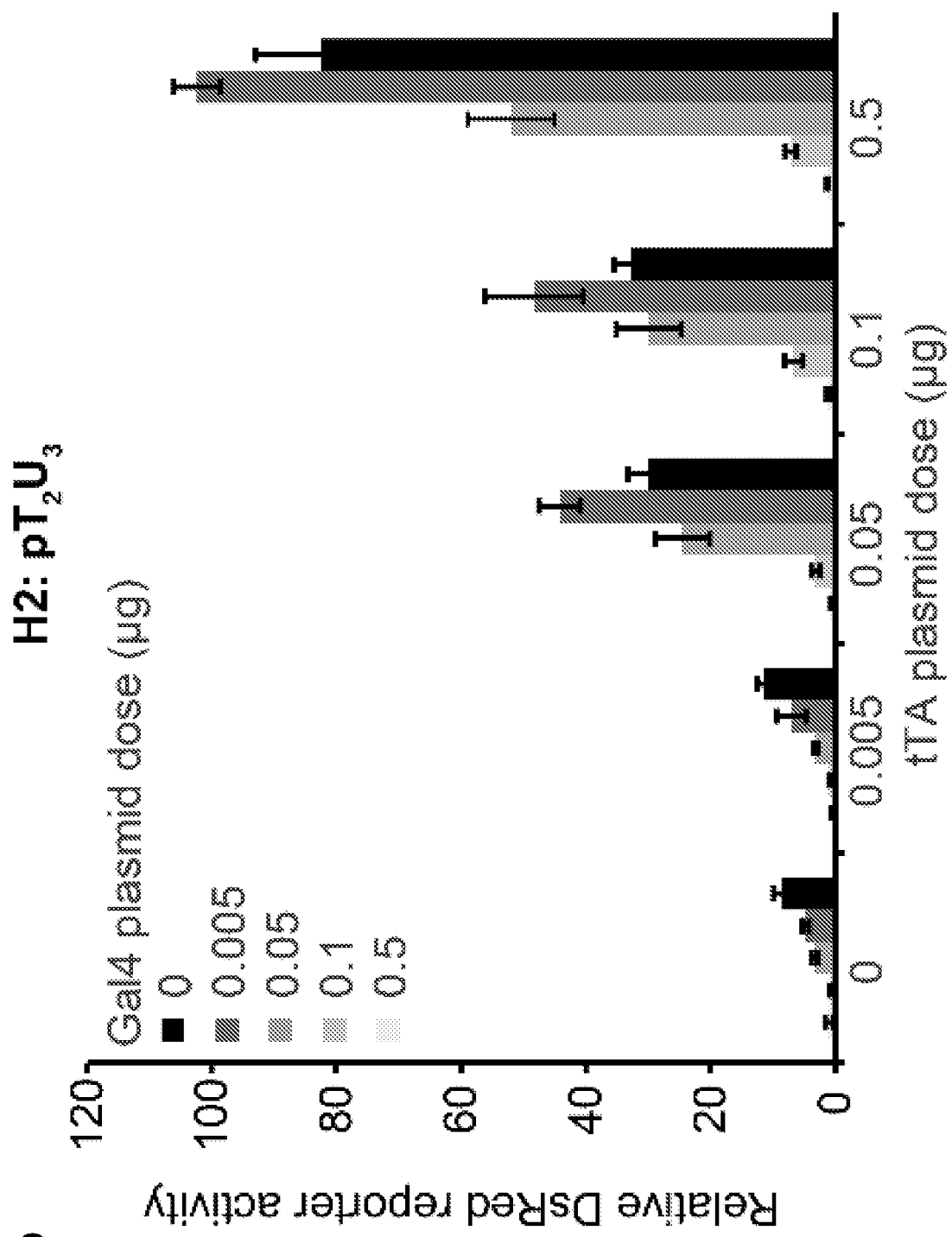
Figure 9:
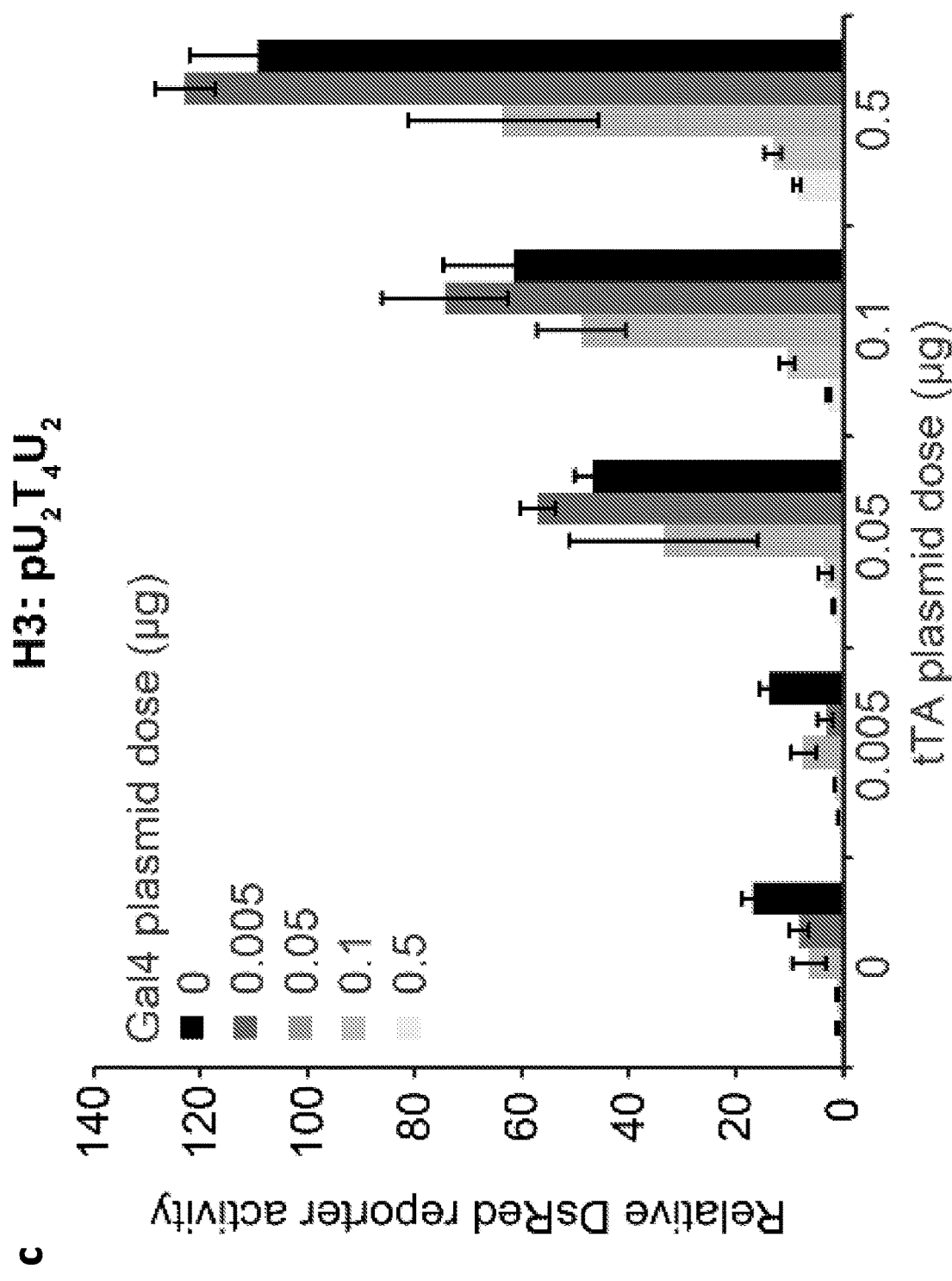

Since the initial panel was characterized with a high TF dose, we next evaluated the three selected promoters at varied TF doses. We hypothesized that such information could be useful, because (1) the amount of MESA-bound TF that is released both with and without ligand depends on the doses of TC and PC transfected and consequently expressed, (2) the percentage of MESA-bound TF that is released with ligand could be less than 100%, and (3) receptors and soluble proteins could differ in expression due to production and/or degradation rates. We evaluated reporter expression across plasmid dose combinations for tTA and Gal4 (FIG. 1d and FIG. 9). The results showed that all three promoters exhibited synergy. Here, we define synergy as a property that is inherent to a promoter, independent of the amounts of TFs present. A promoter is identified as synergistic if, during its experimental characterization using TFs at sub-saturating levels, the background-subtracted reporter expression in the presence of both TFs is greater than the sum of background-subtracted reporter expression in the presence of each TF individually. Since the hybrid promoters exhibited low activity in the absence of TFs, the background was negligible. Separately, we define synergistic activation (or the synergistic regime) of a hybrid promoter as an implementation in which TFs are present at levels that evidence promoter synergy. In FIG. 1d, synergistic activation for each promoter was most apparent at plasmid doses of around 0.05 to 0.1 μg of both TFs. Responsiveness and synergy have a basis in physical features, some of which can be deduced by comparing the promoters in FIG. 1c-d. For example, the responsiveness to one TF versus the other is influenced by which has the more promoter-proximal binding site, and responsiveness scales nonlinearly with the number of consecutive binding sites for a TF. We note that, at least within the subset of designs we sampled, there may exist a trade-off between responsiveness and synergy that makes attaining either one of these properties more feasible than attaining both; for example, H1 is more responsive than H2 at low TF doses but H2 synergistic activation appears steeper than H1.

Additionally, we observed that the three promoters were more responsive to Gal4 than to tTA, with respect to transfected mass of TF-encoding plasmids. H2 and H3 had low activation at low doses and moderate activation at high doses, whereas H1 was more responsive to each TF and had higher activity overall. Since H1 and H2 exhibited distinct activity profiles, we chose to carry these two constructs forward to investigate which, if either, could be level-matched with MESA to achieve AND gate behavior.

Evaluating Multiplexed Receptor Signaling with Hybrid Promoters.

Figure 10:
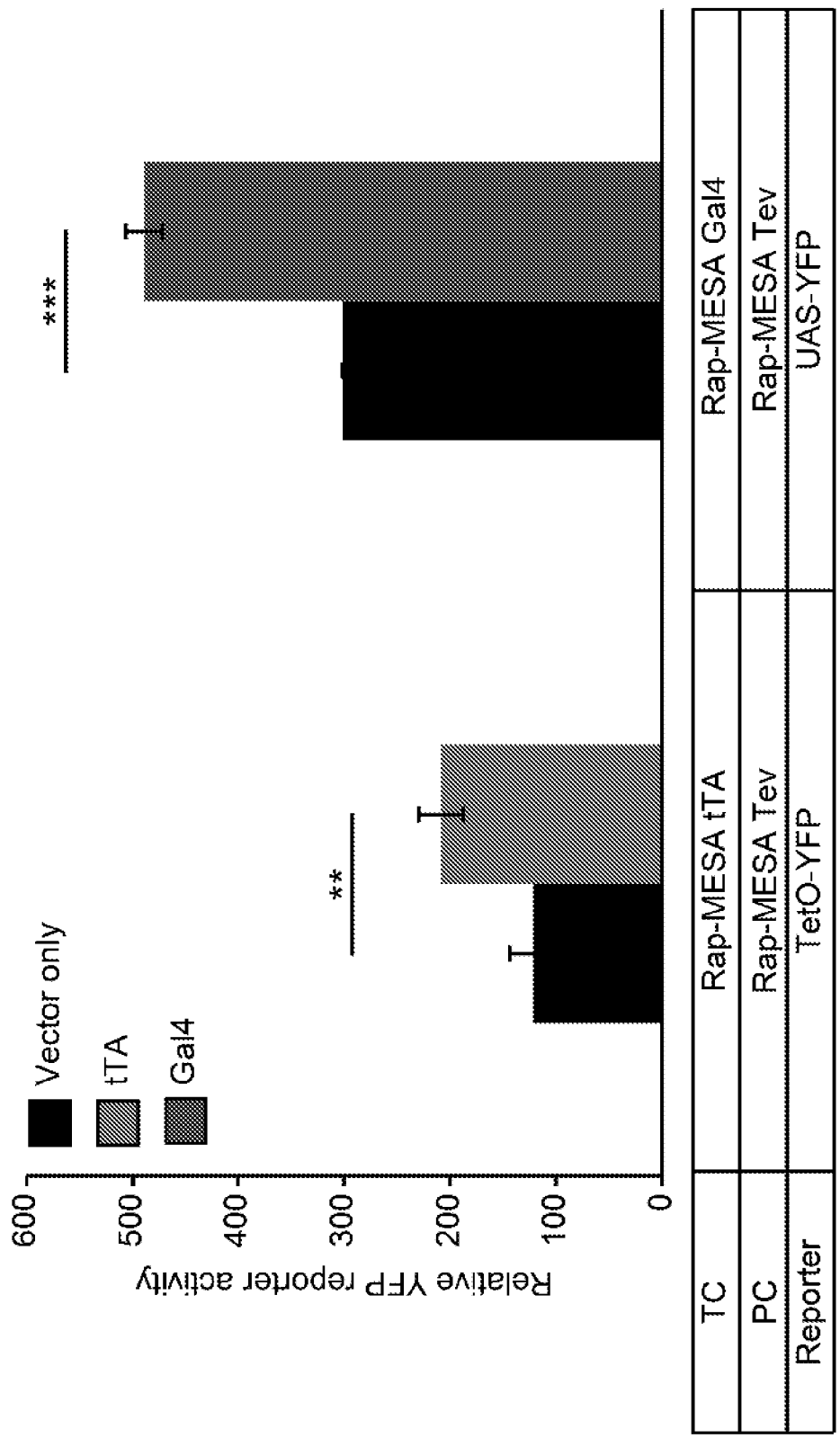
FIG. 10: Assessment of Rap-MESA signaling with tTA and Gal4 transcription factors. Rap-MESA receptors were constructed to release either a tTA or Gal4 transcription factor and were transfected at a 1 to 1 ratio with a Rap-MESA PC. tTA release was monitored by a tTA responsive TetO-YFP promoter (pT7), and Gal4 release was monitored by a Gal4 responsive UAS-YFP promoter (pU5). Rapamycin was added 12 h post-transfection, and YFP reporter activation was monitored by flow cytometry 36 h post-transfection. Experiments were conducted in biological triplicate, and error bars indicate one standard deviation. Data were analyzed as in FIG. 1. Statistical comparisons were performed using a two-tailed Student's t-test ($p \leq 0.01$, *$p \leq 0.001$).

To investigate whether the H1 or H2 could enable MESA multiplexing, we opted to use two previously developed receptors that are responsive to either rapamycin or VEGF ligands (Rap-MESA[8] and VEGF-MESA[7], respectively). Rap-MESA was modified to release Gal4, and thus we first verified that this Rap-MESA exhibited ligand-inducible signaling (FIG. 10). No modifications were made to the VEGF-MESA, which releases tTA. In the field of genetic circuit design, it is known that ideal circuit performance requires the output of upstream components to match the input requirements of downstream components[31-32]. For our application, we reasoned that level-matching requires that the amounts of TFs released from MESA upon ligand treatment match the amounts required for synergistic activation of the hybrid promoter. We hypothesized that level-matching could be achieved using a strategy in which we first identify the dose of each MESA required to activate the hybrid promoter in a ligand-inducible fashion when the complementary soluble TF is in excess. In this strategy, the expression of each receptor is tuned independently, in a manner that is related to the input requirements of the specific promoter. However, for any given promoter, it is also possible that the input requirements may be incompatible with the amount of TF that can be released by ligand-induced signaling in tuning the receptor dose.

Figure 2A:
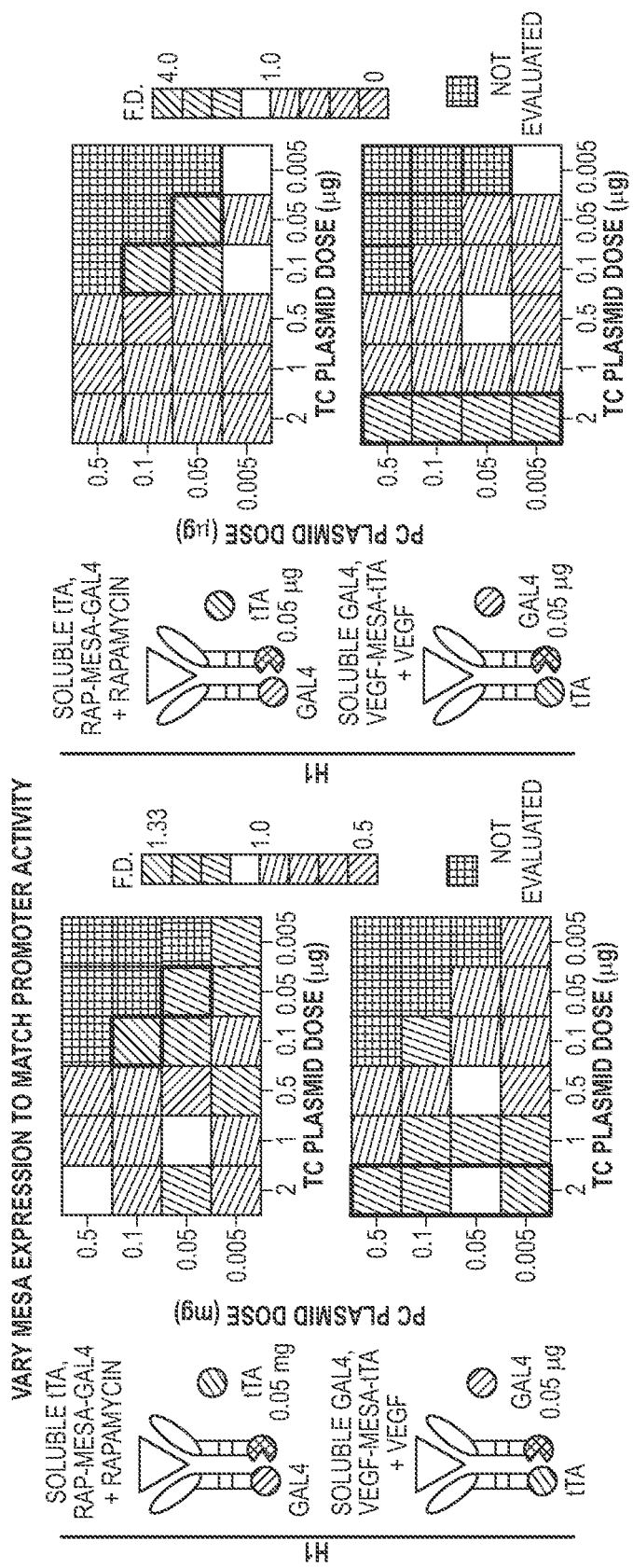
in FIG. 2a are compared to simulated outcomes for a similar in silico experiment with VEGF-MESA, constitutive soluble Gal4, and promoter H1, with VEGF (lower panel) and without VEGF (upper panel). Since reporter expression is quantified in units that differ between experiments and simulations, experimental data (originally in flow cytometry-specific units) were linearly scaled to enable a more direct visual comparison with simulation results. (c) Time course H1 reporter trajectories across TC and PC doses are shown for the mean-transfected cell, +/− each ligand treatment (V, VEGF; R, Rap; VR, VEGF and Rap). In the left panel, VEGF-MESA doses are varied while Rap-MESA dose is constant, and in the right panel, Rap-MESA doses are varied while VEGF-MESA dose is constant. Simulations are grouped into five outcome cases (represent by box shading and outline color) based on the rank-ordered expression with each ligand treatment. (d) Three cases from (c) are examined in more detail. The left panel shows the absolute reporter expression, and the right panel shows ligand-induced reporter expression after the background (without ligand) is subtracted, to illustrate the additive ligand-induced response to these ligands. There exists a trade-off for two-ligand induced signaling, in which adjustments to the MESA plasmid dose that increase the F.D. compared to one ligand also decrease F.D. compared to the other ligand.
Figure 11:
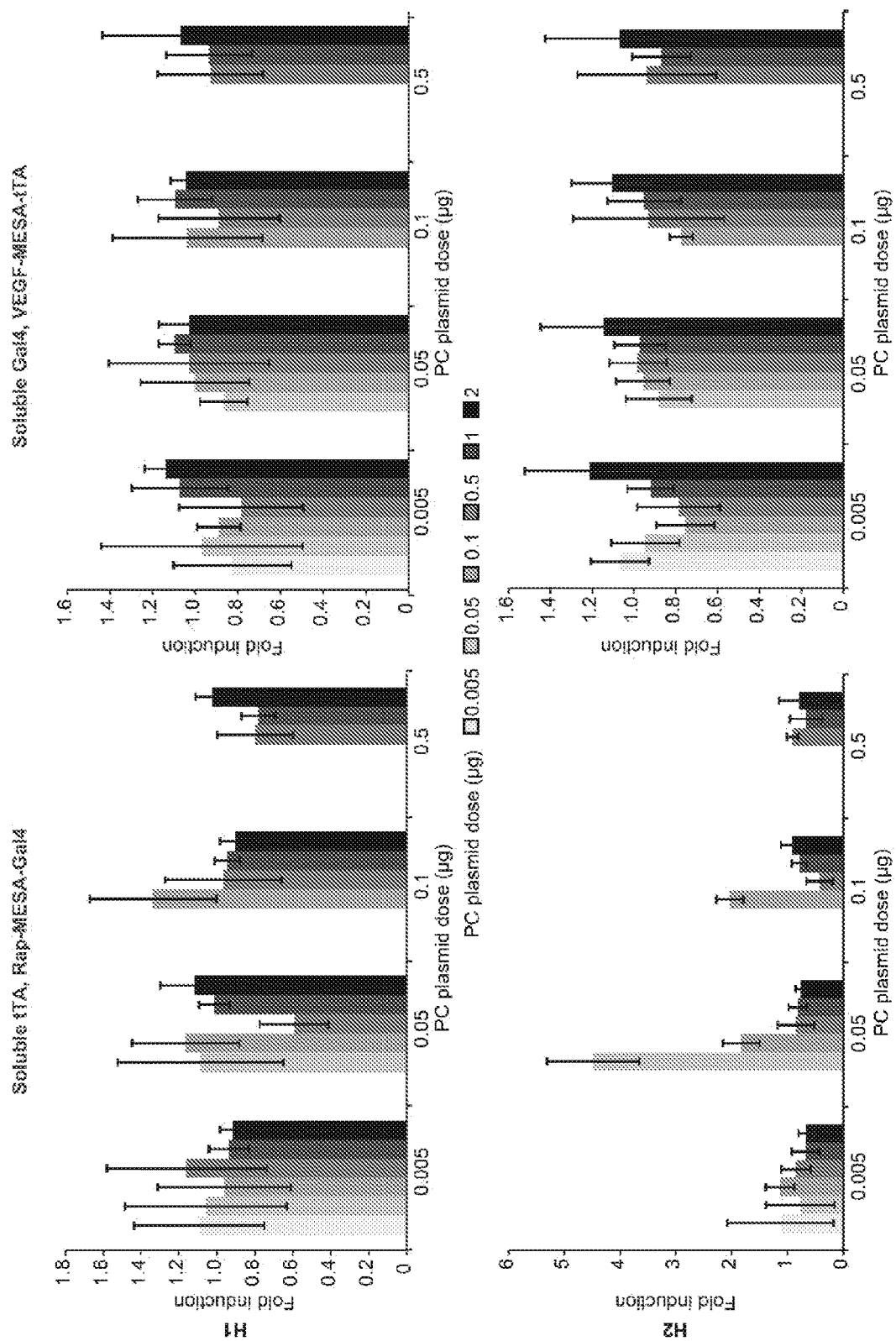
FIG. 11: Effect of varying MESA plasmid dose on hybrid reporter activation. Rap-MESA and VEGF-MESA were transfected individually in combination with a soluble transcription factor. Rapamycin or VEGF was added 12 h post-transfection and hybrid reporter activation was assessed by flow cytometry 36 h post-transfection. Conditions where the dose of PC was higher than the dose of TC were not evaluated. Experiments were conducted in biological triplicate, and error bars indicate one standard deviation. Data were analyzed as in FIG. 1.

To investigate this strategy, we leveraged our prior observation that the doses and ratio of TC and PC are important considerations for background signaling and ligand-inducible signaling. In general, the TC dose should be greater than or equal to the PC dose to achieve ideal fold-difference (F.D.; the measurement with ligand divided by the measurement without ligand)[7] in reporter expression. Therefore, for each MESA, we varied the plasmid doses of TC and PC, and provided the complementary soluble TF in excess along with a hybrid reporter (FIG. 2a and FIG. 11). For both H1 and H2, we found that for Rap-MESA, a 1:1 plasmid ratio of TC and PC led to the best F.D., and that for VEGF-MESA, higher doses of TC compared to PC led to greater F.D. These conditions resulted in a moderate F.D. (+/− ligand). However, based upon the observed responses to soluble TFs alone (FIG. 1), we reasoned that expressing the complementary soluble TF in excess produced elevated "background" reporter expression in the absence of ligand. Given this observation, we hypothesized that background signaling would be lower in the context of multiplexed receptors (when neither TF is provided in excess), such that AND behavior could be better than the F.D. in this step of MESA tuning would suggest.

Figure 2B:
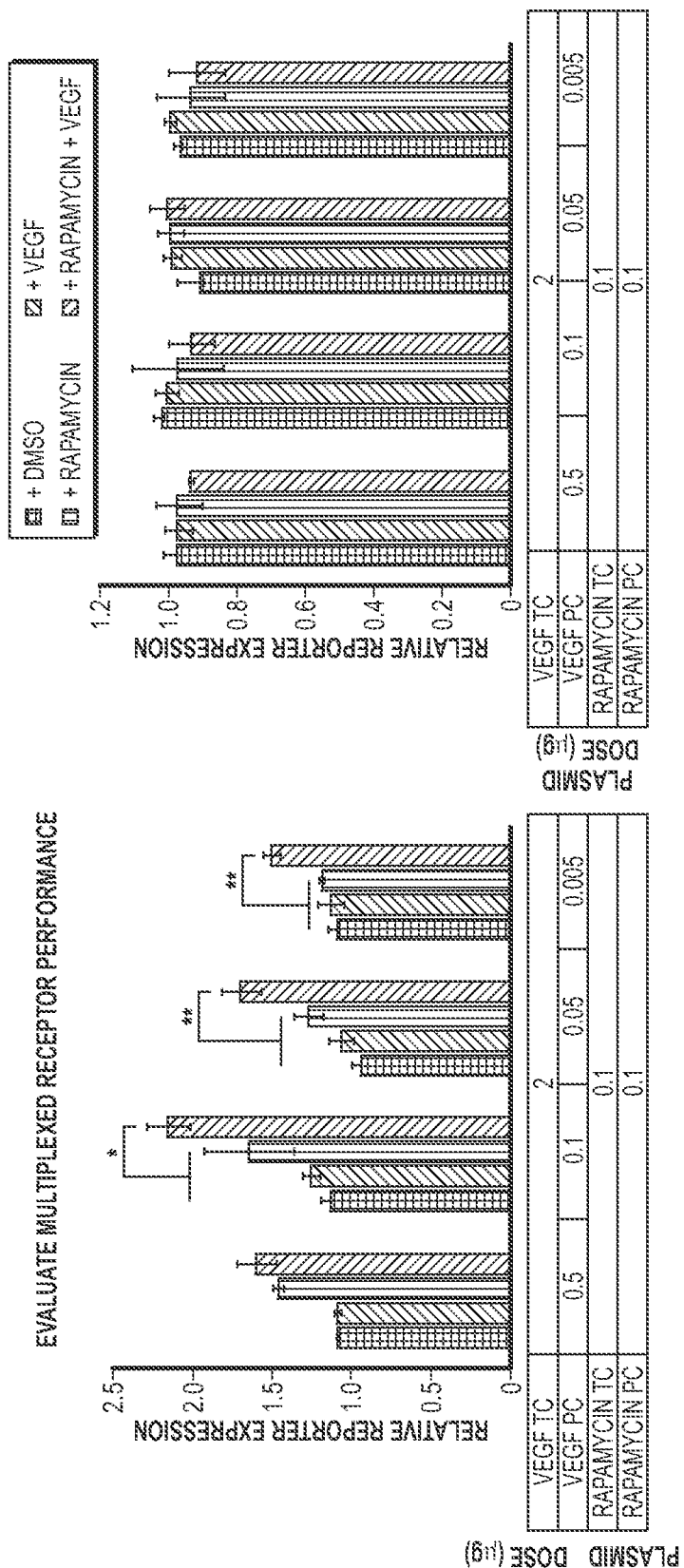
FIG. 2: Multiplexed receptor implementation. (a) A complementation assay was conducted for each receptor-promoter pair, in which ligand-induced fold-difference (F.D.) was determined across target chain (TC) and protease chain (PC) dose combinations with the complementary soluble TF expressed constitutively and in relative excess. In the heatmaps (see FIG. 11), yellow boxes outline conditions with the highest measured F.D. Data were analyzed as in FIG. 1. (b) MESA doses identified based on (a) were used to implement multiplexed receptors. Relative DsRed reporter expression was calculated independently for each promoter by dividing the DsRed mean fluorescence intensity (MFI) with MESA by the MFI without MESA, such that cells transfected with reporter only would have a value of one on this scale. Experiments were conducted in biological triplicate, and error bars represent one standard deviation. An ANOVA statistical test was utilized to compare the two-ligand case to all other cases (*$p \leq 0.05$, **$p \leq 0.01$).
Figure 12:
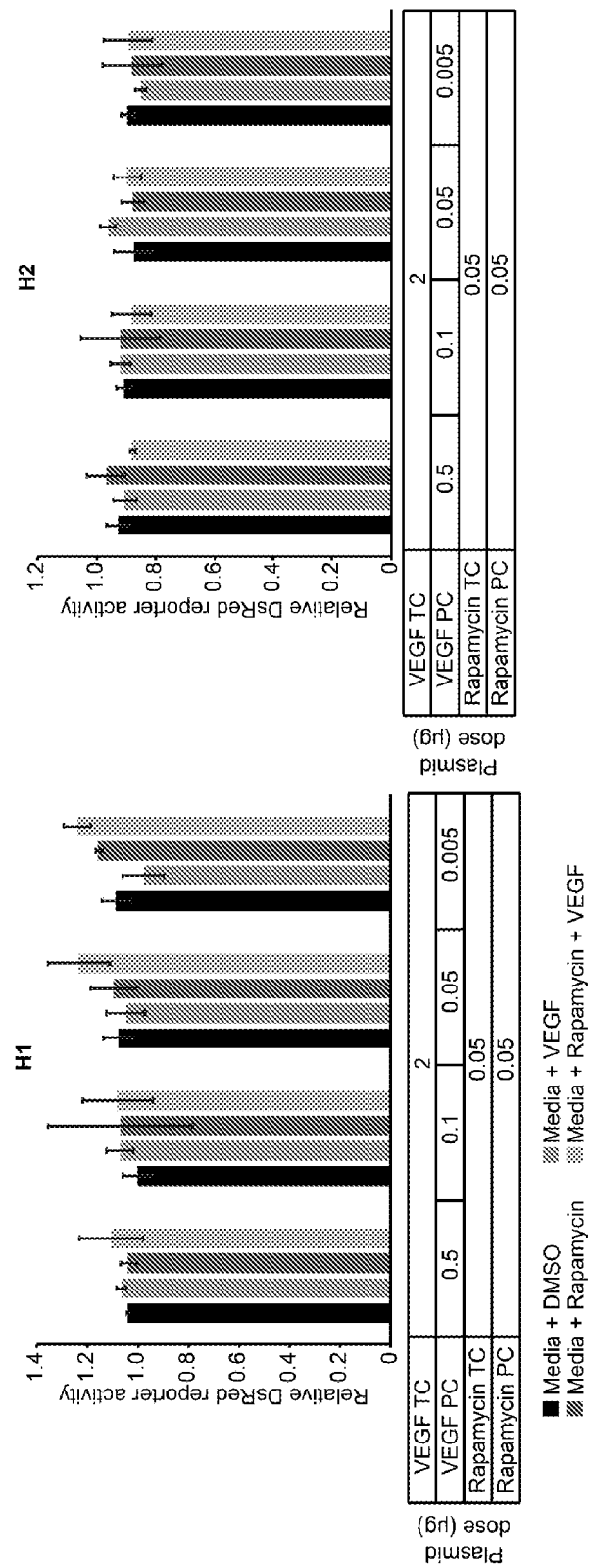
FIG. 12: Multiplexed activation of hybrid promoters. Two hybrid promoters were co-transfected with Rap-MESA (TC and PC plasmid dose of 0.05 µg per chain) and VEGF-MESA (TC plasmid dose of 2 µg and a range of PC plasmid doses from 0.005-0.5 µg) to investigate multiplexed MESA activation. The ligands (VEGF and rapamycin) were added to cells 12 h post-transfection, and reporter activation was assessed by flow cytometry 36 h post-transfection. Experiments were conducted in biological triplicate, and error bars indicate one standard deviation. Data were analyzed as in FIG. 1.

Next, we investigated whether Rap-MESA and VEGF-MESA could be multiplexed using doses identified during MESA tuning (indicated by yellow boxes in FIG. 2a). Using these conditions, we observed low reporter expression in the absence of ligands or with either ligand alone. Notably, with both ligands, H1 produced significantly elevated expression, demonstrating distinguishable two-ligand induced signaling (FIG. 2b). Such outcomes were observed across several VEGF-MESA plasmid doses, providing evidence that each MESA ligand-inducibly signals independently. That is, induction of one MESA with its ligand does not induce signaling via the other receptor; if it did, the one-ligand and two-ligand cases would be indistinguishable. However, H2 outcomes were indistinguishable, as were H1 outcomes with a low Rap-MESA dose (FIG. 12). Furthermore, inducible expression above the background was low for even the best performing implementations, which did not exhibit the same synergistic activation that was observed when promoters were evaluated with constitutively expressed soluble TFs. To explain this discrepancy, we hypothesized that receptor signaling and promoter input requirements were not yet level-matched. The initial promoter characterization showed that H1 was more TF-responsive than H2 (FIG. 1d); therefore, we concluded that the amounts of TFs released with ligand treatment activated H1 more than H2, but that in both cases activation was low because the amounts of TFs released from receptors were insufficient for promoter synergy. Moreover, this explanation suggests that adjusting the MESA tuning strategy would not circumvent the failure of H2, and that such limitations are an inherent property of this receptor-promoter pairing. However, we hypothesized that modifications to the MESA tuning strategy for H1 could potentially yield improved AND behavior. Given the large potential design space involved, and the challenges associated with gaining systematic understanding from empirical tuning alone, we decided to employ computational modeling to facilitate interpretation of our observations, elucidate factors that impact receptor and hybrid promoter performance, and potentially guide future designs.

Precise Promoter Characterization Using Model-Guided Single-Cell Analysis.

To further characterize this system and potentially determine how to better implement multiplexed receptors and engineered promoters, we developed a computational model that describes multiplexed receptor signaling and hybrid promoter activity (see Supporting Information: Model Development, FIG. 13). Guiding our approach was a key experimental observation that only a small percentage of cells (ranging from about 20% to less than 1%, depending on the experiment) exhibited distinguishable promoter activation (were "ON") in the presence of both TFs, compared to the condition with the reporter alone. As a result, mean reporter expression was generally much greater for the ON subpopulation than for the whole population. The percentage of cells in the ON state also generally varied with experimental setup: experiments with two constitutively soluble TFs and the reporter (three components on three plasmids) had ON percentages that correlated with TF plasmid doses and reached about 20% at the highest doses; experiments with one receptor, one constitutively soluble TF, and the reporter (four components on four plasmids) and with two receptors and the reporter (five components on five plasmids) had successively lower ON percentages that still correlated with plasmid doses (see Supporting Information: Model Development, Table M1). We hypothesized that the small ON percentage might arise from two types of intercellular variation: (1) each cell may receive a different number of molecules of each plasmid, which could potentially restrict level-matching to a subset of cells, and/or (2) cells may exhibit inherent differences in transcription rate, translation rate, and/or transfection efficiency (the efficiency with which a plasmid, once taken up, enters the nucleus and becomes transcription-competent), which comprise sources of variation that are distinct from the amounts of plasmids received. Although these two types of variation cannot be readily distinguished in experimental data, together they determine the effective initial conditions for the dose-dependent amount of each transfected gene that each cell can express. We therefore developed a model to investigate the effects of intercellular variation, and incorporated the combined effects of these two types of intercellular variation by assigning different amounts of each plasmid to each cell.

Figure 14:
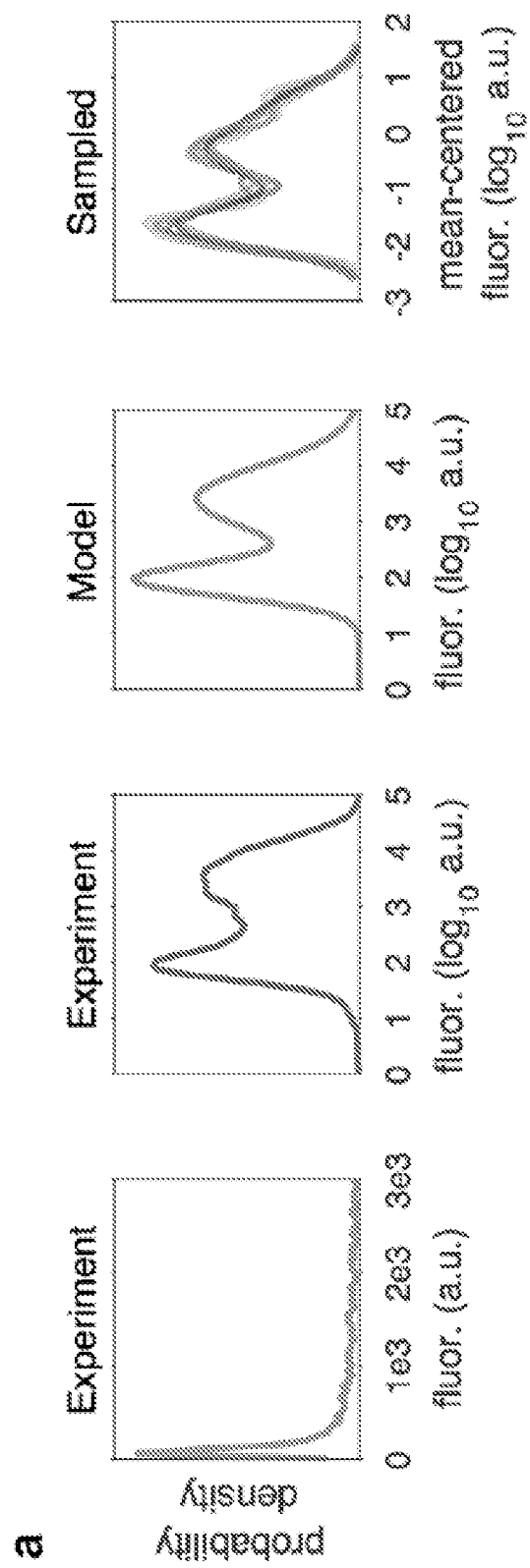
FIG. 14: Transfection model. (a) The marginal distribution of a transfected plasmid was modeled using a bimodal Gaussian: $f = c \cdot N(\mu', \sigma') + (1-c) \cdot N(\mu, \sigma)$, where each µ is a mean, each σ is a standard deviation, and c is a value between zero and one. Parameters were estimated based on experimental data: c=0.4, µ1=1.95, σ1=0.3, µ2=3.4, σ2=0.6. The linearly-scaled distribution for each plasmid in the distribution was mean-centered to one (equal to zero on the log 10-scaled x-axis). The right-most panel shows the distributions of five plasmids that were co-sampled to produce a 200-cell in silico population. (b) The five plots along the diagonal show the marginal distribution for each plasmid in the in silico population, and the y-axis for these plots is probability density. The other plots show the joint distribution (200 cells) for each pair of different plasmids.
Figure 14:
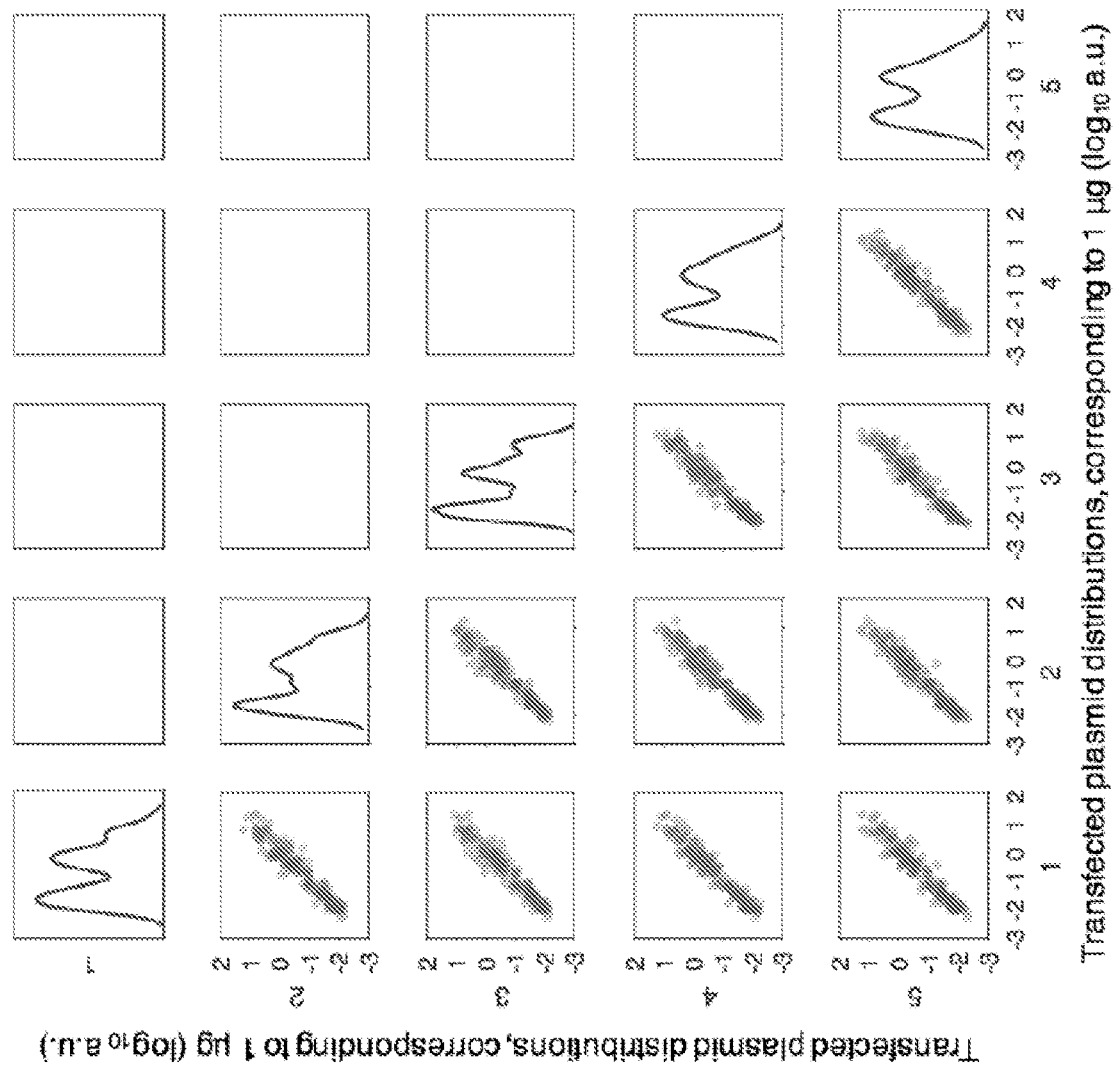

We represented heterogeneity by modeling a population of cells in which key metrics of variability matched those observed in experiments. To that end, we developed a method to generate in silico populations with the statistical features observed in a cotransfection experiment, for any specified number of plasmids (see FIG. 3a and Supporting Information: Model Development, FIG. 14). This statistical representation is consistent with a recent analysis of how levels of gene expression can be distributed among cells in a population[33]. From our in silico population, we can interrogate individual cells or calculate population-level metrics, such as mean reporter expression, for subsequent analyses and comparisons with experiments. With this framing, we first used principal component analysis (PCA) to explain sources of variation in gene expression (see Supporting Information: Model Development). The first principal component explained 84-90% of the variation (depending on the number of different cotransfected plasmids, from five to two, respectively) and corresponds to an axis along which plasmid amounts vary but their ratio is constant. Thus, in a cotransfection with equal amounts of two plasmids A and B, most cells will take up similar amounts of each. Some cells will take up more of plasmid A than plasmid B, or vice versa, and this effect explains the remaining 10% of the variation.

This result predicts that consolidating the components (genes) encoding receptor chains and hybrid promoters onto fewer plasmids would not substantially affect intercellular variation or increase the percentage of cells in the ON state. However, the system is sensitive to the number of different components; we consider the following argument: for a system of n different components, there exists an n-dimensional space that represents the amount of each component expressed per cell. Within an experiment, each cell occupies a coordinate in this space. There also exists in this space a functional region, which may be unknown a priori, and that corresponds to various combinations of the amounts of each component that yield desirable ligand-inducible promoter activation, quantified by F.D. As n increases, such as by replacing one constitutively soluble TF for the two chains of a receptor, it is possible that the overlap in n-dimensional space between the functional region and the region occupied by a cell population will change. From this perspective, one way to frame the goal of implementing an engineered function that is robust to intercellular variation is to choose component doses, and ultimately system designs, that yield high overlap between the functional region and the region that is populated by cells, where the latter can be a function of how components are delivered to cells. To this end, here we define the robustness of a system as the extent to which a performance metric (e.g., F.D.) is maintained as component doses are varied across the ranges one would observe in a plasmid cotransfection experiment. Thus, as system robustness increases, more cells in a population exhibit the desired function. Robustness is therefore distinct from performance, which is the F.D. as calculated for a single cell (at least in theory) or as measured for a population mean average (as is typically done in experimental practice). Having established this mathematical and conceptual model for describing intercellular variation, we next addressed the mechanisms by which this system operates.

To begin to capture the multiplexed MESA system, we started by developing a dynamical model for the hybrid promoters H1 and H2. Transcription was formulated as fractional activation:

$$f = \frac{w_T \cdot [tTA] + w_G \cdot [Gal4] + w_{TG} \cdot [tTA] \cdot [Gal4]}{1 + w_T \cdot [tTA] + w_G \cdot [Gal4] + w_{TG} \cdot [tTA] \cdot [Gal4]}.$$

Figure 3:
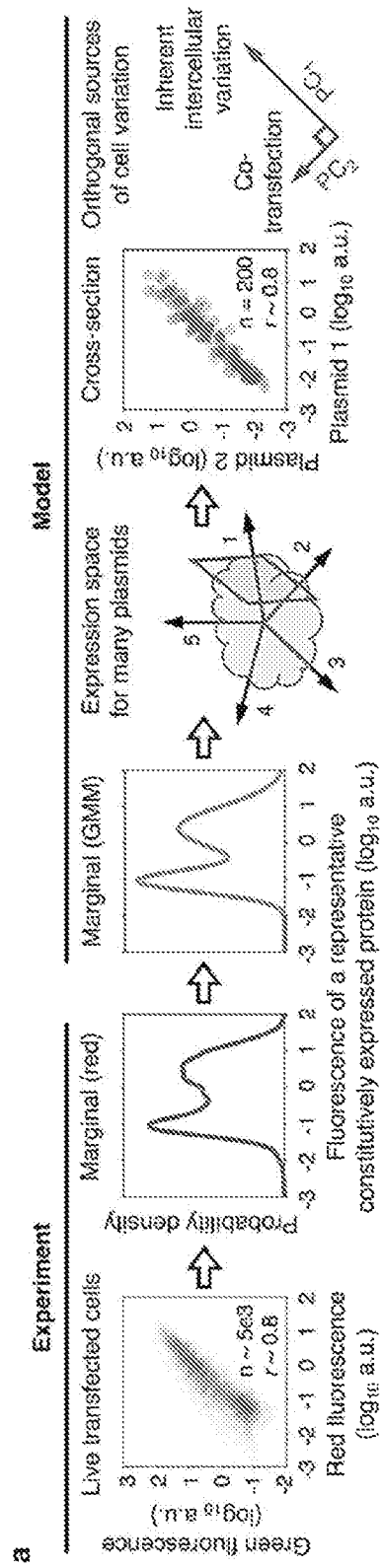
FIG. 3: A model that accounts for cell variation to explain heterogeneous promoter activity. (a) A statistical model was formulated and trained on experimental data to account for inherent intercellular variation in transcription rate, translation rate, and transfection efficiency. The marginal distribution was modeled using a Gaussian mixture model (GMM). The resulting in silico population exhibits the expected covariance between plasmids for a multi-plasmid transfection (inferred from constitutive expression of fluorescent proteins in experimental cases). Principal component analysis identified two sources of variability: the major contributor (ranging from 90% for two plasmids to 84% for five plasmids) is inherent variation, and the minor contributor is variation due to cotransfection of multiple plasmids. The Pearson correlation coefficient r in the cross-section is 0.8 on a linear scale and 0.9 on a $\log_{10}$ scale. (b) A dynamical model for TF expression and hybrid promoter activity in a transfected cell population was formulated and trained on mean average data in FIG. 1d for various tTA and Gal4 plasmid dose combinations. (c) The promoter model maps from a three-dimensional plasmid transfection distribution onto a one-dimensional reporter expression distribution. The distributions depict the reporter expression for hybrid promoters H1 and H2, when quantified for the population mean (i.e., mean reporter expression for all transfected cells) and mean-transfected cell (i.e., a cell that receives the mean amount of each plasmid).
Figure 3:
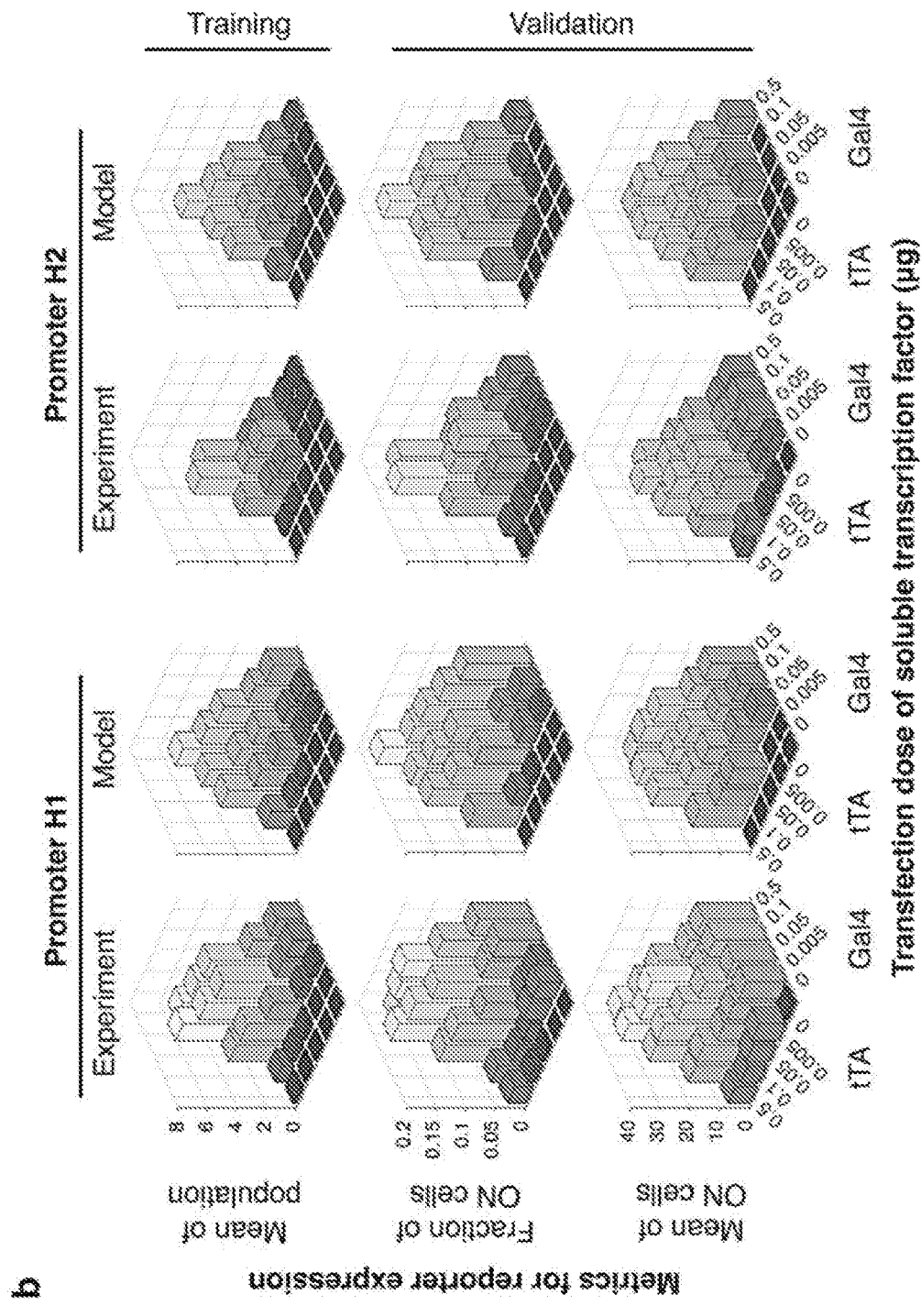
Figure 3:
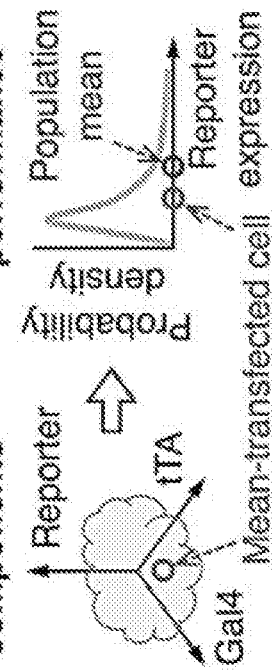
Figure 3:
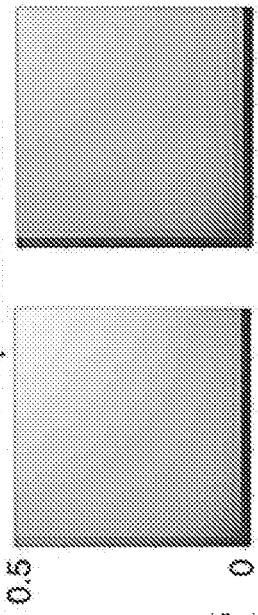
Figure 3:
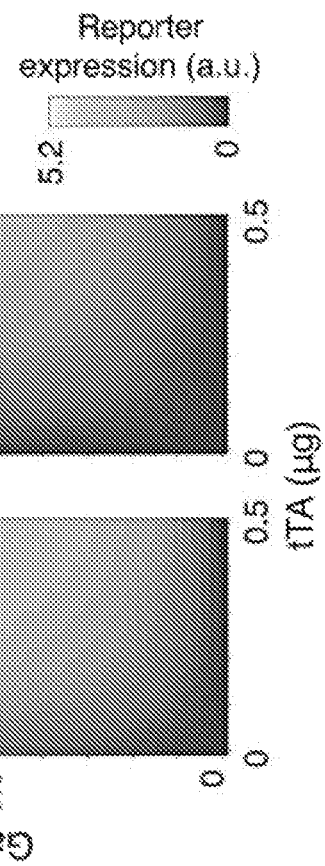

The parameters $w_T$ and $w_G$ are responsiveness to tTA and Gal4, respectively, and p is synergy. In silico populations were initialized using the intercellular variation model and calibrated to data in FIG. 1d (FIG. 3b, and in Supporting Information: Model Development, FIG. 15 and Tables M2-4). The calibrated parameter values indicate that between the two promoters, H1 is the more responsive and H2 is the more synergistic. H1 is 29× more responsive to Gal4 than tTA, H2 is 33× more responsive to Gal4 than tTA, the tTA response is 6.3× greater for H1 than H2, the Gal4 response is 5.5× greater for H1 than H2, and synergy is 21× greater for H2 than H1. Notably, even though the calibration utilized only the mean reporter measurements from experiments to generate parameter values, the model successfully predicted trends in the observed heterogeneity, including for the fraction of ON cells and the mean reporter expression within this subpopulation (FIG. 3b). These accurate predictions validate our statistical approach for describing intercellular variation and provide confidence that our whole-population modeling approach can account for how intercellular variation affects system performance.

An important feature of the dose-response landscapes was that the mean reporter expression (averaged across all transfected cells) was consistently greater than the reporter expression for a cell receiving the mean amount of each plasmid, i.e., the mean-transfected cell (see FIG. 3c and Supporting Information: Model Development). Cells that received greater than average plasmid amounts had even greater than average reporter expression, and the resulting reporter distributions were right-skewed. One implication is that the initial promoter characterization in FIG. 1d was in part driven by outlier cells that received relatively high amounts of plasmids in each condition. Since the characterization of not only the hybrid promoters, but also other genetic circuits with nonlinear behaviors, could potentially be driven by outlier cells, we posit that a model-guided investigation of single-cell outcomes in which intercellular variation is captured explicitly may improve the interpretation of such experimental results. Indeed, this approach has been used to substantial effect in the characterization of other engineered biological systems[34-35].

Elucidating Properties of Multiplexed Receptor Performance Using a Mechanistic Model.

Figure 4:
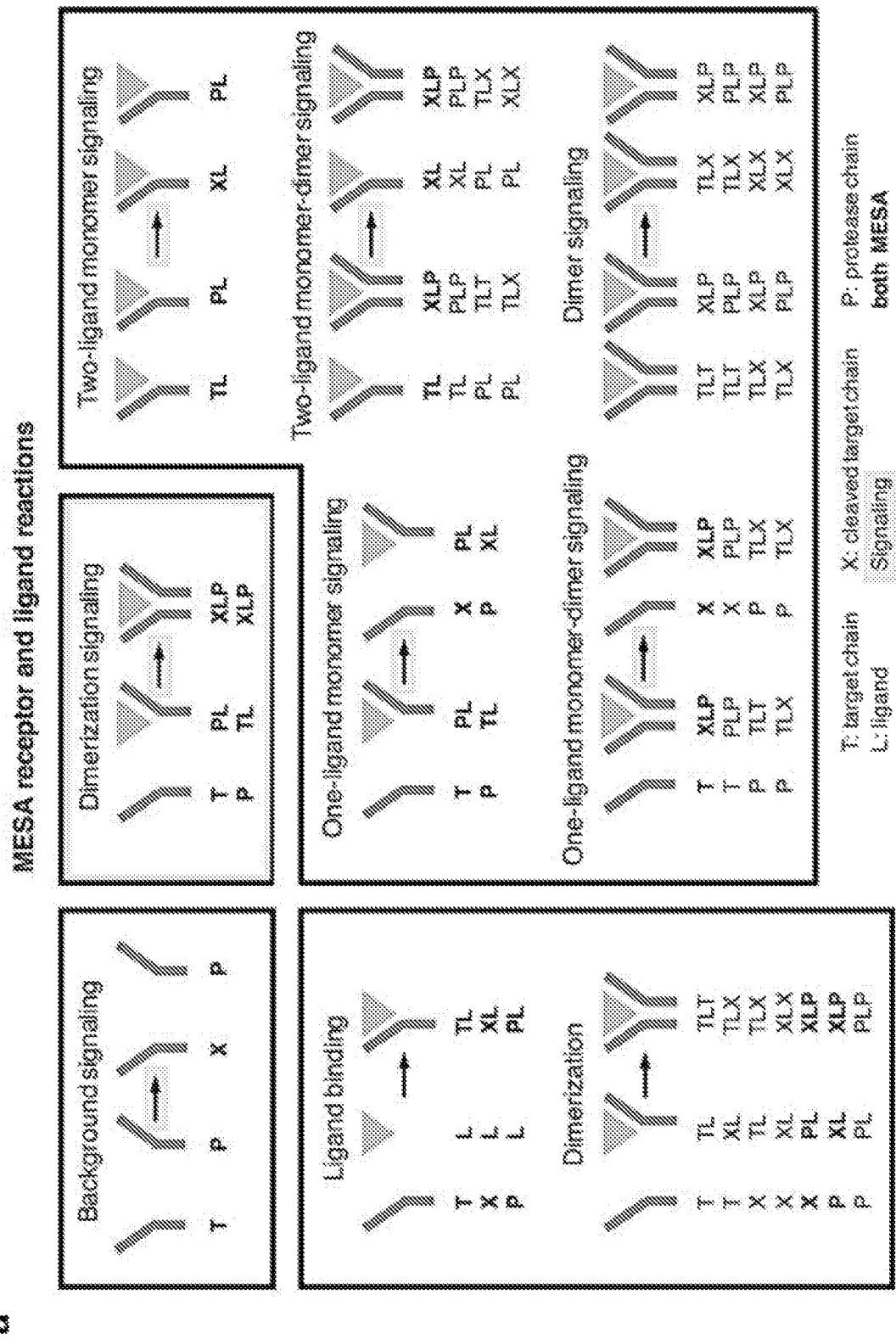
FIG. 4: A dynamical model that links MESA receptor signaling to promoter activity. (a) This illustration summarizes the species and reactions in the MESA model. There are 28 types of reactions, which are grouped into nine categories (named) and four modalities (boxed). Reactions that occur for both MESA (Rap-MESA and VEGF-MESA, which sense either rapamycin or vascular endothelial growth factor, respectively) are bolded, categories that release a soluble TF are highlighted (yellow arrow), and the modality for canonical ligand-induced signaling is highlighted (yellow box). For the four modalities: (1) background signaling is the only one that occurs in the absence of ligand, (2) ligand-binding and dimerization involve ligand but do not directly result in signaling, (3) dimerization signaling is the canonical ligand-induced pathway, and (4) the remaining categories involve, but are not directly mediated by, the ligand and are subject to crosstalk. (b) Data that were used to determine F.D.
Figure 4:
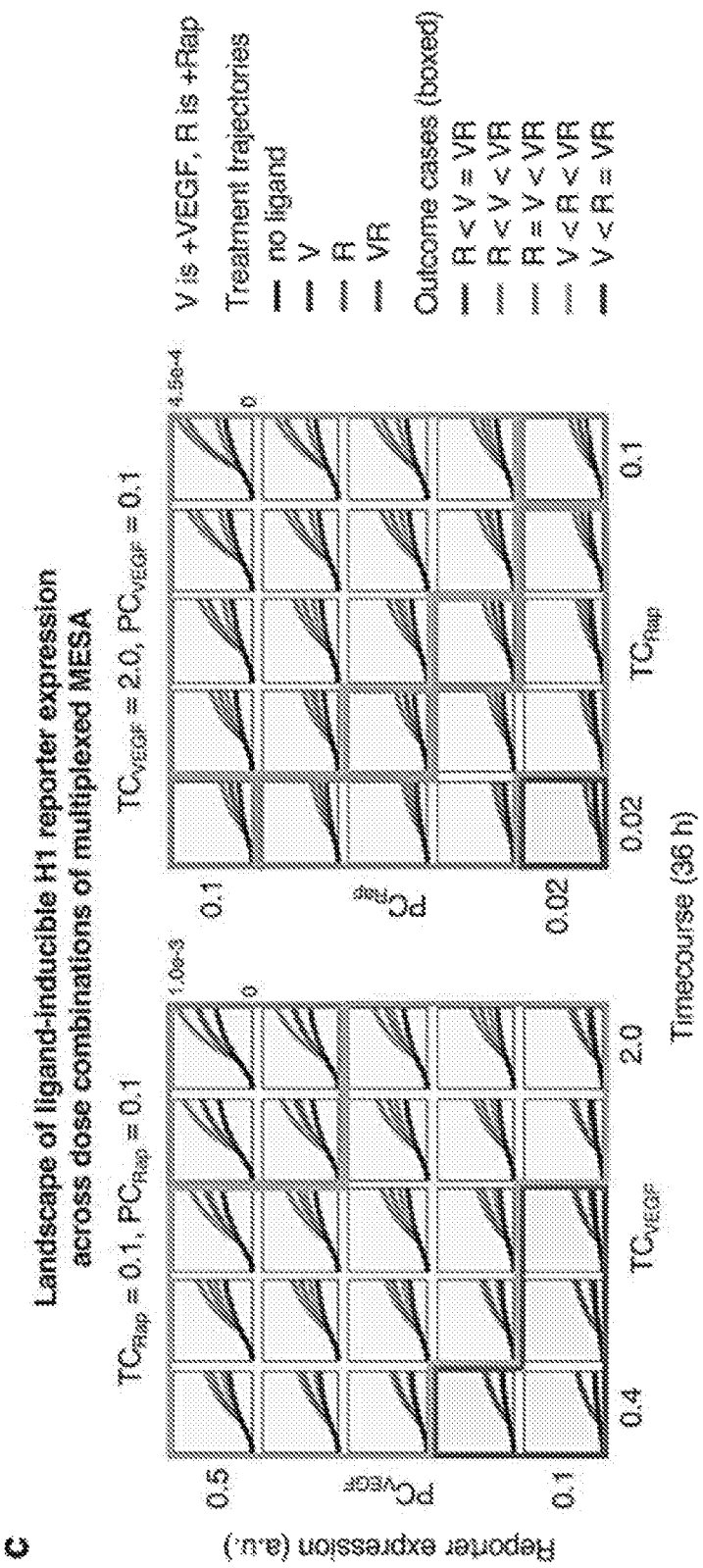
Figure 4:
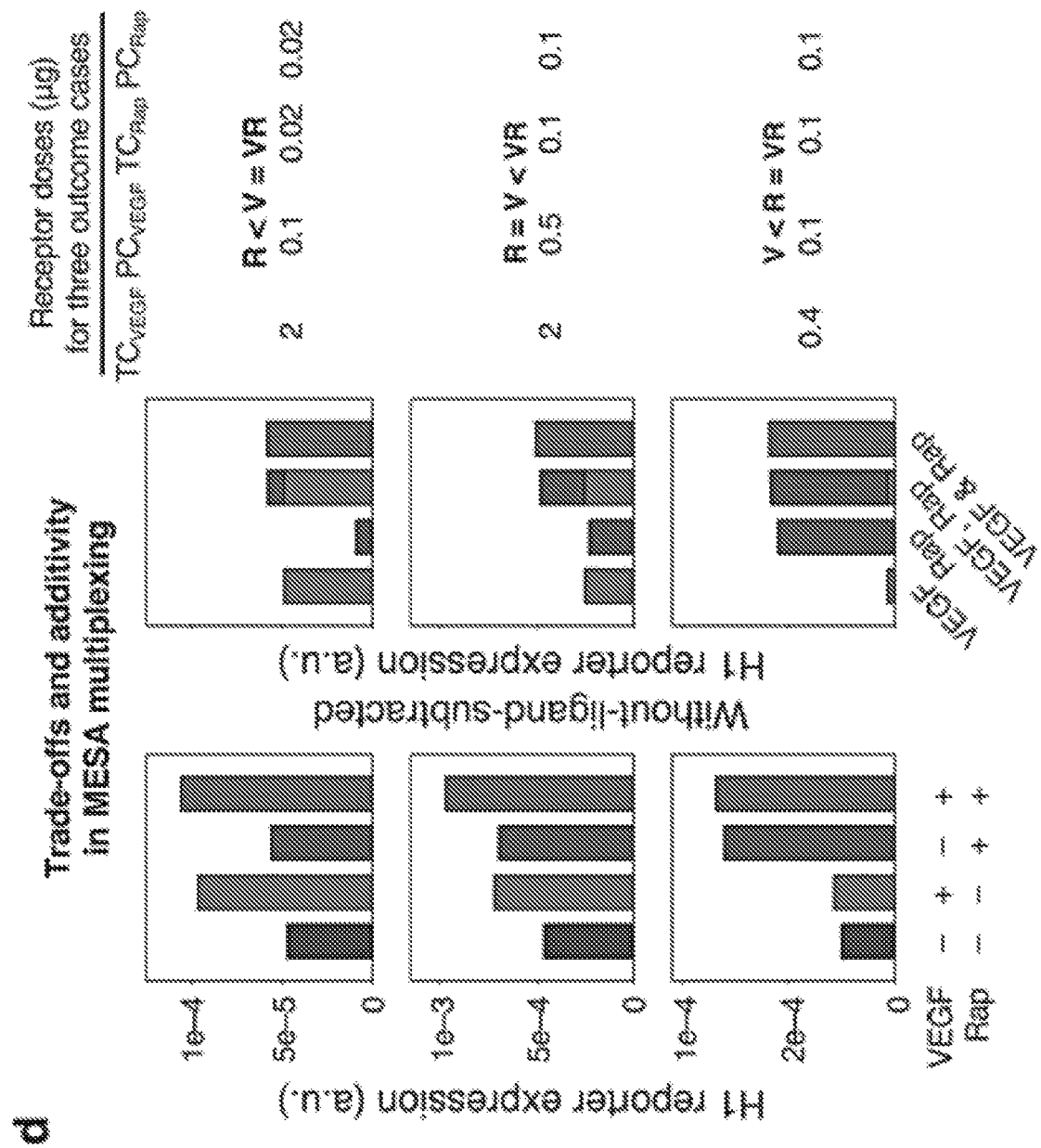

Having established a quantitative framework for describing the transcriptional layer, we next incorporated the MESA receptors. A dynamical model for multiplexed MESA signaling was formulated at a level of mechanistic granularity that includes salient interactions for various receptor complexes (FIG. 4a). Key features dictated by prior knowledge, including known receptor-ligand interactions and findings from previous experiments with MESA[7-8], are: receptors are synthesized intracellularly, exocytosed to the plasma membrane, and degrade from both compartments; rapamycin can diffuse intracellularly, but VEGF cannot; VEGF-MESA can heterodimerize or homodimerize, and Rap-MESA can heterodimerize but not homodimerize; crosstalk in non-ligand mediated signaling is possible, because both MESA use the same PC protease and TC cleavage recognition sequence; and chains that recognize the same ligand can form stable dimers, but chains that recognize different ligands cannot (Supporting Information: Model Development, Table M5). Calibration of this mechanistic model to data in FIG. 2 provided estimates for the synthesis of receptors (relative to soluble proteins), background signaling, receptor degradation, ligand-binding to each MESA, and stable chain dimerization (Supporting Information: Model Development Table M6).

Figure 4B:
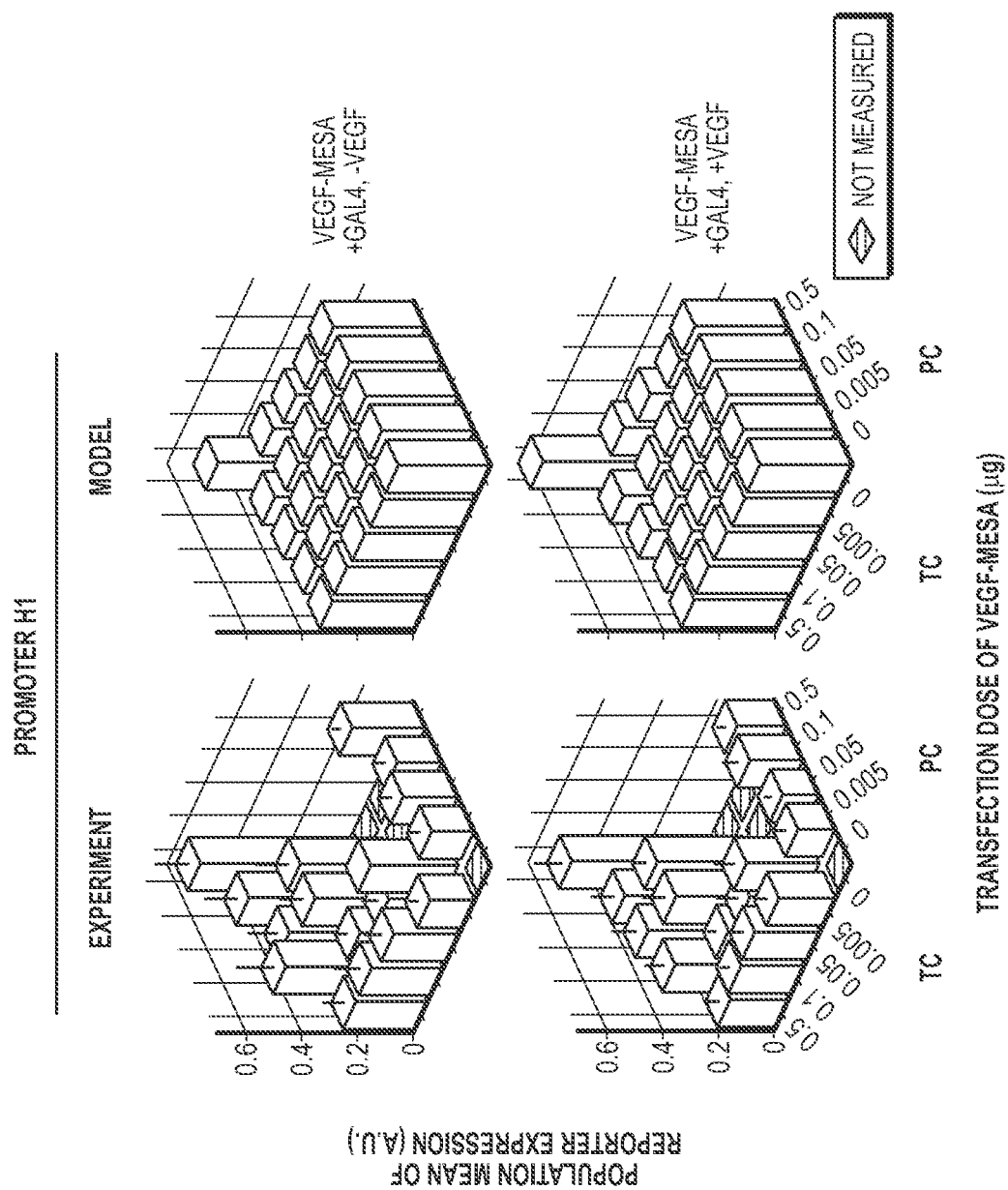

The model formulation is idealized, as it makes relatively few assumptions and avoids overfitting peaks and valleys that deviate from the main experimental trends. By smoothening (or discounting) individual outlier data points, such an analysis improves the overall interpretability of the dose-response landscape. When comparing observed vs. simulated ligand-inducible VEGF-MESA signaling in the presence of excess Gal4, the simulations were consistent with observed trends (FIG. 4b). For a constitutively soluble TF and a MESA receptor (TC and PC) transfected at the same plasmid dose, the TF tended to contribute more to promoter activity. A model-guided interpretation for this outcome is that (1) rapid production of soluble TFs (relative to receptors) offsets rapid degradation, leading to high accumulation (Supporting Information: Model Development), and (2) for the receptors, not all target chains are cleaved following ligand treatment. We next analyzed the multiplexed receptors at different plasmid doses, and in doing so identified a trade-off for multiplexing: tuning receptor levels to increase the difference in two-ligand induced reporter expression with respect to one ligand consistently led to a decrease in the difference with respect to the other ligand. To highlight this effect, we grouped reporter trajectories into different outcome cases (FIG. 4c and Supporting Information: Model Development). Examining three examples in more detail (FIG. 4d) shows that across different receptor doses, reporter expression was additive: the two-ligand induced increase in reporter expression above background equaled the sum of both single-ligand induced increases above background. The additivity indicates that promoter activity had a linear dependence on the TFs in these experiments, rather than the synergy that would be expected for the AND gate promoters based upon characterizations with constitutively soluble TFs (FIG. 1). We note that within any population, some individual cells may perform better than others, and that altering time points for ligand treatment and reporter measurement may modestly increase F.D. (Supporting Information: Model Development). However, overall, the findings support the conclusion that the amounts of TFs released from receptors were below the amounts required to leverage promoter synergy, and so the system exhibited an additive rather than synergistic response to ligand combinations.

Figure 5:
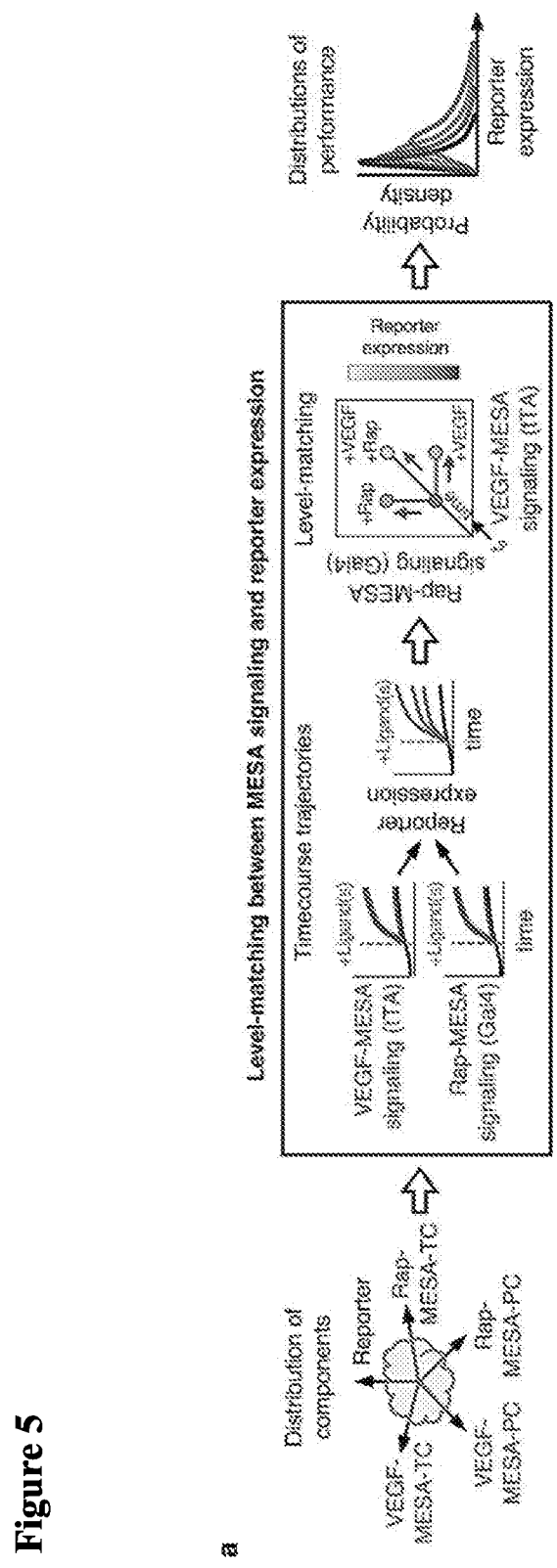
FIG. 5: Level-matching between receptor signaling and the promoter. (a) Level-matching is depicted by yo-yo plots, which represent the trajectories of free TF and reporter variables together and without using a time axis. Reporter expression across the time course (the "string") and at the circled endpoint (the "yo-yo", corresponding to the time point for experimental measurements) is indicated using a color scale. Each profile begins at the origin, proceeds through state space depending on plasmid doses and treatment with either, both, or no ligand, and concludes at the circled coordinate. (b) Quantitative outcomes for each ligand treatment are shown for varied plasmid doses in three scenarios: (1) two constitutively soluble TFs, (2) one constitutively soluble TF and one MESA receptor, and (3) two MESA receptors. TFs are in comparable arbitrary units (a.u.), and reporter expression is color-coded by reporter-specific a.u. Profiles in which the circled coordinate differs from the maximum coordinate along a given axis indicate that the trajectory of the corresponding TF peaks and decreases during the time-course. Diagonal lines indicate that the trajectories of both TFs are changing proportionately, curved lines indicate that both are changing and in a way that is not proportional, and vertical and horizontal lines indicate that one is changing while the other has reached a steady state. In the second scenario, only the TF released from MESA (and not the constitutively soluble TF) is plotted, and a slight downward curvature for the 36 h time course is shown for clarity. In the third scenario, ideal level-matching for AND gate functionality would be conferred by TF trajectories that lead to much higher reporter expression with both ligands compared to either or no ligand. In such a scenario, the upper-right yo-yo would be the only one of the four that is able to leverage the synergistic regime of the hybrid promoter.
Figure 5B:
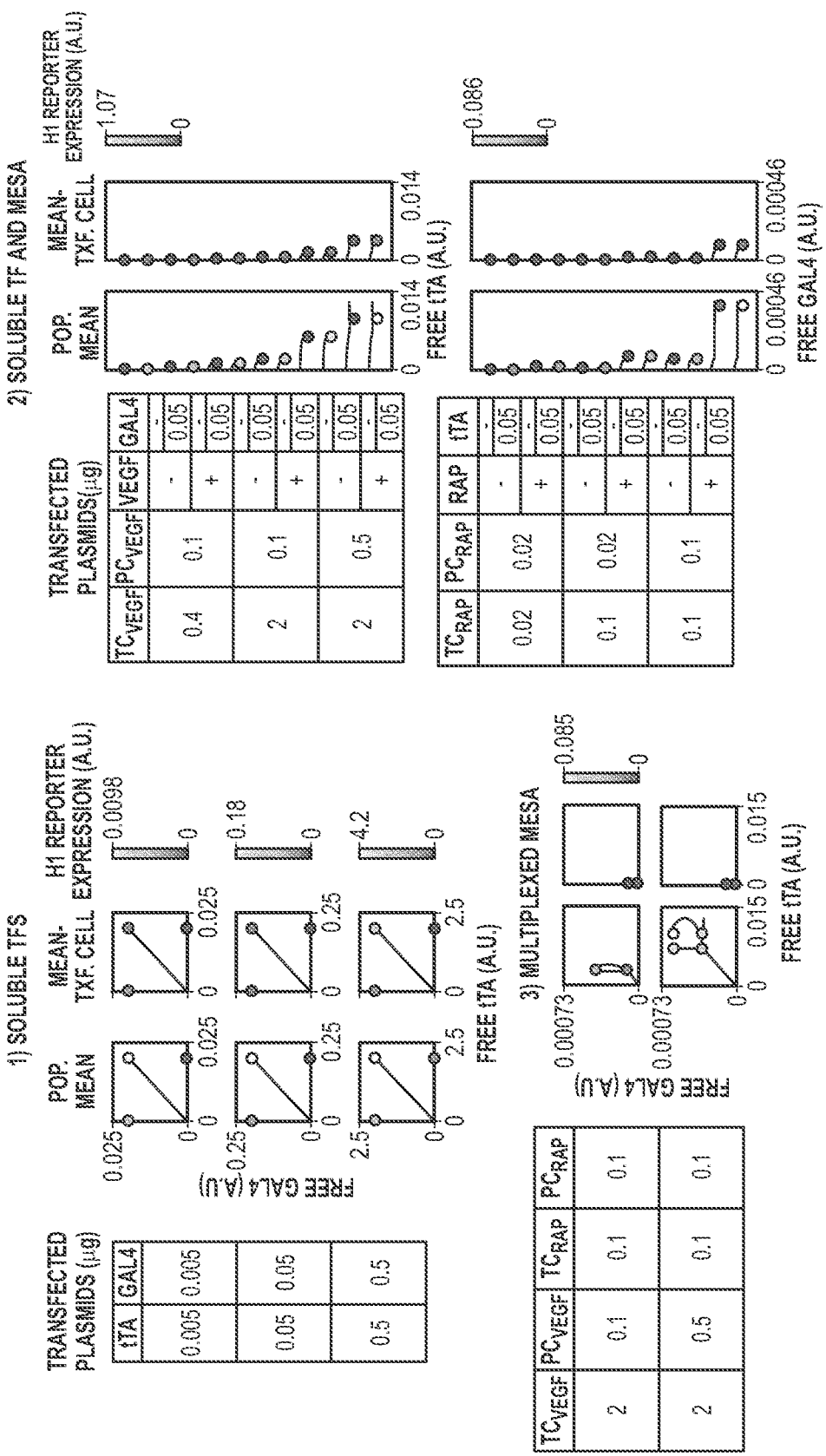

To better understand how multiplexed receptors integrate with the hybrid promoter, we next systematically investigated the role of level-matching, i.e., the relationship between the amounts of TFs that are released by receptors under different ligand treatments, and the amounts that are required to activate promoter synergy uniquely in the case when both ligands are sensed. This relationship is challenging to observe or elucidate through experiments alone, yet it is also key for explaining multiplexed receptor performance. Since nonlinear TF profiles from ligand-induced signaling depend on more components and are more complex than their linear counterparts from experiments with constitutively expressed soluble TFs, we could not visualize level-matching with a dose-response landscape as in FIG. 3b. Therefore, we opted to introduce a new graphical representation, which we term yo-yo plots, in which multiple time-course TF trajectories with various ligand combinations are represented simultaneously without using a time axis, and reporter expression across the timecourse (the "string") and at the endpoint (the "yo-yo") is indicated using a color scale (FIG. 5a). Using this approach, we examined how free TFs were released over time under conditions corresponding to those used in level-matching experiments (FIG. 5b). The analysis confirmed our expectation that mean reporter outcomes were driven by outlier dynamics. Furthermore, it shows how outlier effects became magnified as each constitutively soluble TF was replaced by the two chains for a receptor. Across experiments, reporter expression for the population mean was consistently greater than for the mean-transfected cell, which poses a challenge to achieving level-matching by simply tuning dosages of system components. Moreover, these analyses confirmed that across the various MESA doses evaluated in experiments, the amounts of TFs released by the receptors were below the levels required to induce synergistic activation of the H1 promoter. Altogether, this case study illustrates how model-guided analysis of combined sensor (MESA) and processor (promoter) modules can identify quantitative properties that benefit and that limit system performance. This approach may also be inverted to guide the selection of components with properties that achieve specific performance goals.

Promoter and Receptor Engineering Strategies to Improve AND Gate Functionality.

Given the bounds on AND gate performance discussed above, we further leveraged this case study to explore whether model-guided design could identify promoter and receptor properties that better achieve performance goals, relative to the existing constructs examined above. In this prospective analysis, we considered parameter values that could reasonably be implemented physically, even if it is not yet possible to predict which specific physical modification would result in a specific new parameter value. One benefit of using a mechanistic model, as opposed to a more abstract formalism, is that the parameters do ultimately correspond to physical features that in future investigations could be tuned by making corresponding biomolecular design choices. For example, background signaling could be decreased by mutating the protease active site, protease cleavage sequence, or transmembrane domain, or ligand binding could be modulated by mutating or replacing the ECD. Thus, a computational exploration of potentially realizable scenarios could guide subsequent investigations.

Figures 6A, 6B:
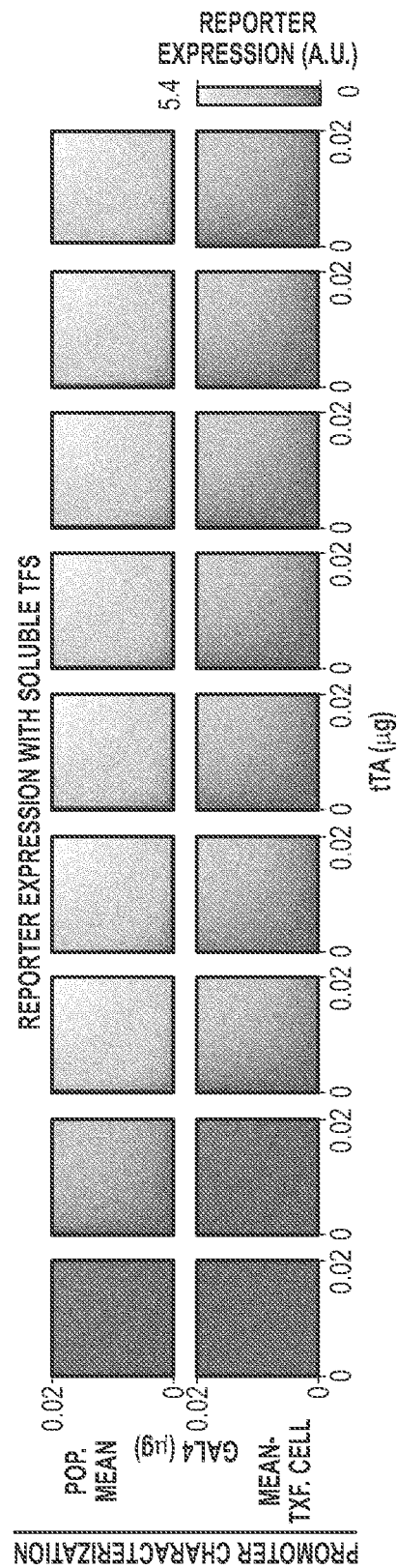
FIG. 6: Promoter engineering to improve AND gate performance. (a) Hypothetical promoters were produced in silico and vary in responsiveness to each TF and/or in synergy. Multipliers for transcriptional weight parameters in cases #3-9 are in comparison to case #2, in which tTA responsiveness is set equal to Gal4 responsiveness. Case #2 is a responsiveness-balanced version of H1 (base case, #1). (b) Promoters were characterized by reporter expression for the population mean (top row) and the mean-transfected cell, using doses of constitutively soluble TFs that match the inferred range of TFs released in MESA signaling. (c) Multiplexed MESA performance with each promoter was assessed by a sweep of 1,000 receptor plasmid dose combinations (0 to 0.5 µg per plasmid), each of which is represented by a single data point on each plot. Plots report three performance metrics: two-ligand induced F.D. calculated with respect to (1) treatment with VEGF alone (x-axis), (2) treatment with rapamycin (y-axis), and (3) no ligand (color-coded). In each case, these metrics are calculated for the mean-transfected cell in a population. Better AND gates are realized towards the upper-right region of each plot. All three F.D. metrics cannot be maximized simultaneously, as evidenced by the absence of outcomes in the upper-rightmost corner, since choosing plasmid doses that maximize any one metric comes at the expense of decreasing one or both others. Therefore, the best possible AND gate functionality requires each metric to be maximized only to an extent, and in a way that balances the trade-off with the others. A representative ideal instance for each case is indicated by a box and is examined further in (d) and (e). The best promoter overall (#6) is outlined in yellow. (d) A comparison of reporter expression for instances identified by the boxes in (c), still using the mean-transfected cell. (e) Effects of cell variation on the three F.D. metrics. X-axis numbers are multipliers for the relative amounts of plasmids received by cells (determined without the variance from the minor principal component that is due to cotransfection), such that a value of "1" is the mean-transfected cell. The multipliers $\frac{1}{16}$, $\frac{1}{4}$, 1, and 4 correspond to the $23^{rd}$, $45^{th}$, $62^{nd}$, and $85^{th}$ percentiles, respectively, for amounts of plasmids received by a cell in a transfected population, as determined from the intercellular variation model. Each line represents the F.D. outcomes from 31 different simulations of increasing plasmid dose, from left to right. Greater robustness to intercellular variation (in context of the specific plasmid doses for each of the nine cases) is indicated by increases in F.D. across a wider range of x-axis values.

To anchor our parameter exploration, we specified hypothetical constructs in which properties were varied relative to an experimentally observed base case. H1 served as a base case (promoter #1) for testing hypothetical promoters in silico that vary in responsiveness to each TF and/or in synergy (FIG. 6a). Properties of promoters (cases #3-9) are reported relative to promoter #2 (H1_), in which tTA responsiveness was set equal to Gal4 responsiveness. For a controlled comparison between promoters #3-9, we chose transcriptional weights that yielded dose-response landscapes that differ from the base case but that resemble each other's maximal activity within the range of TF doses examined (FIG. 6b). Importantly, this range more closely matches the inferred range of TFs released from MESA signaling (FIG. 5), and synergistic activation for the new promoters occurs within this experimentally relevant range.

To assess how each promoter affects MESA multiplexing, and to avoid bias toward any dose-specific implementation, we conducted a four-dimensional sweep of receptor doses. The outcome for the mean-transfected cell from each population is presented as one data point in the plot for each promoter (FIG. 6c). F.D. for the two-ligand case relative to each one-ligand case is indicated by the position along the horizontal and vertical axes, and F.D. for the two-ligand case relative to the no-ligand case is indicated by the color scale. Perimeters define the performance bounds of the promoters, and the most ideal AND behavior is realized along the upper-right region, where the two-ligand F.D. is greater than each one-ligand F.D. and the trade-off with respect to each individual ligand (as described in FIG. 4d) has been balanced. For each case, a selected ideal outcome is denoted by a box. As was observed with the soluble TF sweeps, simply setting the responsiveness of each TF to be the same (#2) conferred minimal changes; however, large improvements in AND functionality were realized by increasing promoter synergy either alone (#6) or in combination with TF responsiveness (#7-9). To interpret the selected ideal F.D. outcomes in FIG. 6c, we examined reporter expression (FIG. 6d). Compared to promoter #1, reporter expression with different ligand treatments increased by ~50× with promoter #2, and by up to another order of magnitude with promoters #3-9.

However, improved AND gate functionality did not necessarily follow from changes that conferred the largest increases in expression (e.g., promoter #4); rather, improvements arose from the largest difference in increased expression between the two-ligand case and one-ligand cases (e.g., promoter #6).

To evaluate the effects of intercellular variation, we calculated F.D. across a range of amounts of total plasmid that is received by transfected cells (FIG. 6e). The maximum F.D. for each promoter was achieved by a subpopulation, and the location of this window differed between promoters. Interestingly, while the base case was the lowest performing, it was the most robust to variation in plasmid dose, with a relatively flat profile. Promoters #3-9 exhibited distinct maxima for F.D. at specific plasmid doses and exceeded the maximum F.D. of promoter #1, indicating that for these hypothetical promoters, obtaining transfected cells with intermediate amounts of plasmids (given the specified dose) would confer maximal performance. Alternatively, any strategy that reduces intercellular variation in expression levels, such as genomic integration of MESA expression constructs, may improve the performance of such promoters, although this appears to be less promising for the existing H1 promoter. Additional promoters were examined with larger effect-magnitudes for the same types of changes as in FIG. 6a, but these changes had diminishing returns on performance, and further improvements were modest (Supporting Information: Model Development). Altogether, this systematic analysis provides new insights into how future promoters may be designed, evaluated, and utilized in combination with MESA receptors, depending on the performance objectives sought.

Figures 7B, 7C, 7D:
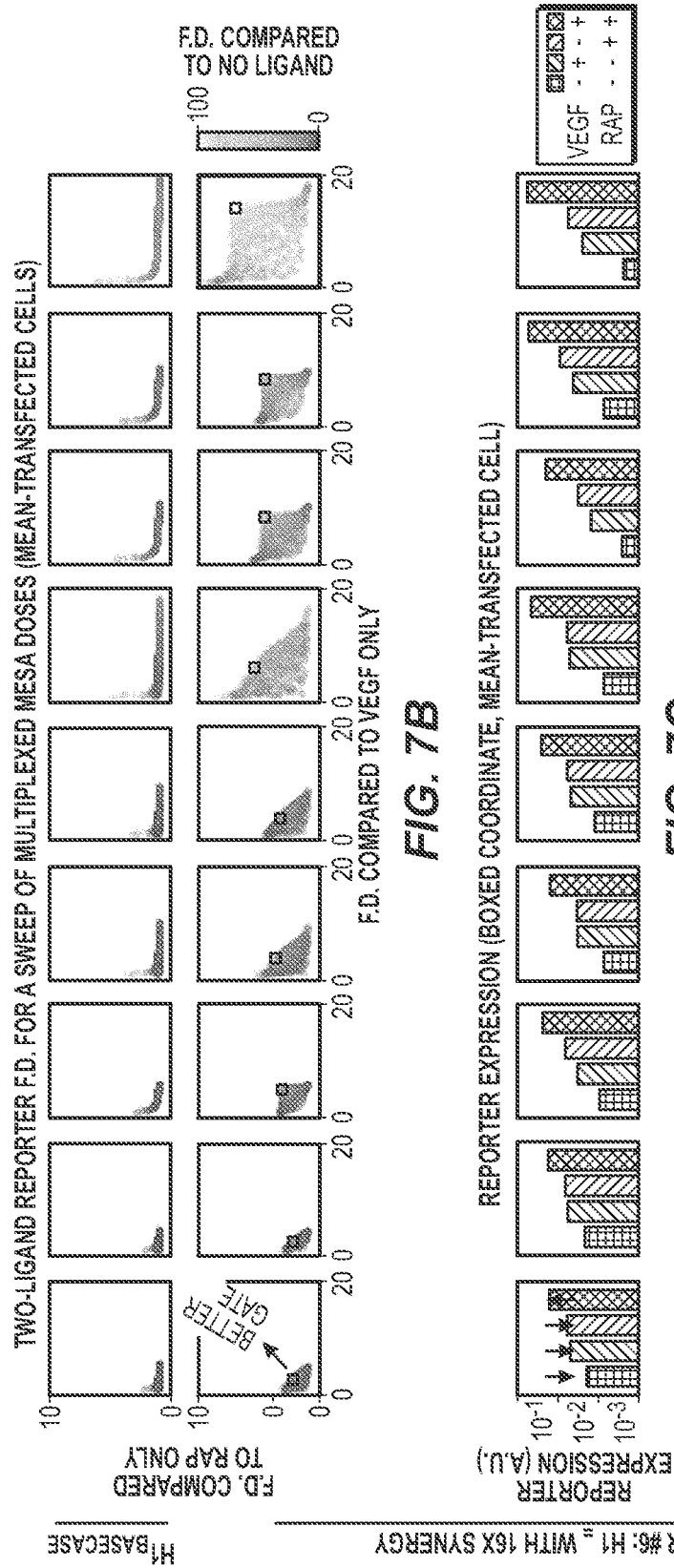
FIG. 7: Receptor engineering to improve AND gate performance (a) Hypothetical modifications to MESA receptor kinetics and design features were produced in silico, in reference to the MESA base case (#1). Receptor cases #2-5 are modifications to #1, and #6-9 are combinations of the modifications in #3-5. (b) Multiplexed MESA performance was assessed and plotted as described in FIG. 6c. Outcomes are shown for two promoters: base case (promoter #1, upper row) and a high-performing promoter from FIG. 6 (promoter #6, lower row). For promoter #6, a representative ideal instance for each receptor modification is indicated by a box and is examined further in (c) and (d), as described for similar investigations of promoter variations in FIG. 6. The best receptor overall (#9) is outlined in yellow.

We next investigated how MESA may be modified to tune performance in multiplexing applications. Mirroring our approach for exploring promoter variations, hypothetical but physically realistic modifications to receptor kinetics and biomolecular design were introduced individually and in combination in silico to generate a panel of distinct cases (FIG. 7a). For each case, system performance (F.D. +/- ligand) was compared to the base case, comprising our existing MESA receptor, which was paired with either the base case promoter (promoter #1) or the best hypothetical promoter from FIG. 6 (promoter #6) (FIG. 7b). Although making changes to the receptor while retaining the base case promoter had little impact on performance, larger improvements were possible with promoter #6. The greatest effects were conferred when multiple modifications were implemented together: orthogonal cleavage recognition sequences, slower basal cleavage, and faster ligand-induced receptor dimerization (receptor case #9). Examining the reporter expression shows how each modification affected F.D. (FIG. 7c). Importantly, not all intuitively attractive changes improved system performance, and so this analysis helps identify promising strategies. For example, decreasing the receptor degradation rate in receptor case #2 could increase the amount of TF that can be released, but this increases the background and one-ligand expression more than it increases two-ligand expression. In contrast, modifications such as receptor cases #6 and #9 increase the two-ligand induced signaling while maintaining or driving down background. That is, the amounts of TFs released when both ligands are sensed can activate the new promoter synergistically, whereas TF levels in the presence of neither or only one ligand drive much less promoter activation. We also found that although engineering both the promoter and receptors in combination still resulted in a scenario in which maximal F.D. was observed within windows of plasmid dose (FIG. 7d), AND behavior remained robust across about an order of magnitude in cell variation, representing a large subpopulation. Altogether, these results help to identify potential strategies that could be explored for engineering receptors and promoters to achieve level-matching in this particular case of implementing single-layer transcriptional logic. Moreover, the calibrated model developed in this study could be similarly leveraged to prospectively evaluate the future use and design of MESA for implementing other cell functions. More broadly, this approach highlights the utility of quantitative analyses that capture intercellular variation to guide the design of engineered systems that confer desired performance objectives.

CONCLUSIONS

In this study, we explored how MESA receptors may be multiplexed to implement cellular logic in response to environmental ligands. The specific logic investigated here—a single-layer transcriptional AND gate—serves as a useful test case for evaluating our strategy for tuning MESA signaling using both experimental and computational techniques to achieve level-matching with a downstream promoter. We anticipate that implementing other types of cellular logic may be achieved using a similar approach, that other engineered receptor/promoter systems may exhibit similar phenomenology, and that the construction of such custom biological functions may be realized by using in silico analysis to examine the system components and constraints and guide design choices. Furthermore, other logical programs may impose less stringent requirements for promoter or receptor design criteria. For example, an OR gate in which each MESA releases the same TF to induce a single-TF promoter should require less tuning. Since the output of each MESA receptor can be readily exchanged, our results suggest that other regulators such as zinc finger TFs[36] or Cas9-based TFs[37-38] could also be used to program cell functions via receptor multiplexing. Ultimately, MESA multiplexing comprises a new functional modality for engineering customized mammalian cellular programs for a variety of applications.

Materials and Methods

DNA Constructs.

Hybrid reporter constructs were assembled using oligonucleotides and standard molecular biology techniques and cloned into a pBI-YFP reporter (described previously[8]). For some experiments, the YFP reporter gene was replaced with DsRedExpress2 (here, DsRed) using standard restriction enzyme cloning. Development of VEGF-MESA and Rap-MESA was described previously[7-8]. To develop a Rap-MESA with the Gal4 TF, tTA on the original target chain was replaced with Gal4 (derived from a Notch1-Gal4 fusion construct generously gifted by Steven Blacklow[39]) using standard PCR and restriction enzyme cloning. Additionally: 1) for each chain, a 20 amino acid flexible glycine-serine linker was incorporated between the rapamycin binding extracellular domain (ECD) and the transmembrane domain, and 2) the transmembrane domain was modified to mirror the design of the more recently developed VEGF-MESA receptors[7]; though these design features are not required for Rap-MESA function, our recent work suggests such features generally confer more stable MESA expression on the cell surface, and thus a similar MESA architecture was implemented to facilitate receptor dose tuning experiments. DNA constructs and primers for cloning are listed in the Supporting Information.

Cell Culture and Transfection.

HEK 293FT cells (Life Technologies/Thermo) were maintained at 37° C. and 5% $CO_2$ in Dulbecco's modified growth medium supplemented with 10% FBS, 1% penicillin-streptomycin, and 2 mM L-glutamine (Life Technologies). Transient transfections were performed in 24-well plates seeded at $7.5 \times 10^4$ cells in 0.5 mL of media. At 6-8 h post-seeding, cells were transfected using the $CaCl_2$—HEPES-buffered saline (HeBS) method. All experiments included a BFP transfection control to determine transfection efficiency. At 12 h post-transfection, media was changed on all cells and, if applicable, rapamycin and/or VEGF were added by pre-mixing in the media to a final concentration of 100 nM rapamycin in 0.5% DMSO (Santa Cruz Biotechnology) or 250 ng/mL recombinant mouse VEGF-164 (BioLegend).

Flow Cytometry.

At 36 h post-transfection, samples were suspended in PBS with 2 mM EDTA and 5% bovine serum albumin. Approximately $1 \times 10^4$ single, live cells per sample were analyzed on a LSRII flow cytometer (BD Biosciences) that runs FACS-Diva software. Data were further analyzed and compensated utilizing FlowJo Software (Tree Star). Live, single cells were identified by scatter, and BFP-positive cells were gated as "transfected". Relative reporter expression (for DsRed or YFP) was calculated as described in the FIG. 1 caption.

REFERENCES

1. Fesnak, A. D.; June, C. H.; Levine, B. L., Engineered T cells: the promise and challenges of cancer immunotherapy. Nat Rev Cancer 2016, 16 (9), 566-81.
2. Schwarz, K. A.; Leonard, J. N., Engineering cell-based therapies to interface robustly with host physiology. Adv Drug Deliv Rev 2016.
3. Fedorov, V. D.; Themeli, M.; Sadelain, M., PD-1- and CTLA-4-based inhibitory chimeric antigen receptors (iCARs) divert off-target immunotherapy responses. Sci Transl Med 2013, 5 (215), 215ra172.
4. Kloss, C. C.; Condomines, M.; Cartellieri, M.; Bachmann, M.; Sadelain, M., Combinatorial antigen recognition with balanced signaling promotes selective tumor eradication by engineered T cells. Nat Biotechnol 2013, 31 (1), 71-5.
5. Roybal, K. T.; Rupp, L. J.; Morsut, L.; Walker, W. J.; McNally, K. A.; Park, J. S.; Lim, W. A., Precision Tumor Recognition by T Cells With Combinatorial Antigen-Sensing Circuits. Cell 2016, 164 (4), 770-9.
6. Morsut, L.; Roybal, K. T.; Xiong, X.; Gordley, R. M.; Coyle, S. M.; Thomson, M.; Lim, W. A., Engineering Customized Cell Sensing and Response Behaviors Using Synthetic Notch Receptors. Cell 2016, 164 (4), 780-791.
7. Schwarz, K. A.; Daringer, N. M.; Dolberg, T. B.; Leonard, J. N., Rewiring human cellular input-output using modular extracellular sensors. Nat Chem Biol 2017, 13 (2), 202-209.
8. Daringer, N. M.; Dudek, R. M.; Schwarz, K. A.; Leonard, J. N., Modular Extracellular Sensor Architecture for Engineering Mammalian Cell-based Devices. ACS Synthetic Biology 2014, 3 (12), 892-902.
9. Anderson, J. C.; Voigt, C. A.; Arkin, A. P., Environmental signal integration by a modular AND gate. Mol Syst Biol 2007, 3.
10. Wang, B.; Kitney, R. I.; Joly, N.; Buck, M., Engineering modular and orthogonal genetic logic gates for robust digital-like synthetic biology. Nat Commun 2011, 2.
11. Moon, T. S.; Lou, C.; Tamsir, A.; Stanton, B. C.; Voigt, C. A., Genetic programs constructed from layered logic gates in single cells. Nature 2012, 491, 249-253.
12. Brödel, A. K.; Jaramillo, A.; Isalan, M., Engineering orthogonal dual transcription factors for multi-input synthetic promoters. Nat Comm 2016, 7.
13. Kramer, B. P.; Fischer, C.; Fussenegger, M., BioLogic gates enable logical transcription control in mammalian cells. Biotechnol Bioeng 2004, 87.
14. Marchisio, M. A.; Stelling, J., Automatic design of digital synthetic gene circuits. PLoS Comp Biol 2011, 7, e1001083.
15. Win, M. N.; Smolke, C. D., Higher-order cellular information processing with synthetic RNA devices. Science 2008, 322, 456-460.
16. Auslander, S.; Auslander, D.; Müller, M.; Wieland, M.; Fussenegger, M., Programmable single-cell mammalian biocomputers. Nature 2012, 487, 123-127.
17. Lohmueller, J. J.; Armel, T. Z.; Silver, P. A., A tunable zinc finger-based framework for Boolean logic computation in mammalian cells. Nucleic Acids Res 2012, 40, 5180-5187.
18. Bonnet, J.; Yin, P.; Ortiz, M. E.; Subsoontorn, P.; Endy, D., Amplifying genetic logic gates. Science 2013, 340, 599-603.
19. Siuti, P.; Yazbek, J.; Lu, T. K., Synthetic circuits integrating logic and memory in living cells. Nat Biotechnol 2013, 31 (5), 448-452.
20. Weinberg, B. H.; Pham, N. T. H.; Caraballo, L. D.; Lozanoski, T.; Engel, A.; Bhatia, S.; Wong, W. W., Large-scale design of robust genetic circuits with multiple inputs and outputs for mammalian cells. Nat Biotechnol 2017, 35, 453-462.
21. Regot, S.; Macia, J.; Conde, N.; Furukawa, K.; Kjellén, J.; Peeters, T.; Hohmann, S.; de Nadal, E.; Posas, F.; Solé, R., Distributed biological computation with multicellular engineered networks. Nature 2011, 469, 207-211.
22. Tamsir, A.; Tabor, J. J.; Voigt, C. A., Robust multicellular computing using genetically encoded NOR gates and chemical 'wires'. Nature 2011, 469, 212-215.
23. Ramalingam, K. I.; Tomshine, J. R.; Maynard, J. A.; Kaznessis, Y. N., Forward engineering of synthetic biological AND gates. Biochem Eng J 2009, 47, 38-47.
24. Schreiber, J.; Arter, M.; Lapique, N.; Haefliger, B.; Benenson, Y., Model-guided combinatorial optimization of complex synthetic gene networks. Mol Syst Biol 2016, 12, 899.
25. Yaman, F.; Bhatia, S.; Adler, A.; Densmore, D.; Beal, J., Automated selection of synthetic biology parts for genetic regulatory networks. ACS Synth Biol 2012, 1, 332-344.
26. Nielsen, A. A. K.; Der, B. S.; Shin, J.; Vaidyanathan, P.; Paralanov, V.; Strychalski, E. A.; Ross, D.; Densmore, D.; Voigt, C. A., Genetic circuit design automation. Science 2016, 352, aac7341.
27. Schukur, L.; Geering, B.; Charpin-El Hamri, G.; Fussenegger, M., Implantable synthetic cytokine converter cells with AND-gate logic treat experimental psoriasis. Sci Trans Med 2015, 7, 318ra201.
28. Gaber, R.; Lebar, T.; Majerle, A.; Ster, B.; Dobnikar, A.; Bencina, M.; Jerala, R., Designable DNA-binding domains enable construction of logic circuits in mammalian cells. Nat Chem Biol 2014, 10 (3), 203-8.

29. Gossen, M.; Bujard, H., Tight control of gene expression in mammalian cells by tetracycline-responsive promoters. Proc Natl Acad Sci USA 1992, 89 (12), 5547-51.
30. Sadowski, I.; Ma, J.; Triezenberg, S.; Ptashne, M., GAL4-VP16 is an unusually potent transcriptional activator. Nature 1988, 335 (6190), 563-4.
31. Prindle, A.; Hasty, J., Making gene circuits sing. P Natl Acad Sci USA 2012, 109 (42), 16758-16759.
32. Egbert, R. G.; Klavins, E., Fine-tuning gene networks using simple sequence repeats. P Natl Acad Sci USA 2012, 109 (42), 16817-16822.
33. Beal, J., Biochemical complexity drives log-normal variation in genetic expression. Engineering Biology 2017, 1 (1), 55-60.
34. Davidsohn, N.; Beal, J.; Kiani, S.; Adler, A.; Yaman, F.; Li, Y.; Xie, Z.; Weiss, R., Accurate predictions of genetic circuit behavior from part characterization and modular composition. ACS Synth Biol 2015, 4 (6), 673-81.
35. Beal, J.; Wagner, T. E.; Kitada, T.; Azizgolshani, O.; Parker, J. M.; Densmore, D.; Weiss, R., Model-driven engineering of gene expression from RNA replicons. ACS Synth Biol 2015, 4 (1), 48-56.
36. Khalil, A. S.; Lu, T. K.; Bashor, C. J.; Ramirez, C. L.; Pyenson, N. C.; Joung, J. K.; Collins, J. J., A synthetic biology framework for programming eukaryotic transcription functions. Cell 2012, 150 (3), 647-58.
37. Perez-Pinera, P.; Kocak, D. D.; Vockley, C. M.; Adler, A. F.; Kabadi, A. M.; Polstein, L. R.; Thakore, P. I.; Glass, K. A.; Ousterout, D. G.; Leong, K. W.; Guilak, F.; Crawford, G. E.; Reddy, T. E.; Gersbach, C. A., RNA-guided gene activation by CRISPR-Cas9-based transcription factors. Nat Methods 2013, 10 (10), 973-+.
38. Maeder, M. L.; Linder, S. J.; Cascio, V. M.; Fu, Y. F.; Ho, Q. H.; Joung, J. K., CRISPR RNA-guided activation of endogenous human genes. Nat Methods 2013, 10 (10), 977-+.
39. Gordon, W. R.; Vardar-Ulu, D.; L'Heureux, S.; Ashworth, T.; Malecki, M. J.; Sanchez-Irizarry, C.; McArthur, D. G.; Histen, G.; Mitchell, J. L.; Aster, J. C.; Blacklow, S. C., Effects of S1 cleavage on the structure, surface export, and signaling activity of human Notch1 and Notch2. PLoS One 2009, 4 (8), e6613.

Example 2—Supporting Information: Model Development

Reference is made to the Supporting Information: Model Development which accompanies the manuscript entitled "Multiplexed Engineered Receptors for Multiparametric Evaluation of Environmental Ligands," Hartfield, R. M., Schwarz, K. A., Muldoon J. J., Bagheri N., and Leonard J. N., ACS Synth Biol. 2017 Nov. 17; 6(11):2042-2055, the content of which is incorporated herein by reference in its entirety.

Overview

Figure 13:
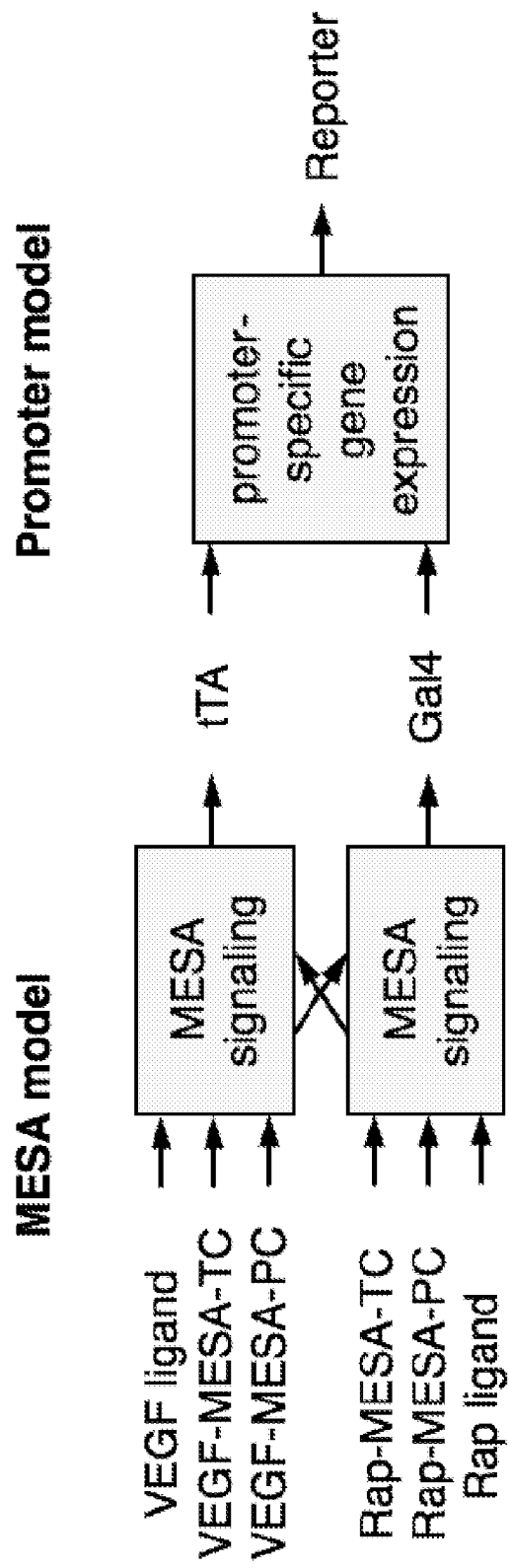
FIG. 13: Model overview. In the MESA model, target chain (TC) and protease chain (PC) proteins are expressed from plasmids that can be transfected at different doses, and transported via exocytosis to the cell surface. There are two MESA receptors—one senses VEGF and the other rapamycin (Rap)—which ligand-inducibly signal independently, but can exhibit crosstalk in non-ligand mediated signaling. Downstream of the receptors are the hybrid promoters H1 and H2, which are regulated by the transcription factors (TFs) tTA and Gal4. Each TF can be expressed either on a MESA target chain and potentially released by receptor signaling, or in constitutively soluble form that bypasses the requirement for receptor signaling. Promoter activity is characterized by measuring the expression (fluorescence) of a promoter-driven reporter protein.

This supporting information file describes the development, calibration, and analysis of the computational model for multiplexed MESA signaling and hybrid promoter activity, summarized in FIG. 13. We (1) present an approach to account for intercellular variation that arises from differences such as in transfection, transcription, and translation, (2) quantify the effect of variation on reporter expression, and (3) demonstrate how variation affects the experimental characterization and implementation of genetic circuits. Incorporating this variation explicitly into the model calibration and analysis enabled us to better explain experimental data, infer outcomes for individual cells, and predict strategies for receptor engineering and promoter engineering to improve AND gate performance Intercellular Variation Model Experiment.

To generate data for informing a model of intercellular variation, HEK293FT cells were cotransfected with three plasmids that each express a fluorescent protein constitutively (colors: red, green, blue). Cells were gated for live, singlets, and blue+ using flow cytometry. Post-gating distributions of red and green are analogous to post-gating distributions in other experiments that involve functional plasmids for MESA, soluble TFs, and inducible reporters. The marginal distribution of each fluorescent protein was bimodal on a log 10-scaled axis, and this distribution showed a wide range of expression across the population of cells (FIG. 14a). For the purposes of this model, we describe variability in plasmid dose as the main driver of inherent intercellular variation, although in fact such "inherent" variation depends on differences in transcription and translation rates between cells as well. Green and red fluorescence were correlated (r~0.8 on linear-scaled axes; r~0.9 on log 10-scaled axes), suggesting that if a cell received a low amount of one plasmid (and exhibited low expression of the corresponding fluorescent marker), then that cell likely received low amounts of other plasmids, and vice versa for cells that receive high amounts of plasmids, Model Development.

The marginal distribution for green fluorescence was estimated by formulating and training a bimodal log-scaled Gaussian mixture model (GMM) on the data (FIG. 14b). A candidate in silico population was produced by randomly co-sampling n values (one per plasmid) 200 times (one for each cell) from the GMM. The joint distribution of the resulting population (Z) can be represented as a 200×n matrix. This population size was chosen based on an empirical assessment for balancing two objectives: (1) have sufficient cells to resemble the kernel density estimate of the target marginal, and (2) avoid requiring excessive computational expense in subsequent simulations for parameter estimation. Since the GMM is bimodal and Gaussian, random sampling was conducted using a multivariate normal random number generator. The random numbers were transformed based on the mean and standard deviation (S.D.) for each of the two GMM modes. Since ~40% of the experimental population was estimated to be in the lower mode, 80 cells were drawn from the mean and S.D. of the lower mode and 120 from the mean and S.D. of the upper mode.

The covariance matrix (n×n) for the candidate population was calculated. If the pairwise correlation in each entry (other than entries along the diagonal) was within a user-specified window ($0.77 < r < 0.83$, which approximates the experimental correlation), then the candidate was accepted. However, if at least one entry was outside of the window, then the procedure was repeated by generating new candidates until one was accepted. For n=5 plasmids, the number of candidates that were tested before one was accepted varied between ~104 to 106. The resulting population exhibited the expected marginal and joint distributions. Each linear-scaled distribution was normalized to a mean of one arbitrary unit of plasmid that a cell receives per microgram of plasmid transfected in a well of a 24-well plate (a.u. μg−1), so that in subsequent model simulations the transfection dose (μg) could be specified via a scalar multiplier to the dose of each plasmid Model Analysis.

The intercellular variation model attributes population variability to two sources-1) inherent intercellular variation including the varied amounts of plasmids received in the transfection procedure, and 2) the cotransfection of multiple plasmids—which contribute their effects as orthogonal vectors. Principal component analysis on Z showed that, for two plasmids, cotransfection explained 10% of the variance and intercellular variation explained 90%. For five plasmids, the percentage explained by intercellular variation decreased modestly to 84%. Therefore, if the number of plasmids were decreased by cloning multiple genes onto the same plasmid, even if the total number of plasmids decreased substantially, this strategy would be predicted to eliminate the minor source and not the major source.

Another prediction is that for a genetic circuit in which variance in the transfection procedure propagates nonlinearly to reporter expression, each plasmid's variation over several orders of magnitude could be magnified multiplicatively. Additionally, the covariance between cotransfected plasmids could exacerbate the incidence of lower and upper extremes in reporter expression, because cells that receive low or high amounts of one plasmid are likely to receive similar amounts respectively of other cotransfected plasmids.

Logic Gate Promoter Model Experiment.

Figure 15:
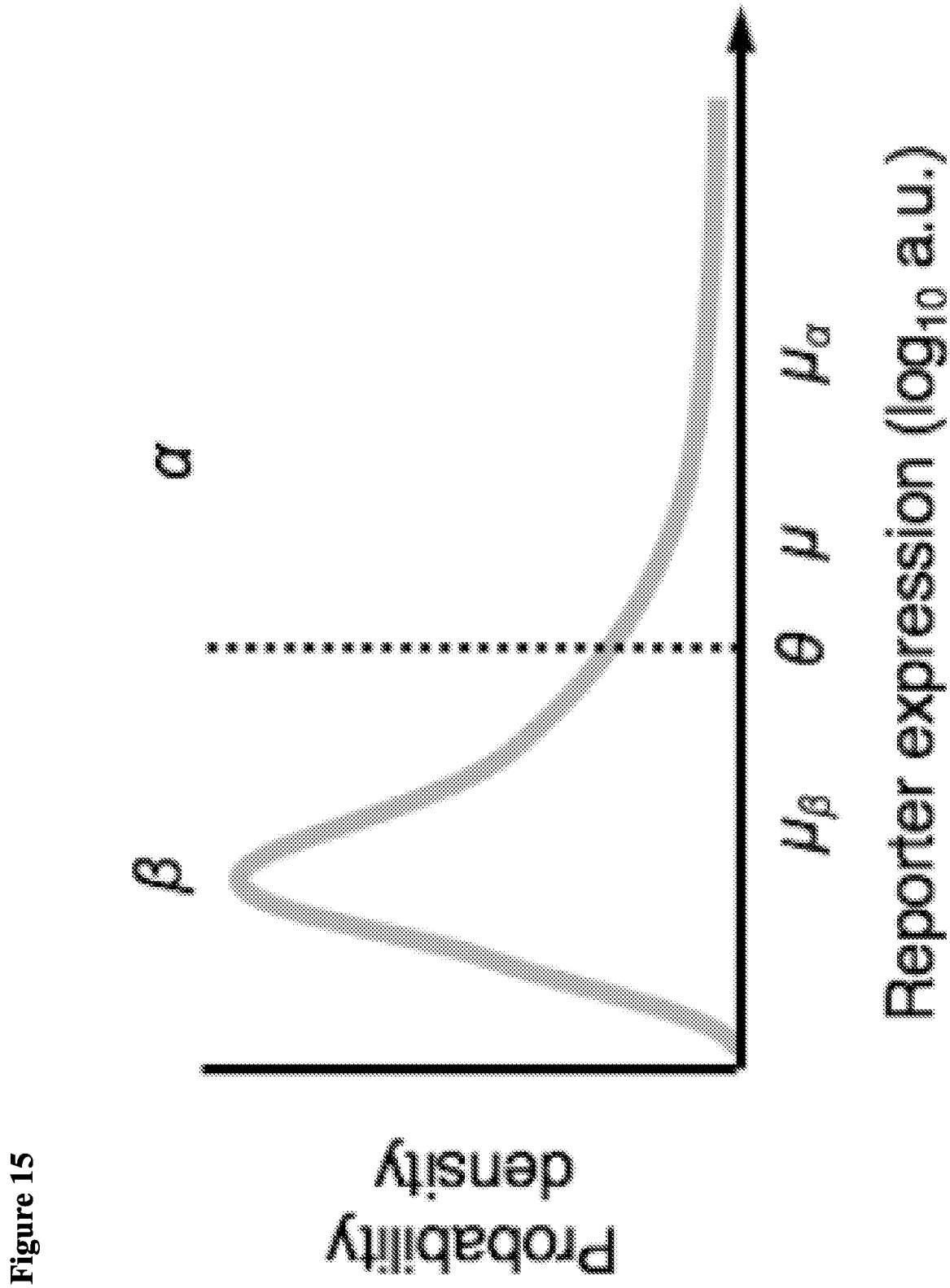
FIG. 15: Metrics for heterogeneous reporter expression. Metrics are: θ: Threshold for ON vs. OFF. α: Proportion of ON cells. β: Proportion of OFF cells. µ: Population mean. µα: ON subpopulation mean. µβ: OFF subpopulation mean.

We observed by flow cytometry that most cells transfected with plasmids for the TFs and reporter expressed the reporter protein at fluorescence levels comparable to cells that were transfected with reporter only. Across experiments, a small subpopulation was distinguishably "ON". To describe this heterogeneity, we define several metrics, which can be applied to both the experiments and simulations (FIG. 15).

The percentages of ON cells in experiments corresponding to figures in the main text (indicated in the parentheses) are shown below, rounded to the nearest tenth of a percent (Tables M1a-1).

TABLE M1a

Two soluble TFs with H1 promoter (for FIG. 1d).

| | | Soluble tTA (µg) | | | | |
|---|---|---|---|---|---|---|
| | Dose | 0 | 0.005 | 0.05 | 0.10 | 0.50 |
| Soluble Gal4 (µg) | 0 | | <0.1 | <0.1 | 0.6 | 1.3 | 3.1 |
| | 0.005 | 0.4 | 0.4 | 8.0 | 2.4 | 11.4 |
| | 0.05 | 2.6 | 3.0 | 14.3 | 10.9 | 11.4 |
| | 0.10 | 7.2 | 7.5 | 18.1 | 16.6 | 17.8 |
| | 0.50 | 9.2 | 13.6 | 18.1 | 17.3 | 16.2 |

TABLE M1b

Two soluble TFs with H2 promoter (for FIG. 1d).

| | | Soluble tTA (µg) | | | | |
|---|---|---|---|---|---|---|
| | Dose | 0 | 0.005 | 0.05 | 0.10 | 0.50 |
| Soluble Gal4 (µg) | 0 | 0.1 | <0.1 | 0.1 | 0.1 | 0.8 |
| | 0.005 | 0.1 | 0.2 | 0.8 | 1.6 | 2.1 |
| | 0.05 | 1.3 | 1.2 | 5.8 | 5.9 | 10.3 |
| | 0.10 | 1.9 | 2.6 | 10.6 | 10.0 | 17.5 |
| | 0.50 | 4.0 | 5.3 | 9.2 | 8.5 | 16.0 |

TABLE M1c

Rap-MESA and soluble tTA with H1 promoter (for FIG. 2a).

| | | Rap-TC (µg) | | | | | | |
|---|---|---|---|---|---|---|---|---|
| | Dose | 0 | 0.005 | 0.05 | 0.10 | 0.50 | 1.0 | 2.0 |
| Rap-PC (µg) | 0 | 0 | 0 | 0.1 | 0.1 | 0.4 | 0.8 | n/a | 0.1 |
| | 0.005 | 0.1 | 0.2 | 0.2 | 0.7 | 1.2 | 1.7 | 1.5 |
| | 0.05 | 0.2 | n/a | 0 | 1.0 | 1.6 | 1.6 | 1.3 |
| | 0.10 | 0.1 | n/a | n/a | 0.7 | 1.9 | 1.4 | 1.6 |
| | 0.50 | 0.1 | n/a | n/a | n/a | 1.8 | 1.9 | 1.6 |

TABLE M1d

Rap-MESA and soluble tTA with H1 promoter and Rap (for FIG. 2a).

| | | Rap-TC (µg) | | | | | | |
|---|---|---|---|---|---|---|---|---|
| | Dose | 0 | 0.005 | 0.05 | 0.10 | 0.50 | 1.0 | 2.0 |
| Rap-PC (µg) | 0 | 0 | 0 | 0.1 | 0.2 | 0.2 | 0.6 | n/a | 0.1 |
| | 0.005 | 0.1 | 0.2 | 0.2 | 0.6 | 0.9 | 1.2 | 1.3 |
| | 0.05 | 0.1 | n/a | <0.1 | 1.1 | 0.9 | 1.1 | 1.1 |
| | 0.10 | 0.1 | n/a | n/a | 1.2 | 1.7 | 1.2 | 0.9 |
| | 0.50 | 0.1 | n/a | n/a | n/a | 1.6 | 1.7 | 1.2 |

TABLE M1e

VEGF-MESA and soluble Gal4 with H1 promoter (for FIG. 2a).

| | | VEGF-TC (µg) | | | | | | |
|---|---|---|---|---|---|---|---|---|
| | Dose | 0 | 0.005 | 0.05 | 0.10 | 0.50 | 1.0 | 2.0 |
| VEGF-PC (µg) | 0 | 0 | 0 | 0.9 | 1.1 | 0.1 | 1.2 | n/a | 0 |
| | 0.005 | 0.7 | 1.5 | 1.1 | 0.1 | 1.8 | 7.6 | 9.2 |
| | 0.05 | 1.0 | n/a | 2.0 | 0.1 | 1.8 | 8.5 | 8.9 |
| | 0.10 | 0.9 | n/a | n/a | 0.2 | 2.0 | 9.8 | 13.2 |
| | 0.50 | 1.2 | n/a | n/a | n/a | 2.7 | 14.1 | 11.3 |

TABLE M1f

VEGF-MESA and soluble Gal4 with H1 promoter and VEGF (for FIG. 2a).

| | | VEGF-TC (µg) | | | | | | |
|---|---|---|---|---|---|---|---|---|
| | Dose | 0 | 0.005 | 0.05 | 0.10 | 0.50 | 1.0 | 2.0 |
| VEGF-PC (µg) | 0 | 0 | 0 | 1.0 | 1.0 | 1.1 | 1.0 | n/a | 0.1 |
| | 0.005 | 0.7 | 1.4 | 1.1 | 1.2 | 1.4 | 8.0 | 10.4 |
| | 0.05 | 0.7 | n/a | 2.0 | 1.5 | 2.1 | 8.3 | 9.3 |
| | 0.10 | 0.9 | n/a | n/a | 1.5 | 1.7 | 9.7 | 11.0 |
| | 0.50 | 1.0 | n/a | n/a | n/a | 2.8 | 12.3 | 10.8 |

TABLE M1g

Rap-MESA and soluble tTA with H2 promoter (for FIG. 2a).

| | | Rap-TC (μg) | | | | | |
|---|---|---|---|---|---|---|---|
| | Dose | 0 | 0.005 | 0.05 | 0.10 | 0.50 | 1.0 | 2.0 |
| Rap-PC (μg) | 0 | 0.2 | 0.1 | <0.1 | 0.3 | 0.7 | 4.9 | 2.7 |
| | 0.005 | 0.3 | 0.3 | 1.3 | 1.4 | 4.9 | 6.6 | 5.0 |
| | 0.05 | 0.1 | n/a | 1.2 | 2.7 | 4.4 | 7.3 | 4.8 |
| | 0.10 | <0.1 | n/a | n/a | 3.6 | 4.2 | 6.7 | 6.0 |
| | 0.50 | <0.1 | n/a | n/a | n/a | 4.8 | 6.2 | 4.4 |

TABLE M1h

Rap-MESA and soluble tTA with H2 promoter and Rap (for FIG. 2a).

| | | Rap-TC (μg) | | | | | | |
|---|---|---|---|---|---|---|---|---|
| | Dose | 0 | 0.005 | 0.05 | 0.10 | 0.50 | 1.0 | 2.0 |
| Rap-PC (μg) | 0 | n/a | n/a | n/a | n/a | n/a | n/a | n/a |
| | 0.005 | n/a | 0.5 | 1.0 | 1.4 | 3.8 | 3.3 | 4.7 |
| | 0.05 | n/a | n/a | 4.3 | 4.2 | 3.4 | 3.6 | 6.1 |
| | 0.10 | n/a | n/a | n/a | 1.4 | 2.6 | 4.2 | 6.4 |
| | 0.50 | n/a | n/a | n/a | n/a | 4.3 | 3.1 | 5.8 |

TABLE M1i

VEGF-MESA and soluble Gal4 with H2 promoter (for FIG. 2a).

| | | VEGF-TC (μg) | | | | | | |
|---|---|---|---|---|---|---|---|---|
| | Dose | 0 | 0.005 | 0.05 | 0.10 | 0.50 | 1.0 | 2.0 |
| VEGF-PC (μg) | 0 | 0.2 | 7.4 | 0.7 | 12.3 | 11.7 | 15.6 | 13.3 |
| | 0.005 | 12.8 | 11.3 | 10.4 | 13.8 | 14.4 | 15.5 | 14.3 |
| | 0.05 | 9.5 | n/a | 11.4 | 12.1 | 13.0 | 13.9 | 15.0 |
| | 0.10 | 9.5 | n/a | n/a | 12.8 | 17.8 | 14.9 | 17.2 |
| | 0.50 | 10.4 | n/a | n/a | n/a | 13.0 | 20.7 | 6.8 |

TABLE M1j

VEGF-MESA and soluble Gal4 with H2 promoter and VEGF (for FIG. 2a).

| | | VEGF-TC (μg) | | | | | | |
|---|---|---|---|---|---|---|---|---|
| | Dose | 0 | 0.005 | 0.05 | 0.10 | 0.50 | 1.0 | 2.0 |
| VEGF-PC (μg) | 0 | n/a | n/a | n/a | n/a | n/a | n/a | n/a |
| | 0.005 | n/a | 9.9 | 11.7 | 10.1 | 11.0 | 12.7 | 16.0 |
| | 0.05 | n/a | n/a | 11.9 | 10.4 | 13.6 | 12.8 | 16.3 |
| | 0.10 | n/a | n/a | n/a | 11.0 | 11.6 | 12.7 | 16.9 |
| | 0.50 | n/a | n/a | n/a | n/a | 12.3 | 19.1 | 7.7 |

TABLE M1k

Two MESA with H1 promoter, with and without each ligand (for FIG. 2b).

| Ligands | VEGF | − | + | − | + |
|---|---|---|---|---|---|
| | Rap | − | − | + | + |
| VEGF-PC (μg) | 0.005 | 0.3 | 0.5 | 0.4 | 0.7 |
| | 0.05 | 0.5 | 0.5 | 0.7 | 1.0 |
| | 0.10 | 0.4 | 0.3 | 1.4 | 2.1 |
| | 0.50 | 0.4 | 0.3 | 1.0 | 1.2 |

TABLE M1l

Two MESA with H2 promoter, with and without each ligand (for FIG. 2b).

| Ligands | VEGF | − | + | − | + |
|---|---|---|---|---|---|
| | Rap | − | − | + | + |
| VEGF-PC (μg) | 0.005 | 0.1 | <0.1 | 0.1 | <0.1 |
| | 0.05 | 0.1 | <0.1 | <0.1 | 0.1 |
| | 0.10 | <0.1 | <0.1 | 0.1 | <0.1 |
| | 0.50 | <0.1 | <0.1 | 0.1 | <0.1 |

Model Development.

An ODE model for synergistic transcriptional activation of the hybrid promoters H1 and H2 by two soluble TFs tTA and Gal4 was formulated (Tables M2 and M3). Included in the term for transcription of the reporter is fractional activation (f), which is a unitless quantity between [0, 1) for promoter activity. In the tables, units are: concentration in arbitrary units (U), time in hours (h), or not applicable (N/A).

$$f = \frac{w_T \cdot [tTA] + w_G \cdot [Gal4] + w_{TG} \cdot [tTA] \cdot [Gal4]}{1 + w_T \cdot [tTA] + w_G \cdot [Gal4] + w_{TG} \cdot [tTA] \cdot [Gal4]}$$

Dividing the effect of both TFs together by the responsiveness to each individual TF yields a metric for synergy: $\rho = w_{TG}/(w_T \cdot w_G)$ in units of U-1.

TABLE M2

Parameters for the promoter model.

| Parameters | Values | Units | Descriptions |
|---|---|---|---|
| z1, z2, z3 | varies | N/A | Varied amounts of each plasmid from transfection |
| ksyn | 1 | U h$^{-1}$ | Constitutive TF production (arbitrary scalar) |
| dF1 | varies | N/A | Transfection dose of soluble, tTA plasmid |
| dF2 | varies | N/A | Transfection dose of soluble Gal4 plasmid |
| kdegF1, kdegF2 | 2 | h$^{-1}$ | Degradation of each soluble TF(di Bernardo et al., 2011) |
| ktx | 1 | U h$^{-1}$ | Max. rate of transcription of reporter (arbitrary scalar) |
| kt1 | 1 | h$^{-1}$ | Translation of reporter (arbitrary scalar) |
| kdegRepR | 2.3 | h$^{-1}$ | Degradation of reporter RNA(Siciliano et al., 2011) |
| kdegRepP | 0.054 | h$^{-1}$ | Degradation of reporter protein(Siciliano et al. 2011) |

TABLE M3

System of ODEs for the promoter model.

| # | Variables | ODEs | Descriptions of reactions |
|---|---|---|---|
| 1 | F1 (tTA) | z1 * ksyn * dF1 − kdegF1 * [F1] | Production TF degradation |
| 2 | F2 (Gal4) | z2 * ksyn * dF2 − kdegF2 * [F2] | Production TF degradation |
| 3 | H1 RNA | z3 * ktx * f$_1$ ([F1], [F2]) − kdegRepR * [H1RNA] | Transcription Reporter RNA degradation |
| 4 | H1 protein | kt1 * [H1RNA] − kdegRepP * [H1Protein] | Translation Reporter protein degradation |
| 5 | H2 RNA | th3 * ktx * f$_2$ ([F1], [F2]) − kdegRepR * [H2RNA] | Transcription Reporter RNA degradation |
| 6 | H2 protein | kt1 * [H2RNA] − kdegRepP * [H2Protein] | Translation Reporter protein degradation |

After calibration of the 200-cell in silico population to experimental mean averages (μ) for combinatorial doses of each plasmid using high-dimensional parameter sweeps, multi-objective optimization, and a genetic algorithm (data not shown), the model could also accurately account for trends in α and μα (FIG. 3b, main text). For each promoter, the mean (μ) and proportion of ON cells (α) were similarly and highly correlated (Pearson correlation coefficient, r~0.97) in experiments and in simulations. The results show that while each metric describes a feature of population variability, the mean is a sufficient metric for model calibration.

TABLE M4

Fitted parameters for transcriptional regulation in the promoter model.

| # | Parameter | Estimate* | Units | Description |
|---|---|---|---|---|
| 1 | $w_{H1\_T}$ | $8.594 * 10^{-3}$ | N/A | tTA on promoter H1 |
| 2 | $w_{H1\_G}$ | $2.501 * 10^{-1}$ | N/A | Gal4 on promoter H1 |
| 3 | $w_{H1\_TG}$ | 5.834 | $U^{-1}$ | tTA and Gal4 together on promoter H1 |
| 4 | $w_{H2\_T}$ | $1.368 * 10^{-3}$ | N/A | tTA on promoter H2 |
| 5 | $w_{H2\_G}$ | $4.563 * 10^{-2}$ | N/A | Gal4 on promoter H2 |
| 6 | $w_{H2\_TG}$ | 3.561 | $U^{-1}$ | tTA and Gal4 together on promoter H2 |

*We note that the term for fractional activation in model simulations involved the following scalar multiplications to each transcriptional activation parameter:
$w_{H1\_T}$ and $w_{H1\_G}$ were each multiplied by 2 (for kdegF1)
$w_{H2\_T}$ and $w_{H2\_G}$ were each multiplied by 2 (for kdegF2)
$w_{H1\_TG}$ and $w_{H2\_TG}$ were each multiplied by 4 (for kdegF1* kdegF2)

MESA Model

An ODE model for multiplexed MESA signaling was formulated to account for the reaction mechanism. Several models that differ in mechanistic granularity and in the representation of the mechanism were developed and assessed prior to arriving at a final version. After formulation, the model was calibrated to data from experiments with promoters H1 and H2. Calibration proceeded in two stages: 1) three parameters were fitted using no-ligand data, yielding a family of parameter sets that fit the data similarly; and 2) the remaining three parameters were fitted using data with ligand(s), to arrive at a final parameter set. Fitting was conducted using high-dimensional sweeps (as opposed to, e.g., gradient search) using a Sobol sequence (Sobol, 1976), followed by a window-based multi-objective optimization in which multiple user-specified conditions, based on a subset of salient data, needed to be satisfied for a parameter set to be accepted (as opposed to, e.g., least squares optimization). A custom script for a genetic algorithm was run for several (<20) generations of simulation, scoring, culling, repopulation, and mutation, until no substantial further improvements were observed in the fit to the data.

Variables.

Variables have initial values of 0 arbitrary units (a.u.). Simulations begin at the time of plasmid transfection (0 h), account for ligand treatment if applicable (12 h), and end at the corresponding experimental time point for flow cytometry (36 h). The model is specified in accompanying MATLAB files. There are up to 11 variables per MESA per cellular compartment (Table M5). For Rap-MESA, due to distinct ecto-domains for the target chain and protease chain, variables #7-9 and #11 and any reactions involving these variables do not occur. For VEGF-MESA, variables that contain VEGF and reactions that involve VEGF do not occur intracellularly. Thus, of the 44 possible receptor variables among two MESA in two cellular compartments (11×2×2), 28 can occur for the case of VEGF-MESA and Rap-MESA. Concentration is expressed in units that are arbitrary but comparable between chains.

TABLE M5

MESA receptor variables.

| | | Attributes | | | |
|---|---|---|---|---|---|
| # | Variable | monomer vs. dimer | without vs. with ligand | Target chains: cleaved vs. not | Number of bound TFs |
| 1 | T | monomer | without | not cleaved | 1 |
| 2 | X | monomer | without | cleaved | 0 |
| 3 | P | monomer | without | n/a | 0 |
| 4 | TL | monomer | with | not cleaved | 1 |
| 5 | XL | monomer | with | cleaved | 0 |
| 6 | PL | monomer | with | n/a | 0 |
| 7 | TLT | dimer | with | 2 not cleaved | 2 |
| 8 | TLX | dimer | with | 1 cleaved, 1 not cleaved | 1 |
| 9 | XLX | dimer | with | 2 cleaved | 0 |
| 10 | XLP | dimer | with | cleaved | 0 |
| 11 | PLP | dimer | with | n/a | 0 |

Parameter Estimates.

Parameter values were estimated by a Sobol sweep to explore the high-dimensional parameter space, followed by a custom script for a genetic algorithm with generations of multi-objective scoring, culling, repopulation, and mutation (Table M6). Units are concentration in arbitrary units (U) and time in hours (h). The first three parameters were fitted based on data without ligand, and yielded a family of parameter sets that described the data similarly. The next three parameters were fitted based on data with one or both ligands, and compared to without ligand, in combination with the family of the first three parameters.

TABLE M6

Parameter estimates obtained after calibrating the MESA model.

| # | Parameter | Estimate | Units | Description |
|---|---|---|---|---|
| 1 | ksynM | 0.116 | n/a | Synthesis of receptors |
| 2 | kc | 0.0538 | $U^{-1} h^{-1}$ | Enzymatic cleavage from transient encounters between chains |
| 3 | kdegT | 0.280 | $h^{-1}$ | Degradation of target chain |
| 4 | kL1 | 0.909 | $h^{-1}$ | VEGF-MESA ligand-binding |
| 5 | kL2 | 0.341 | $h^{-1}$ | Rap-MESA ligand-binding |
| 6 | kac | 0.703 | $U^{-1} h^{-1}$ | Chain dimerization (and enzymatic cleavage, if applicable) |

Model Predictions

Dosing. Receptor doses for each MESA in combination with a soluble TF were examined for promoters H1 and H2 (data not shown). Wet-lab experiments suggested that constitutively soluble TF (0.05 μg) generally had more influence on promoter activity than TF released from receptors. Therefore, during model development, the parameter ksynM was introduced as a unitless multiplier for the rate of synthesis (0<ksynM<1) of receptors compared to soluble proteins. The estimate for ksynM after calibration to the data was 0.116, indicating much lower synthesis for receptors. This difference explains in part why ligand-inducible signaling has a relatively modest effect in FIG. 2a, and why, at low receptor doses, the F.D. remains near one.

We examined the dynamics of reporter expression for different receptor and promoter implementations (data not shown). A consistent trend for the single-TF promoters and H1 promoter is that reporter expression increases as either chain dose is increased, as well as with ligand treatment. For multiplexed receptors, while non-ligand-mediated signaling increases due to crosstalk, reporter expression from each single-TF promoter remains ligand-inducible. However, for the hybrid promoter, a wide range of TC and PC doses yield a relatively low two-ligand inducible reporter expression compared to either ligand individually or no ligand. The analysis indicates that the amounts of TFs that can be released from receptors is less than the amount required to synergistically activate the promoter.

We analyzed individual MESA with and without ligand. The results suggest that the way in which ligand-inducible fold-difference (F.D.) is assessed experimentally—as a ratio of population means—may lead to interpretations of performance outcomes that differ from those in individual cells (data not shown). However, true single-cell F.D. outcomes are not directly measurable in experiments because each cell is treated with or without ligand, not both; thus, such precise outcomes will for practical reasons remain unobservable.

We also investigated an all-in-one plasmid scenario, in which genes are cloned onto the same plasmid. While ligand-inducible expression is predicted to increase compared to with separate plasmids, there is a trade-off of higher background signaling, and so the overall performance (F.D.) remains similar.

We examined the choice of time points for ligand treatment and reporter measurement (data not shown). Although adding ligands earlier and conducting flow cytometry later may increase the measured F.D., these effects are predicted to be modest, especially for two-ligand induced F.D. with respect to either ligand individually. We determined that obtaining new experimental measurements at different time points would not affect the main conclusions about receptor performance.

Since changes to promoter responsiveness and synergy conferred improved AND gate performance in FIG. 6, we examined the same types of changes with larger effect-magnitudes (data not shown). We found that promoter modifications with large effect-magnitudes have diminishing returns on AND gate performance improvement. The best possible outcomes resembled the previous ones, indicating that for a given MESA pairing such as with the current receptors, improvements that can be conferred through promoter engineering alone are inherently bounded. For a hypothetical promoter that is already highly responsive or synergistic, further increases to responsiveness or synergy have diminishing returns.

REFERENCES di Bernardo, D., Marucci, L., Menolascina, F., and Siciliano, V. (2011). Predicting synthetic gene networks. In Synthetic gene networks: methods and protocols, W. Weber, and M. Fussenegger, eds. (Springer Science+Business Media), pp. 57-81.

Hirschberg, K., Miller, C. M., Ellenberg, J., Presley, J. F., Siggia, E. D., Phair, R. D., and Lippincott-Schwartz, J. (1998). Kinetic analysis of secretory protein traffic and characterization of Golgi to plasma membrane transport intermediates in living cells. J Cell Biol 143, 1485-1503.

Siciliano, V., Menolascina, F., Marucci, L., Fracassi, C., Garzilli, I., Moretti, M. N., and di Bernardo, D. (2011). Construction and modelling of an inducible positive feedback loop stably integrated in a mammalian cell-line. PLoS Comp Biol 7, e1002074.

Sobol, I. M. (1976). Uniformly distributed sequences with an additional uniform property. USSR Comp Math+16, 1332-1337.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. A mammalian system comprising:
    (i) first and second exogenous extracellular sensors, and third and fourth exogenous extracellular sensors, the first and third exogenous extracellular sensors comprising:
        a) a ligand binding domain,
        b) a transmembrane domain,
        c) a protease cleavage site, and
        d) a functional domain comprising a transcription factor, wherein the transcription factor of the first exogenous extracellular sensor is different than the transcription factor of the third exogenous extracellular sensor; and
    the second and fourth exogenous extracellular sensors comprising:
        e) a ligand binding domain,
        f) a transmembrane domain, and
        g) a protease domain; and
    (ii) a mammalian expression vector comprising a target gene operably linked to a hybrid promoter sequence comprising:
        a) a minimal viral promoter for inducing transcription, and
        b) the $T_2U_2T_2U_2$ binding sequence upstream of the minimal viral promoter that binds the two different transcription factors of the first and third extracellular sensors and exhibits AND logic;
    wherein:
    T is a single copy of Tetracycline Operator (TetO) motif recognized by a tetracycline-controlled transcriptional activator (tTA), and U is a single copy of Upstream Activating Sequence (UAS) motif recognized by a GAL4-VP16 transcriptional activator;
    the ligand binding domain of the first exogenous sensor and the ligand binding domain of the second exogenous sensor bind to the same ligand to form a tertiary complex;
    the ligand binding domain of the third exogenous sensor and the ligand binding domain of the fourth exogenous sensor bind to the same ligand to form a tertiary complex; the ligand binding domains of the first and second exogenous sensors bind to a different ligand than the ligand that is bound by the ligand binding domains of the third and fourth exogenous sensors; and wherein binding of one of the transcription factors of the first and third extracellular sensors to the $T_2U_2T_2U_2$ binding sequence activates expression of the target gene and binding of both of the transcription factors of the first and third extracellular sensors to the $T_2U_2T_2U_2$ binding sequence activates a higher level of expression of the target gene, such that varying degrees of expression are achieved when the first and second exogenous sensors form a tertiary complex, the third and fourth exogenous sensors form a tertiary complex, or both the first and second exogenous sensors form a tertiary complex and the third and fourth exogenous sensors form a tertiary complex; and wherein transcription factors of the first and third extracellular sensors are selected from the group consisting of: tTA and Gal4-VP16.

2. The mammalian system of claim 1, wherein expression of the target gene of the mammalian expression vector is effectuated and/or increased when the transcription factor of the first extracellular sensor and the transcription factor of the third extracellular sensor bind to the $T_2U_2T_2U_2$ binding sequence upstream of the minimal viral promoter of the mammalian expression vector.

3. The mammalian system of claim 1, wherein the first and second exogenous extracellular sensors bind to the ligand of the ligand binding domains of the first and second exogenous extracellular sensors to form a heterodimer in which the protease of the second exogenous extracellular sensor cleaves the protease cleavage site of the first exogenous extracellular sensor to release the functional domain comprising the transcription factor of the first exogenous extracellular sensor.

4. The mammalian system of claim 1, wherein the third and fourth exogenous extracellular sensors bind to the ligand of the ligand binding domains of the third and fourth exogenous extracellular sensors to form a heterodimer in which the protease of the fourth exogenous extracellular sensor cleaves the protease cleavage site of the third exogenous extracellular sensor to release the functional domain comprising the transcription factor of the third exogenous extracellular sensor.

5. The mammalian system of claim 1, further comprising a mammalian cell, wherein the system is located in the cell.

6. The mammalian system of claim 1, wherein one or more of the exogenous extracellular sensors further comprises an extracellular spacer.

7. The mammalian system of claim 1, wherein one or more of the exogenous extracellular sensors further comprises an intracellular spacer that is one, two, three, four, five, or six amino acids in length.

8. The mammalian system of claim 1, wherein the target gene of the expression construct is a reporter gene or a therapeutic gene.

9. The mammalian system of claim 1, wherein the transmembrane domain of the first and third exogenous extracellular sensors is immediately adjacent to said protease cleavage site such that there is no intracellular spacer there between.

10. The mammalian system of claim 1, wherein the protease domain of the second and fourth exogenous extracellular sensors comprises a protease that is at least partially auto-inhibited.

11. A mammalian system comprising:
(i) first and second exogenous extracellular sensors, and third and fourth exogenous extracellular sensors, the first and third exogenous extracellular sensors comprising:
a) a ligand binding domain,
b) a transmembrane domain,
c) a protease cleavage site, and
d) a functional domain comprising a transcription factor, wherein the transcription factor of the first exogenous extracellular sensor is different than the transcription factor of the third exogenous extracellular sensor; and
the second and fourth exogenous extracellular sensors comprising:
e) a ligand binding domain,
f) a transmembrane domain, and
g) a protease domain; and
(ii) a recombinant mammalian cell comprising an endogenous target gene operably linked to a recombinant hybrid promoter sequence comprising a minimal viral promoter for inducing transcription, and the $T_2U_2T_2U_2$ binding sequence upstream of the minimal viral promoter that binds the two different transcription factors of the first and third extracellular sensors and exhibits AND logic;

wherein:
T is a single copy of Tetracycline Operator (TetO) motif recognized by a tetracycline-controlled transcriptional activator (tTA), and U is a single copy of Upstream Activating Sequence (UAS) motif recognized by a GAL4-VP16 transcriptional activator;

the ligand binding domain of the first exogenous sensor and the ligand binding domain of the second exogenous sensor bind to the same ligand to form a tertiary complex;

the ligand binding domain of the third exogenous sensor and the ligand binding domain of the fourth exogenous sensor bind to the same ligand to form a tertiary complex;

the ligand binding domains of the first and second exogenous sensors bind to a different ligand than the ligand that is bound by the ligand binding domains of the third and fourth exogenous sensors; and wherein binding of one of the transcription factors of the first and third extracellular sensors to the $T_2U_2T_2U_2$ binding sequence activates expression of the target gene and binding of both of the transcription factors of the first and third extracellular sensors to the $T_2U_2T_2U_2$ binding sequence activates a higher level of expression of the target gene, such that varying degrees of expression are achieved when the first and second exogenous sensors form a tertiary complex, the third and fourth exogenous sensors form a tertiary complex, or both the first and second exogenous sensors form a tertiary complex and the third and fourth exogenous sensors form a tertiary complex; and wherein transcription factors of the first and third extracellular sensors are selected from the group consisting of: tTA and Gal4-VP16.

12. The mammalian system of claim 11, wherein expression of the endogenous target gene of the recombinant cell is effectuated and/or increased when the transcription factor of the first extracellular sensor and the transcription factor of the third extracellular sensor bind to the $T_2U_2T_2U_2$ binding sequence upstream of the minimal viral promoter of the endogenous target gene.

13. The mammalian system of claim 11, wherein the first and second exogenous extracellular sensors bind to the ligand of the ligand binding domains of the first and second exogenous extracellular sensors to form a heterodimer in which the protease of the second exogenous extracellular sensor cleaves the protease cleavage site of the first exogenous extracellular sensor to release the functional domain comprising the transcription factor of the first exogenous extracellular sensor.

14. The mammalian system of claim 11, wherein the third and fourth exogenous extracellular sensors bind to the ligand of the ligand binding domains of the third and fourth exogenous extracellular sensors to form a heterodimer in which the protease of the fourth exogenous extracellular sensor cleaves the protease cleavage site of the third exogenous extracellular sensor to release the functional domain comprising the transcription factor of the third exogenous extracellular sensor.

15. The mammalian system of claim 11, wherein one or more of the exogenous extracellular sensors further comprises an extracellular spacer.

16. The mammalian system of claim 11, wherein one or more of the exogenous extracellular sensors further comprises an intracellular spacer that is one, two, three, four, five, or six amino acids in length.

17. The mammalian system of claim 11, wherein the transmembrane domain of the first and third exogenous extracellular sensors is immediately adjacent to said protease cleavage site such that there is no intracellular spacer there between.

18. The mammalian system of claim 11, wherein the protease domain of the second and fourth exogenous extracellular sensors comprises a protease that is at least partially auto-inhibited.

19. The mammalian system of claim 1, wherein the minimal viral promoter is selected from an SV40 early promoter, an SV40 late promoter, a human cytomegalovirus promoter, a murine mammary tumor virus promoter, and a Rous sarcoma virus promoter.

20. The mammalian system of claim 11, wherein the minimal viral promoter is selected from an SV40 early promoter, an SV40 late promoter, a human cytomegalovirus promoter, a murine mammary tumor virus promoter, and a Rous sarcoma virus promoter.

* * * * *